(12) United States Patent
Meyer et al.

(10) Patent No.: US 12,540,922 B2
(45) Date of Patent: Feb. 3, 2026

(54) QUANTITATIVE SHOTGUN PROTEOME, LIPIDOME, AND METABOLOME ANALYSIS BY DIRECT INFUSION

(71) Applicants: Wisconsin Alumni Research Foundation, Madison, WI (US); The Medical College of Wisconsin, Inc., Milwaukee, WI (US)

(72) Inventors: Jesse Meyer, Milwaukee, WI (US); Joshua Coon, Middleton, WI (US); Alexander Hebert, Malvern, PA (US); Caleb Cranney, Provo, UT (US)

(73) Assignees: Wisconsin Alumni Research Foundation, Madison, WI (US); The Medical College of Wisconsin, Inc., Milwaukee, WI (US)

( * ) Notice: Subject to any disclaimer, the term of this patent is extended or adjusted under 35 U.S.C. 154(b) by 939 days.

(21) Appl. No.: 17/741,277

(22) Filed: May 10, 2022

(65) Prior Publication Data

US 2022/0365028 A1 Nov. 17, 2022

Related U.S. Application Data

(60) Provisional application No. 63/187,190, filed on May 11, 2021.

(51) Int. Cl.
*G01N 27/64* (2006.01)
*G01N 27/623* (2021.01)
(Continued)

(52) U.S. Cl.
CPC ........... *G01N 27/64* (2013.01); *G01N 27/623* (2021.01); *G01N 27/624* (2013.01); *H01J 49/0031* (2013.01); *H01J 49/0036* (2013.01)

(58) Field of Classification Search
CPC .... G01N 27/64; G01N 27/623; G01N 27/624; H01J 49/0031; H01J 49/0036
(Continued)

(56) References Cited

U.S. PATENT DOCUMENTS 9,741,552 B2 8/2017 Park et al.
2005/0092910 A1* 5/2005 Geromanos ........ G01N 33/6851
435/7.1

(Continued)

FOREIGN PATENT DOCUMENTS

EP 2140270 B1 12/2014
GB 2457769 B 7/2010

OTHER PUBLICATIONS

Aebersold et al. (2016) "Mass-spectrometric exploration of proteome structure and function," Nature, 537, 347-355.
(Continued)

*Primary Examiner* — Michael Maskell
(74) *Attorney, Agent, or Firm* — LEYDIG, VOIT & MAYER, LTD.

(57) ABSTRACT

The present invention provides methods and systems using gas-phase separation with mass spectrometry analysis instead of liquid chromatography, thereby enabling faster peptide, proteome, and multi-omic analysis. Also provided are improved methods and software for data independent acquisition. One embodiment referred to as Direct Infusion-Shotgun Proteome Analysis (DI-SPA) used with data-independent acquisition mass spectrometry (DIA-MS), resulted in targeted quantification of over 500 proteins within minutes of MS data collection (~3.5 proteins/second). Enabling fast, unbiased protein and proteome quantification without liquid chromatography, DI-SPA offers a new approach to boosting throughput critical to drug and biomarker discovery studies that require analysis of thousands of proteomes. This invention is also able to perform complex multi-omic
(Continued)

analysis of proteomes, lipidomes, and metabolomes on a single platform.

18 Claims, 27 Drawing Sheets

(51) Int. Cl.
 *G01N 27/624* (2021.01)
 *H01J 49/00* (2006.01)
(58) Field of Classification Search
 USPC .................................. 250/281, 282, 287, 288
 See application file for complete search history.

(56) References Cited

U.S. PATENT DOCUMENTS

| | | | | |
|---|---|---|---|---|
| 2007/0069120 | A1* | 3/2007 | Shvartsburg ......... | G01N 27/624 250/282 |
| 2008/0135744 | A1* | 6/2008 | Geromanos ......... | H01J 49/0031 250/281 |
| 2008/0142696 | A1* | 6/2008 | Geromanos .......... | C12Q 1/6872 250/282 |
| 2015/0037828 | A1* | 2/2015 | Dulay ..................... | H01J 49/16 521/154 |
| 2020/0373140 | A1* | 11/2020 | Hamid .................. | G01N 27/623 |
| 2021/0156822 | A1 | 5/2021 | DeBord et al. | |
| 2021/0310989 | A1 | 10/2021 | DeBord et al. | |
| 2021/0382006 | A1* | 12/2021 | DeBord ................ | H01J 49/061 |

OTHER PUBLICATIONS

Annesley (2003) "Ion Suppression in Mass Spectrometry," Clin. Chem., 49, 1041.
Bache et al. (2018) "A Novel LC System Embeds Analytes in Pre-formed Gradients for Rapid, Ultra-robust Proteomics," Molecular & Cellular Proteomics, 17, 2284-2296.
Basisty et al. (2018) Simultaneous Quantification of the Acetylome and Succinylome by 'One-Pot' Affinity Enrichment, Proteomics 18(17), 1800123.
Bekker-Jensen et al. (Apr. 2020) "A Compact Quadrupole-Orbitrap Mass Spectrometer with FAIMS Interface Improves Proteome Coverage in Short LC Gradients," Mol Cell Proteomics, 19, 716-729.
Benjamini et al. (1995) "Controlling the False Discovery Rate: A Practical and Powerful Approach to Multiple Testing," J. R. Stat. Soc. Ser. B Methodol., 57 (1), 289-300.
Bian et al. (Jan. 2020) "Robust, reproducible and quantitative analysis of thousands of proteomes by micro-flow LC-MS/MS," Nat Commun., 11, 157.
Breiman (2001) "Random Forests," Mach Learn 45, 5-32.
Bruderer et al. (2015) "Extending the limits of quantitative proteome profiling with data-independent acquisition and application to acetaminophen-treated three-dimensional liver microtissues," Mol. Cell. Proteomics MCP, 14(5), 1400-1410.
Cantor et al. (2017) "Physiologic Medium Rewires Cellular Metabolism and Reveals Uric Acid as an Endogenous Inhibitor of UMP Synthase," Cell, 169, 258-272.
Cech et al. (2000) "Relating Electrospray Ionization Response to Nonpolar Character of Small Peptides," Anal. Chem., 72, 2717-2723.
Chambers et al. (2012) "A cross-platform toolkit for mass spectrometry and proteomics," Nature Biotechnology, 30, 918-920.
Chekmeneva et al. (2017) "Optimization and Application of Direct Infusion Nanoelectrospray HRMS Method for Large-Scale Urinary Metabolic Phenotyping in Molecular Epidemiology," J. Proteome Res., 16, 4, 1646-1658.
Chen (2006) "Rapid protein identification using direct infusion nanoelectrospray ionization mass spectrometry," Proteomics, 6, 16-25.

Chen et al. (2011) "Multi-Segment Direct Inject nano-ESI-LTQ-FT-ICRMS/MS For Protein Identification," Proteome Science, 9, 38.
Christensen et al. (2018) "Identification of Novel Protein Lysine Acetyltransferases in *Escherichia coli*," mBio 9(5), e01905-18.
Contrepois et al. (2018) "Cross-Platform Comparison of Untargeted and Targeted Lipidomics Approaches on Aging Mouse Plasma," Sci. Rep., 8, 17747.
Cranney et al. (Sep. 2021) "CsoDIAq Software for Direct Infusion Shotgun Proteome Analysis," Anal. Chem. 93, 12312-12319.
Cumeras et al. (2015) "Review on Ion Mobility Spectrometry. Part 1: current instrumentation," Analyst, 140, 1376-1390.
Cumeras et al. (2015) "Review on Ion Mobility Spectrometry. Part 2: hyphenated methods and effects of experimental parameters," Analyst, 140, 1391-1410.
Dai et al. (2019) "Dysregulated Mitochondrial Dynamics and Metabolism in Obesity, Diabetes, and Cancer," Front. Endocrinol. 10, 570.
De Godoy et al. (2008) "Comprehensive mass-spectrometry-based proteome quantification of haploid versus diploid yeast," Nature, 455, 1251-1254.
Demichev et al. (Jan. 2020) "DIA-NN: neural networks and interference correction enable deep proteome coverage in high throughput," Nat. Methods, 17(1), 41-44.
Donohoe et al. (2014) "A New Ion Mobility—Linear Ion Trap Instrument for Complex Mixture Analysis," Anal. Chem., 86(16), 8121-8128.
Du et al. (2016) "Reductive carboxylation is a major metabolic pathway in the retinal pigment epithelium," Proc. Natl. Acad. Sci. 113, 14710-14715.
El-Faramawy et al. (2005) "Efficiency of Nano-Electrospray Ionization," J. Am. Soc. Mass Spectrom., 16, 1702-1707.
Escher et al. (2012) "Using iRT, a normalized retention time for more targeted measurement of peptides," Proteomics, 12 (8), 1111-1121.
Fenn et al. (1989) "Electrospray Ionization for Mass Spectrometry of Large Biomolecules," Science, 246, 64-71.
Folch et al. (1957) "A simple method for the isolation and purification of total lipides from animal tissues," J. Biol. Chem., 226, 497-509.
Freund et al. (1997) "A decision-theoretic generalization of on-line learning and an application to boosting," J. Comput. Syst. Sci. 55, 119-139.
Frewen et al. (2006) "Analysis of Peptide MS/MS Spectra from Large-Scale Proteomics Experiments Using Spectrum Libraries," Anal. Chem., 78(16), 5678-5684.
Friedman (2001) "Greedy function approximation: A gradient boosting machine," Ann. Stat. 29, 1189-1232.
Gachumi et al. (Jun. 2020) "Fast Quantification Without Conventional Chromatography, The Growing Power of Mass Spectrometry," Anal. Chem., 92, 8628-8637.
Gessulat et al. (2019) "Prosit: proteome-wide prediction of peptide tandem mass spectra by deep learning," Nat. Methods, 16(6), 509-518.
Geurts et al. (2006) "Extremely randomized trees," Learn. 63, 3-42.
Geyer et al. (2017) "Revisiting biomarker discovery by plasma proteomics," Mol Syst Biol, 13, 942.
Ghaemmaghami et al. (2003) "Global analysis of protein expression in yeast," Nature, 425, 737-741.
Giles (2013) "Travelling wave ion mobility," Int. J. Ion Mobil. Spec., 16, 1-3.
Giles et al. (2019) "A Cyclic Ion Mobility—Mass Spectrometry System," Anal. Chem., 91, 8564-8573.
Gillet et al. (2012) "Targeted data extraction of the MS/MS spectra generated by data-independent acquisition: a new concept for consistent and accurate proteome analysis," Mol. Cell. Proteomics, 11(6), doi.org/10.1074/mcp.O111.016717.
Gupta et al. (2009) "False Discovery Rates of Protein Identifications: A Strike against the Two-Peptide Rule," Journal of Proteome Research, 8, 4173-4181.
Hahne et al. (2013) "DMSO enhances electrospray response, boosting sensitivity of proteomic experiments," Nat Meth, 10, 989-991.

(56) References Cited

OTHER PUBLICATIONS

He et al. (Mar. 2021) "Multi-Omic Single-Shot Technology for Integrated Proteome and Lipidome Analysis," Anal. Chem., 93 (9), 4217-4222.
Hebert et al. (2014) "The One Hour Yeast Proteome," Mol. Cell. Proteomics, 13, 339-347.
Hebert et al. (2018) "Comprehensive Single-Shot Proteomics with FAIMS on a Hybrid Orbitrap Mass Spectrometer," Anal. Chem., 90, 9529-9537.
Hengel et al. (2011) "Data-independent Proteomic Screen Identifies Novel Tamoxifen Agonist that Mediates Drug Resistance," J. Proteome Res., 10, 4567-4578.
Hoaglund-Hyzer et al. (2001) "Abstract: Ion trap/ion mobility/quadrupole/time-of-flight mass spectrometry for peptide mixture analysis," Anal Chem. 73(2):177-84. doi: 10.1021/ac0007783.
Horn et al. (2000) "Automated reduction and interpretation of high resolution electrospray mass spectra of large molecules," Journal of the American Society for Mass Spectrometry, 11, 4, 320-332.
Huang et al. (2009) "Bioinformatics enrichment tools: paths toward the comprehensive functional analysis of large gene lists," Nucleic Acids Res. 37, 1-13.
Ivanov et al. (Feb. 2020) "DirectMS1: MS/MS-Free Identification of 1000 Proteins of Cellular Proteomes in 5 Minutes," Anal. Chem., 92, 4326-4333.
Jaitly et al. (2009) "Decon2LS: An open-source software package for automated processing and visualization of high resolution mass spectrometry data," BMC Bioinformatics, 10, 87.
Jeong et al. (2012) "False discovery rates in spectral identification," BMC Bioinf., 13: S2.
Kammeijer et al. (2016) "Dopant Enriched Nitrogen Gas Combined with Sheathless Capillary Electrophoresis-Electrospray Ionization—Mass Spectrometry for Improved Sensitivity and Repeatability in Glycopeptide Analysis," Anal. Chem., 88, 5849-5856.
Kanu et al. (2008) "Ion mobility—mass spectrometry," J. Mass. Spectrom., 43, 1-22.
Kapogiannis et al. (2011) "Disrupted energy metabolism and neuronal circuit dysfunction in cognitive impairment and Alzheimer's disease," Lancet Neurol. 10, 187-198.
Kelstrup et al. (2018) "Performance Evaluation of the Q Exactive HF-X for Shotgun Proteomics," J. Proteome Res., 17, 727-738.
Kong et al. (2017) "MSFragger: ultrafast and comprehensive peptide identification in mass spectrometry-based proteomics," Nature Methods, 14, 513-520.
Kostiainen et al. (2009) "Effect of eluent on the ionization process in liquid chromatography—mass spectrometry," J. Chromatogr. A, 1216, 685-699.
Koulman et al. (2007) "High-throughput direct-infusion ion trap mass spectrometry: a new method for metabolomics," Rapid Communications in Mass Spectrometry, 21, 421-428.
Kretschy et al. (2011) "High-throughput flow injection analysis of labeled peptides in cellular samples—ICP-MS analysis versus fluorescence based detection," International Journal of Mass Spectrometry, 307, 105-111.
Kueng et al. (1989) "Quantification of cells cultured on 96-well plates," Analytical Biochemistry, 182, 16-19.
Lam et al. (2007) "Development and validation of a spectral library searching method for peptide identification from MS/MS," Proteomics, 7(5), 655-667.
Lapointe et al. (2018) "Multi-omics Reveal Specific Targets of the RNABinding Protein Puf3p and Its Orchestration of Mitochondrial Biogenesis," Cell Syst., 6, 125-135.
Levitsky et al. (2019) "Pyteomics 4.0: Five Years of Development of a Python Proteomics Framework," Journal of Proteome Research, 18, 709-714.
Li et al. (2015) "A novel approach to the simultaneous extraction and non-targeted analysis of the small molecules metabolome and lipidome using 96-well solid phase extraction plates with column-switching technology," J. Chromatography A, 1409, 277-281.
Llufrio et al. (2019) "Systems-level analysis of isotopic labeling in untargeted metabolomic data by X13CMS," Nat. Protoc. 14, 1970-1990.
Lumpkin et al. (2017) "Site-specific identification and quantitation of endogenous SUMO modifications under native conditions," Nat. Commun. 8, 1171.
Lundberg et al. (2017) "A Unified Approach to Interpreting Model Predictions," Advances in Neural Information Processing Systems 30 (eds. Guyon, I. et al.) 4765-4774.
Luzarowski et al. (2019) "Emerging strategies for the identification of protein-metabolite interactions," J. Exp. Bot., 70, 4605-4618.
Maclean et al. (2010) "Skyline: an open source document editor for creating and analyzing targeted proteomics experiments," Bioinformatics, 26, 966-968.
Mcinnes et al. (Sep. 2020) "UMAP: Uniform Manifold Approximation and Projection for Dimension Reduction," arXiv:1802.03426.
Mclean et al. (2005) "Ion mobility—mass spectrometry: a new paradigm for proteomics," Int. J. Mass Spec., 240(3):301-315.
Meier et al. (2015) "Parallel Accumulation—Serial Fragmentation (PASEF): Multiplying Sequencing Speed and Sensitivity by Synchronized Scans in a Trapped Ion Mobility Device," Journal of Proteome Research, 14, 12, 5378-5387.
Melani et al. (2019) "Direct Measurement of Light and Heavy Antibody Chains Using Differential Ion Mobility Spectrometry and Middle-Down Mass Spectrometry," MABS, 11(8), 1351-1357.
Messner et al. (Jul. 2021) "Ultra-fast proteomics with Scanning SWATH," Nat Biotechnol. 39(7): 846-854.
Meyer (Jan. 2019) "Fast Proteome Identification and Quantification from Data-Dependent Acquisition—Tandem Mass Spectrometry (DDA MS/MS) Using Free Software Tools," Methods Protoc., 2(1), 8.
Meyer (Sep. 2020) "Detection of Discordant Peptide Quantities in Shotgun Proteomics Data by Peptide Correlation Analysis (PeCorA)," bioRxiv, pp. 2020-08.
Meyer et al. (2012) "Charge State Coalescence During Electrospray Ionization Improves Peptide Identification by Tandem Mass Spectrometry," J. Am. Soc. Mass Spectrom. 23:1390-1399.
Meyer et al. (2014) "Expanding Proteome Coverage with Orthogonal-specificity α-Lytic Proteases," Mol. Cell. Proteomics, 13, 3, 823-835.
Meyer et al. (2016) "Quantification of Lysine Acetylation and Succinylation Stoichiometry in Proteins Using Mass Spectrometric Data-Independent Acquisitions (SWATH)," Journal of The American Society for Mass Spectrometry 27, 11, 1758-1771.
Meyer et al. (2018) "Temporal dynamics of liver mitochondrial protein acetylation and succinylation and metabolites due to high fat diet and/or excess glucose or fructose," PLOS One 13(12), e0208973.
Meyer et al. (2019) "Proteome and Secretome Dynamics of Human Retinal Pigment Epithelium in Response to Reactive Oxygen Species," Sci. Rep. 9, 15440.
Meyer et al. (Dec. 2020) "Quantitative shotgun proteome analysis by direct infusion," Nat. Methods, 17(12), 1222-1228.
Meyer et al. (Jun. 2017) "PIQED: automated identification and quantification of protein modifications from DIA-MS data," Nat. Methods, 14(7), 646-647.
Meyer et al. (May 2017) "Clinical applications of quantitative proteomics using targeted and untargeted data-independent acquisition techniques," Expert Rev. Proteomics, 14(5), 419-429.
Meyer et al. (Sep. 2019) "Learning Drug Functions from Chemical Structures with Convolutional Neural Networks and Random Forests," J. Chem. Inf. Model., 59, 10, 4438-4449.
Michalski et al. (2011) "More than 100,000 Detectable Peptide Species Elute in Single Shotgun Proteomics Runs but the Majority is Inaccessible to Data-Dependent LC-MS/MS," Journal of Proteome Research, 10, 4, 1785-1793.
Mullen et al. (2012) "Reductive carboxylation supports growth in tumour cells with defective mitochondria," Nature 481, 385-388.
Nagy et al. (2019) "Separation of β-Amyloid Tryptic Peptide Species with Isomerized and Racemized I-Aspartic Residues with Ion Mobility in Structures for Lossless Ion Manipulations," Anal. Chem., 91, 7, 4374-4380.

(56) References Cited

OTHER PUBLICATIONS

Navarro et al. (2016) "A multicenter study benchmarks software tools for label-free proteome quantification," Nat. Biotechnol., 34(11), 1130-1136.
Neely et al. (Nov. 2020) "2019 Association of Biomolecular Resource Facilities Multi-Laboratory Data-Independent Acquisition Study," J. bioRxiv, Nov. 2020.
Niemi et al. (2019) "Pptc7 is an essential phosphatase for promoting mammalian mitochondrial metabolism and biogenesis," Nature Communications, 10, 3197.
Oexle et al. (1999) "Iron-dependent changes in cellular energy metabolism: influence on citric acid cycle and oxidative phosphorylation," Biochimica et Biophysica Acta (BBA)—Bioenergetics 1413, 99-107.
Ogorzalek et al. (2014) "What Protein Charging (and Supercharging) Reveal about the Mechanism of Electrospray Ionization," J. Am. Soc. Mass Spectrom., 25, 1675-1693.
Olson et al. (2016) "Automating Biomedical Data Science Through Tree-Based Pipeline Optimization," in Applications of Evolutionary Computation (eds. Squillero, G. & Burelli, P.) vol. 9597 123-137 (Springer International Publishing, 2016).
Ong et al. (2002) "Stable Isotope Labeling by Amino Acids in Cell Culture, SILAC, as a Simple and Accurate Approach to Expression Proteomics," Mol. Cell. Proteomics, 1, 376-386.
Oughtred et al. (2019) "The BioGRID interaction database: 2019 update," Nucleic Acids Res. 47, D529-D541.
Overmyer et al. (Jan. 2021) "Large-Scale Multi-omic Analysis of COVID-19 Severity," Cell Systems, 12, 23-40.
Page et al. (2007) "Ionization and Transmission Efficiency in an Electrospray Ionization—Mass Spectrometry Interface," J. Am. Soc. Mass Spectrom., 18, 1582-1590.
Parker et al. (2019) "An integrative systems genetic analysis of mammalian lipid metabolism," Nature 567, 187-193.
Patel-Murray et al. (Jan. 2020) "A Multi-Omics Interpretable Machine Learning Model Reveals Modes of Action of Small Molecules," Sci. Rep., 10, 954.
Pereira-Medrano et al. (2007) "A systematic evaluation of chip-based nanoelectrospray parameters for rapid identification of proteins from a complex mixture," Journal of the American Society for Mass Spectrometry, 18, 9, 1714-1725.
Piazza et al. (2018) "A Map of Protein-Metabolite Interactions Reveals Principles of Chemical Communication," Cell 172, 358-372.e23.
Pirhaji et al. (2016) "Revealing disease-associated pathways by network integration of untargeted metabolomics," Nat. Methods, 13, 770-776.
Potriquet et al. (2017) "A modified FASP protocol for high-throughput preparation of protein samples for mass spectrometry," J. PLOS One 12(7), e0175967.
Purves et al. (2017) "Optimization of a New Aerodynamic Cylindrical FAIMS Device for Small Molecule Analysis," Journal of The American Society for Mass Spectrometry, 28, 3, 525-538.
Reiter et al. (2011) "mProphet: automated data processing and statistical validation for large-scale SRM experiments," Nat. Methods, 8(5), 430-435.
Rosenberger et al. (2014) "A repository of assays to quantify 10,000 human proteins by SWATH-MS," Sci. Data, 1(1), 140031.
Röst et al. (2014) "OpenSWATH enables automated, targeted analysis of data-independent acquisition MS data," Nat. Biotechnol., 32(3), 219-223.
Sarvin et al. (Jun. 2020) "Fast and sensitive flow-injection mass spectrometry metabolomics by analyzing sample-specific ion distributions," Nat Commun., 11, 3186.
Schilling et al. (2019) "High-Resolution Mass Spectrometry to Identify and Quantify Acetylation Protein Targets," Methods Mol Biol, 3-16. doi:10.1007/978-1-4939-9434-2_1.
Schwaiger et al. (2019) "Merging metabolomics and lipidomics into one analytical run," Analyst, 144, 220-229.
Searle et al. (2018) "Chromatogram libraries improve peptide detection and quantification by data independent acquisition mass spectrometry," Nat. Commun., 9(1), 5128.
Searle et al. (2019) "Thesaurus: quantifying phosphopeptide positional isomers," Nat. Methods, 16(8), 703-706.
Shanmugam et al. (2014) "Utility of RNA-seq and GPMDB Protein Observation Frequency for Improving the Sensitivity of Protein Identification by Tandem MS," Journal of Proteome Research, 13, 4113-4119.
Shimazu et al. (2013) "Suppression of Oxidative Stress by β-Hydroxybutyrate, an Endogenous Histone Deacetylase Inhibitor," Science, 339, 211-214.
Shishkova et al. (2016) "Now, More Than Ever, Proteomics Needs Better Chromatography," Cell Systems, 3, 321-324.
Shvartsburg et al. (2008) "Fundamentals of Traveling Wave Ion Mobility Spectrometry," Anal. Chem., 80(24), 9689-9699.
Sidoli et al. (2019) "One minute analysis of 200 histone post-translational modifications by direct injection mass spectrometry," Genome Res., 29(6), 978-987.
Softic et al. (2019) "Dietary Sugars Alter Hepatic Fatty Acid Oxidation via Transcriptional and Post-translational Modifications of Mitochondrial Proteins," Cell Metab. 30, 735-753.e4.
Southam et al. (2017) "A complete workflow for high-resolution spectral-stitching nanoelectrospray direct-infusion mass-spectrometry-based metabolomics and lipidomics," Nat. Protoc., 12, 310-328.
Stefely et al. (2016) "Mitochondrial protein functions elucidated by multi-omic mass spectrometry profiling," Nat. Biotechnol., 34, 1191-1197.
Stein et al. (1994) "Optimization and Testing of Mass Spectral Library Search Algorithms for Compound Identification," J. Am. Soc. Mass Spectrom, 5(9), 859-866.
Swearingen et al. (2012) "Nanospray FAIMS Fractionation Provides Significant Increases in Proteome Coverage of Unfractionated Complex Protein Digests," Molecular & Cellular Proteomics, 11, M111.014985.
Tabb et al. (2003) "Similarity among Tandem Mass Spectra from Proteomic Experiments: Detection, Significance, and Utility," Anal. Chem., 75(10), 2470-2477.
Ting et al. (2017) "PECAN: library-free peptide detection for data-independent acquisition tandem mass spectrometry data," Nat. Methods, 14(9), 903-908.
Tiwary et al. (2019) "High-quality MS/MS spectrum prediction for data-dependent and data-independent acquisition data analysis," Nat. Methods, 16(6), 519-525.
Tran et al. (2019) "Deep learning enables de novo peptide sequencing from data-independent-acquisition mass spectrometry," Nat. Methods, 16(1), 63-66.
Tsou et al. (2015) "DIA-Umpire: comprehensive computational framework for data-independent acquisition proteomics," Nat. Methods, 12(3), 258-264.
Venable et al. (2004) "Automated approach for quantitative analysis of complex peptide mixtures from tandem mass spectra," Nat. Methods, 1(1), 39-45.
Wang et al. (2010) "Peptide Identification from Mixture Tandem Mass Spectra," Mol. Cell. Proteomics MCP, 9(7), 1476-1485.
Wang et al. (2015) "MSPLIT-DIA: sensitive peptide identification for data-independent acquisition," Nat. Methods, 12(12), 1106-1108.
Wang et al. (2017) "Simultaneous metabolomics and lipidomics analysis based on novel heart-cutting two-dimensional liquid chromatography-mass spectrometry," Analytica Chimica Acta, 966, 34-40.
Wang et al. (2018) "Assembling the Community-Scale Discoverable Human Proteome," Cell Systems, 7, 412-421.e5.
Wang et al. (Dec. 2019) "Analytical challenges of shotgun lipidomics at different resolution of measurements," Trends in Analytical Chemistry, 121, 115697.
Wang et al. (May 2019) "Regulation of UCP1 and Mitochondrial Metabolism in Brown Adipose Tissue by Reversible Succinylation," Mol. Cell 74, 844-857.

(56) References Cited

OTHER PUBLICATIONS

Webb et al. (2014) "Experimental Evaluation and Optimization of Structures for Lossless Ion Manipulations for Ion Mobility Spectrometry with Time-of-Flight Mass Spectrometry," Anal. Chem., 86, 9169-9176.

Wei et al. (2018) "Quantification of Site-specific Protein Lysine Acetylation and Succinylation Stoichiometry Using Data-independent Acquisition Mass Spectrometry," J. Vis. Exp. (134), e57209.

Wilm et al. (1996) "Femtomole sequencing of proteins from polyacrylamide gels by nano-electrospray mass spectrometry," Nature, 379, 466-469.

Xiang et al. (2012) "Evaluation of Direct Infusion-Multiple Reaction Monitoring Mass Spectrometry for Quantification of Heat Shock Proteins," Anal. Chem., 84, 1981-1986.

Yang et al. (Jan. 2020) "In silico spectral libraries by deep learning facilitate data-independent acquisition proteomics," Nat. Commun., 11(1), 146.

Yi et al. (2002) "Approaching complete peroxisome characterization by gas-phase fractionation," Electrophoresis, 23, 3205-3216.

Zelezniak et al. (2018) "Machine Learning Predicts the Yeast Metabolome from the Quantitative Proteome of Kinase Knockouts," Cell Syst. 7, 269-283.e6.

Zhang et al. (2007) "Proteomic Parsimony through Bipartite Graph Analysis Improves Accuracy and Transparency," J. Proteome Res., 6(9), 3549-3557.

\* cited by examiner

*Multi-Omic Data Collection*

QUANTITATIVE SHOTGUN PROTEOME, LIPIDOME, AND METABOLOME ANALYSIS BY DIRECT INFUSION

CROSS-REFERENCE TO RELATED APPLICATIONS

This application claims priority from U.S. Provisional Patent Application No. 63/187,190, filed May 11, 2021, which is incorporated by reference herein to the extent that there is no inconsistency with the present disclosure.

STATEMENT REGARDING FEDERALLY SPONSORED RESEARCH OR DEVELOPMENT

This invention was made with government support under LM007359 and GM108538 awarded by the National Institutes of Health. The government has certain rights in the invention.

BACKGROUND OF THE INVENTION

Shotgun proteomics methods using liquid chromatography coupled to mass spectrometry (LC-MS) achieve the greatest depth and breadth of proteome coverage (Aebersold et al., Nature, 537, 347-355 (2016); and Meyer et al., Expert Review of Proteomics, 14, 419-429 (2017)). The time required for such comprehensive proteome analysis, once a major burden, has been driven down by technological adaptation. Just over a decade ago, weeks of MS data collection were required to quantify nearly all expressed yeast proteins (de Godoy et al., Nature, 455, 1251-1254 (2008)); by 2016, the same task could be accomplished in just over one hour (see, for example, Hebert et al., Molecular & Cellular Proteomics, 13, 339-347 (2014)).

More recent advancements in data-independent acquisition (DIA) and fast LC have further reduced analysis times and enabled routine protein quantification at rates of up to 15,000 non-unique proteins per hour (Bache et al., Molecular & Cellular Proteomics, 17, 2284-2296 (2018) and Kelstrup et al., J. Proteome Res., 17, 727-738 (2018)). Similar methods are also useful for rapid analysis and quantification in lipidomics and metabolomics. Still, as the fields of proteomics, lipidomics, and metabolomics push for higher throughput, the requirement for liquid-phase separations inevitably requires time that in turn limits throughput. This is amplified by time needed to load and re-equilibrate the LC column.

In theory, omitting LC prefractionation could decrease analysis time (Gachumi et al., Anal. Chem., 92, 8628-8637 (2020)). Several papers describe qualitative analysis of peptides from simple mixtures by direct infusion, an approach that has been used in metabolomics (Chekmeneva et al., J. Proteome Res., 16, 1646-1658 (2017); and Koulman et al., Rapid Communications in Mass Spectrometry, 21, 421-428 (2007)).

Twenty-five years ago, direct infusion of peptides from trypsin-digested gel bands or standard proteins was available, but offered limited depth, typically less than 60 peptides (Wilm et al., Nature, 379, 466-469 (1996); Chen, S., Proteomics, 6, 16-25 (2006); Pereira-Medrano et al., Journal of the American Society for Mass Spectrometry, 18, 1714-1725 (2007); Chen et al., Proteome Science, 9, 38 (2011); Xiang et al., Anal. Chem., 84, 1981-1986 (2012); and Kretschy et al., International Journal of Mass Spectrometry, 307, 105-111 (2011)).

As LC and MS co-evolved, LC-MS became the premiere technology for the analysis of the tremendously complex mixture of peptides that results from whole proteome digestion. Although direct infusion was recently used to profile histone modifications in one minute (Sidoli et al., Genome Res., 29, 978-987 (2019)), it has not been able to interrogate peptide mixtures from the human proteome, which contain well over 100,000 distinct peptide sequences (Michalski et al., Journal of Proteome Research, 10, 1785-1793 (2011)).

Several factors may hinder detection of peptides from such complex mixtures by electrospray ionization without LC, including: peptide polarity, mobile phase composition, ion suppression, and ion competition (Cech et al., Anal. Chem., 72, 2717-2723 (2000); Meyer et al., Journal of the American Society for Mass Spectrometry, 1-10 (2012); Ogorzalek et al., J. Am. Soc. Mass Spectrom., 25, 1675-1693 (2014); Annesley et al., Clin. Chem., 49, 1041 (2003); and Sarvin et al., Nat Commun., 11, 3186 (2020)). However, recent advancements in MS around accurate mass measurement, sensitivity, and speed inspired the present inventors to revisit the concept of peptide identification without LC.

Among recent MS advances, ion mobility has enabled an additional dimension of gas-phase peptide cation separation that complements fractionation by quadrupole selection (see, for example, Webb et al., Anal. Chem., 86, 9169-9176 (2014); Giles et al., Anal. Chem., 91, 8564-8573 (2019); Meier et al., Journal of Proteome Research, 14, 5378-5387 (2015); Swearingen et al., Molecular & Cellular Proteomics, 11, M111.014985 (2012); Hebert et al., Anal. Chem., 90, 9529-9537 (2018); Nagy et al., Anal. Chem., 91, 4374-4380 (2019); Melani et al., bioRxiv, (2019) doi:10.1101/693473; Purves et al., Journal of The American Society for Mass Spectrometry, 28, 525-538 (2017); Hengel et al., J. Proteome Res., 10, 4567-4578 (2011); McLean et al., Int. J. Mass Spec., 240(3):301-315; Yi et al., Electrophoresis, 23, 3205-3216 (2002); Donohoe et al., Anal. Chem., 86(16), 8121-8128); and EP 2 140 270).

Unlike liquid separations that typically work on the principle of hydrophobicity or ion exchange, ion mobility separations sort gas phase ions based on their charge, shape, collisional cross-section, and/or travel speed through a buffer gas (see U.S. Pat. No. 9,741,552, US 2021/0156822 and GB 2457769). For example, an ion having larger ion mobility (i.e., a smaller collision cross section) moves faster through a buffer gas under the influence of the electric field compared to an ion with smaller ion mobility (i.e., a larger collision cross section) (see also US 2020/0373140, US 2021/0382006 and US 2021/0310989). By applying an electric field over a separation distance within a chamber, ions within a mixture can be spatially separated and collected based on their mobility. Additionally, ions with different ion mobilities will arrive at an outlet end of a chamber at different times, and can be collected based on time (temporal separation). As an example, high-field asymmetric waveform ion mobility spectrometry (FAIMS) can permit very rapid gas-phase separation through a device placed between the electrospray emitter and atmospheric pressure inlet of a mass spectrometer. FAIMS filters ions through inner and outer electrodes based on their differential mobility in high or low field asymmetric fields. As described in the present invention, analyte separation by ion mobility methods may improve the analysis of complex mixtures without using conventional purification techniques, such as liquid chromatography.

Performing proteomics, lipidomics, and/or metabolomics without requiring liquid chromatography, enables much faster analysis and higher throughput. Additionally, as the liquid chromatography step is typically also the part of the process most prone to problems, removing those problems makes sample analysis more robust.

SUMMARY OF THE INVENTION

The present invention provides methods utilizing gas-phase separation as a substitute for liquid chromatography (LC) to deliver expeditious analysis of complex mixtures. In this strategy, samples are directly infused into a mass spectrometry device, ionized by electrospray, and the resulting ions separated in the gas phase before detection and analysis. In an embodiment, the detection and analysis of target analytes in the sample is performed by data-independent acquisition (DIA), optionally in conjunction with high resolution MS/MS. The methods described herein provide faster processing and analysis of large complex mixtures and are therefore particularly advantageous for proteome, lipidome, and metabolome analysis.

In an embodiment, the present invention provides methods and systems for direct-infusion mass spectrometry that deliver expeditious analysis of complex mixtures without requiring a separation or purification step (such as LC) having to be performed before the sample mixture is injected into the mass spectrometer or electrospray device. The methods and systems of the present invention include, but are not limited to, use in shotgun proteome, lipidome and metabolome analysis. For example, in certain embodiments, the samples are complex peptide mixtures, such as from an organism proteome. The methods and systems of the present invention leverage ion mobility in the gas-phase to separate ions on the basis of their charge, shape, collisional cross-section, and/or how fast the ions are able to travel through the buffer gas (in contrast with LC, which most often leverages hydrophobicity for separation). Samples containing target analytes are directly infused and ionized by electrospray, and the resulting ions (typically cations) are separated in the gas phase before detection by data-independent acquisition mass spectrometry (DIA-MS). The extent of gas-phase separations is typically positively correlated with the depth of observable proteome, lipidome, and metabolome coverage.

Ion mobility separates ionized molecules based on the mobility of the ionized molecules through a carrier medium, such as a buffer gas. The ionized molecules collide with atoms in the buffer gas, which reduces the speed of the ionized molecules. Ionized molecules having greater mobility through the buffer gas (i.e., a smaller collisional cross section) will be spatially separated from ionized molecules having less mobility (i.e., a larger collisional cross section) and/or will reach the outlet end of the chamber first. Accordingly, the ionized molecules are able to be removed from the chamber and/or detected based on the spatial or temporal separation. Ion mobility analytical techniques compatible with the present invention include, but are not limited to, drift-tube or drift time ion mobility spectrometry (DT IMS), trapped ion mobility spectrometry (TIMS), travelling wave ion mobility spectrometry (TW IMS), field asymmetric ion mobility spectrometry (FAIMS), differential mobility spectrometry (DMS), and combinations thereof (see, for example, Giles, Int. J. Ion Mobil. Spec., 16, 1-3 (2013); Kanu et al., J. Mass. Spectrom., 43, 1-22 (2008); Shvartsburg et al., Anal. Chem., 80(24), 9689-9699 (2008); Cumeras et al., Analyst, 140, 1376-1390, (2015); and Cumeras et al., Analyst, 140, 1391-1410, (2015)).

In an embodiment, molecules are ionized and are driven by an electric field. As a result, the speed at which the ionized molecules are able to pass through the gas is determined by factors such as the molecule size, shape, charge, and combinations thereof. The ion mobility separation techniques and methods suitable for use with the present invention may produce either a continuous ion beam or a discontinuous ion beam to the downstream mass spectrometer or other analyzer device. In a further embodiment, the electric field may be applied for a continuous period of time until all of the desired ions are collected from the chamber, thereby producing a continuous beam containing sample ions to a mass analyzer. Alternatively, the electric field may be applied for intermittent time periods. For example, in an embodiment the electric field is applied for a first selected time period, or until a first selected portion of ions are collected, at which point the electric field is decreased or removed so that no further ions are collected. The collected ions (i.e., the ions able to travel the fastest through the buffer gas) are transported to the subsequent mass spectrometer or other analyzer device. The electric field is re-applied for a second selected time period, or until a second selected portion of ions are collected, at which point the electric field is again decreased or removed. This process of applying and then removing or decreasing the electric field can be repeated multiple times. As a result, the ions are separated and subsequently analyzed according to how fast they are able to travel through the buffer gas.

In an embodiment, the ionized molecules are transported through a chamber having a constant electric field. In an alternate embodiment, the electric field may be selectively varied. For example, high field asymmetric waveform ion mobility spectrometry (FAIMS) (also known as differential mobility spectrometry (DMS)) is an ion mobility technique that separates gas-phase ions by their behavior in alternating strong and weak electric fields. Ionized molecules are carried by a flow of buffer gas between two electrodes in a direction orthogonal to the direction of the electric field, where the electric field is generated as an asymmetric waveform that alternates between a high field voltage of one polarity and a low field voltage of the opposite polarity. In an embodiment, the electric field is kept constant for the entire time period where sample ions are collected. In an alternative embodiment, the conditions (such as the electric field or buffer gas) are altered at different times to collect sample ions using different separation characteristics.

In an embodiment the present invention provides a method for high-throughput analysis of a sample comprising the steps of: a) providing a sample comprising a mixture of molecules; b) ionizing the mixture of molecules thereby generating ionized molecules; c) transporting the ionized molecules from an inlet side of a chamber to an outlet side of a chamber, wherein the chamber comprises a buffer gas and the ionized molecules are transported through the buffer gas; d) applying an electric field to the ionized molecules being transported through the buffer gas, and separating the ionized molecules according to ion mobility of the ionized molecules; e) transporting a portion of the separated ionized molecules through the outlet side of the chamber into a mass analyzer of a mass spectrometer device, where the chamber is in fluid connection with the mass analyzer; f) selectively isolating the portion of the separated ionized molecules in the mass analyzer according to the mass-to-charge ratios of the separated ionized molecules, thereby generating isolated ionized molecules; and g) measuring mass-to-charge ratios of the isolated ionized molecules, thereby generating mass spectrometry data. In an embodiment, transporting a portion of the separated ionized molecules into the mass analyzer comprises directing a continuous beam of ionized molecules or a discontinuous beam of ionized molecules to the mass analyzer. Optionally, an online separation or purification step is not performed on the mixture of molecules or ionized molecules other than the ion mobility separation. If desired, offline separation or purification procedures, including but not limited to immunoprecipitation, antibody capture, and offline fractionation, may be performed; however, in an embodiment, a separation or purification step is not performed on the mixture of molecules prior to ionizing the molecules. In an embodiment, an online liquid chromatography (LC) is not performed on the mixture of molecules prior to ionizing the molecules or on the ionized molecules. In an embodiment, the mixture of molecules comprises the complete proteome, lipidome, or metabolome of a cell. Preferably, the method further comprises quantifying the amount of one or more target species in the sample.

Preferably, the mixture comprises 1,000 or more target species of molecules and the method is able to analyze 1,000 target species or more per hour by generating mass spectrometry data from each of the 1,000 or more target species. As used herein, a "target species" refers to a unique and distinct molecule found in the sample or mixture having a different sequence, composition, or structure from other molecules. Each target species in the sample or mixture will have a different ion mobility and/or mass-to-charge ratio when analyzed. In an embodiment, target species include complete proteins, lipids, carbohydrates, and metabolites found in a cell, as well as fragments of such molecules generated through enzymatic or chemical digestion. For example, a protein may be digested to produce two or more polypeptides (i.e., two or more target species) having different amino acid sequences from one another. Optionally, the mixture comprises 2,000 or more target species of molecules, 5,000 or more target species of molecules, 10,000 or more target species of molecules, 20,000 or more target species of molecules, 40,000 or more target species of molecules, or 100,000 or more target species of molecules. In an embodiment, the method is able to analyze 5,000 target species or more per hour, or 10,000 target species or more per hour, by generating mass spectrometry data from each of the target species.

The mixture can comprise any type of molecules able to be analyzed by mass spectrometry including but not limited to polypeptides, lipids, metabolites or combinations thereof. In an embodiment, the mixture contains biomolecules obtained from a cell or tissue, such as a cell lystae. Preferably, a whole cell lysate is ionized to generate the ionized molecules. In an embodiment, the mixture of molecules is a peptide mixture obtained by digesting a sample or mixture of proteins. Preferably, the method comprises digesting a protein mixture to generate an unseparated mixture of molecules; and ionizing the unseparated mixture of molecules thereby generating the ionized molecules. As used herein, a whole cell lysate, an unseparated sample, an unseparated mixture of molecules, and an unseparated mixture of polypeptides refer to a cell lysate, a sample, a mixture of molecules, and a mixture of polypeptides, respectively, that has not undergone a separation or purification process to remove molecules from the lysate or mixture prior to ionization.

Optionally, the mixture of molecules comprises a lipidome or a metabolome, including but not limited a full lipidome or a full metabolome and an unfractionated lipidome or an unfractionated metabolome, of an organism. Optionally, the peptide mixture is a proteome, including but not limited full proteomes and unfractionated proteomes, of an organism. Preferably, the proteome is a human proteome.

In an embodiment, also referred to herein as Direct Infusion—Shotgun Proteome Analysis (DI-SPA), the invention provides a method of using gas-phase separation for shotgun proteomic analysis (see also, Meyer et al., Nat. Methods, 17(12), 1222-1228 (2020)). "Shotgun proteomics" refers to the direct analysis of complex protein mixtures after one or more proteins have been digested into peptides by a protease, to rapidly generate a profile of the protein complement within the mixture.

In an embodiment of the invention, the present invention provides a method for analyzing a proteome comprising the steps of: a) collecting a portion of a proteome from a cell; b) digesting the portion of the proteome to form a mixture of polypeptides; c) ionizing the mixture of polypeptides thereby generating ionized polypeptides; d) transporting the ionized polypeptides from an inlet side of a chamber to an outlet side of a chamber, wherein the chamber comprises a buffer gas and the ionized polypeptides are transported through the buffer gas; e) applying an electric field to the ionized polypeptides being transported through the buffer gas, and separating the ionized polypeptides according to ion mobility of the ionized polypeptides; f) transporting a portion of the separated ionized polypeptides through the outlet side of the chamber into a mass analyzer of a mass spectrometer device, wherein the chamber is in fluid connection with the mass analyzer; g) selectively isolating the portion of the separated ionized polypeptides in the mass analyzer according to the mass-to-charge ratios of the separated ionized polypeptides, thereby generating isolated ionized polypeptides; and h) measuring mass-to-charge ratios the isolated ionized polypeptides, thereby generating mass spectrometry data. In an embodiment, transporting a portion of the separated ionized molecules into the mass analyzer comprises directing a continuous beam of ionized molecules or a discontinuous beam of ionized molecules to the mass analyzer. Optionally, an online separation or purification step is not performed on the mixture of molecules or on the ionized molecules other than the ion mobility separation. Optionally, a separation or purification step is not performed on the mixture of polypeptides prior to ionizing the molecules (i.e., the mixture of polypeptides is an unseparated mixture of polypeptides). In a particular embodiment, an online liquid chromatography (LC) step is not performed on the mixture of molecules prior to ionizing the molecules or on the ionized molecules. In an embodiment, the mixture of molecules comprises the complete proteome of a cell. Preferably, the method further comprises quantifying the amount of one or more polypeptides in the sample.

The mass analyzer used to isolate a portion of the gas-phase separated ionized molecules according to their mass-to-charge ratios, can be any component or device used in mass spectrometry, including but not limited to a time-of-flight mass analyzer, a quadrupole mass analyzer, a quadrupole ion trap, or an orbitrap. Preferably, the chamber is an integrated component of a mass spectrometer device so that large numbers of ions can be directly transported from the chamber into the mass analyzer. The methods of the present invention are compatible with MS1 and MS2 (tandem mass spectrometry) analysis. In an embodiment, single-stage mass spectrometry (MS1) analysis is performed on the separated ionized molecules. In an embodiment, the method further comprises fragmenting the isolated ionized molecules, thereby generating fragment ions, and measuring the mass-to-charge ratios of the fragment ions.

The present invention also provides methods for analyzing the mass spectrometry data. In an embodiment, mass spectrometry data generated by one or more of the methods described herein include a generated spectrum which contains a plurality of peaks corresponding to measured mass-to-charge ratios of the isolated ionized molecules. The plurality of peaks in a generated spectrum are characterized by one or more signal parameters, including but not limited to the total number of peaks in the spectrum, the m/z ratios of one or more peaks in the spectrum, the intensity of the one or more peaks, and combinations thereof. In an embodiment, the generated mass spectrometry data further comprises ion mobility data, including but not limited to the time when the separated ions were collected, the order the separated ions were collected, and the separation conditions using the electric field, such as the strength of the electric field or fields applied to the ionized molecules, the duration each electric field was applied, temperature, composition of the buffer gas, distance traveled by the ionized molecules during separation, and combinations thereof. Thus, the mass spectrometry data (e.g., mass-to-charge ratios) obtained from one or more ionized molecules can be further annotated with the ion mobility data for that ionized molecule to provide more accurate and complete identification. For example, the mass-to-charge ratios generated from an ionized molecule can be taken with the time the ionized molecule was collected during separation and compared with corresponding measurements in a reference database of compounds in order to identify the ionized molecule. The use of the ion mobility data provides at least one additional data point that can confirm a potential identification or eliminate potential candidate compounds for identification. Optionally, the ion mobility data comprises the time when the separated ionized molecules used to generate the mass-to-charge ratios are collected and transported to the mass analyzer, an order separated ions were collected, voltage used to separate the ionized molecules, or combinations thereof.

Preferably, the generated spectrum and/or mass spectrometry data is compared with one or more reference spectra and/or reference compound data from a reference spectra library or database in order to identify one or more molecules from the sample that produced the mass spectrometry data. Optionally, the reference database is an in-silico or computational generated database. In an embodiment, one or more peaks from the generated spectrum (with or without the additional ion mobility data) is compared to peaks from the one or more reference spectra. Optionally, multiple reference spectra are consolidated or pooled together so that the peaks from the generated spectrum can be compared more quickly. For example, an embodiment of the invention comprises the steps of a) assigning a spectrum tag to each peak from at least two selected reference spectra from the one or more reference spectra; b) combining the at least two selected reference spectra to form a consolidated reference spectrum; c) comparing the one or more peaks from the generated spectrum with each peak in the consolidated reference spectrum; and d) identifying a target peak from the consolidated reference spectrum that matches a peak from the generated spectrum using the spectrum tag. Preferably, the peaks from the generated spectrum and reference spectra are annotated with ion mobility data and the comparison further comprises comparing the ion mobility data of the generated spectrum and reference spectrum. In an embodiment, multiple generated spectra are similarly consolidated together and compared with one or more reference spectra.

In a further embodiment, matched peaks between the generated spectrum (or spectra) and the one or more reference spectra can be provided a scoring value, where one or more molecules in the sample are identified based on the scoring value provided to the matched peaks from the generated spectrum.

In an embodiment of the invention, the present invention provides a method for analyzing a sample comprising one or more molecules using mass spectrometry, where the method comprises introducing the sample to an ionization source, thereby generating one or more ionized molecules. An ion filtering step is performed on the molecules after ionization using ion mobility. The filtering step comprises selectively transmitting a first portion of ionized molecules to a mass analyzer, where ionized molecules within the transmitted first portion of ionized molecules have an ion mobility within a first predefined ion mobility range. Only ionized molecules having an ion mobility within this range will be transmitted for further analysis at this stage. A mass filtering step is then performed on the transmitted ionized molecules, where the mass filtering step comprises selectively isolating a first distribution of transmitted ions from the transmitted first portion of ionized molecules. The isolated first distribution of transmitted ions have a mass-to-charge ratio within a predefined mass-to-charge ratio range, which may be selected by an operator and/or based on target molecules expected to be found in the sample. In an embodiment, the method further comprising enzymatically digesting or lysing the sample prior to introducing the sample to the ionization source.

Preferably, the sample does not undergo an additional online separation or purification process, such as liquid chromatography, other than the ion filtering step. As a result, the preparation (i.e., ionization) of the sample, separation or purification of the resulting ionized molecules, and analysis of the separated ionized molecules may be performed in the same system, where the instruments and/or components are in fluid communication with one another. However, if desired, offline separation or purification procedures, including but not limited to immunoprecipitation, antibody capture, and offline fractionation, may be performed.

In an embodiment, the sample is an unseparated sample or a whole cell lysate that has not undergone a separation or purification process, such as liquid chromatography, to remove molecules from the sample prior to ionization. As a result, the sample can be provided to the ionization device directly or in an essentially continuous manner without a pre-separation step.

The selected range for the ion mobility may be any range selected by the operator and may vary depending on the sample and the potential target species of molecules that are being analyzed for. Preferably, the range of possible ion mobility values is subdivided into smaller ranges and multiple filtering steps are performed in order to separately transmit and analyze ionized molecules from each of these smaller ranges. For example, the ion filtering step further comprises selectively transmitting a second portion (or third portion, fourth portion, fifth portion, etc.) of ionized molecules to a mass analyzer, wherein ionized molecules within the second portion (or third portion, fourth portion, fifth portion, etc.) of ionized molecules have an ion mobility within a second (or third, fourth, fifth, etc.) predefined ion mobility range. The ion filtering step may produce a continuous beam comprising the first and optionally second (and third, and fourth, etc.) portions of ionized molecules, which are transmitted to the analyzing device. Alternatively, the ion filtering step may produce a discontinuous beam. For example, the first portion of ionized molecules transmitted to the analyzing device is present in a first segment of the discontinuous beam, the second portion of the ionized molecules is present in a second segment of the discontinuous beam, etc.

Multiple mass filtering steps likewise may be performed, such as where the mass filtering step comprises selectively isolating a second distribution (or third distribution, fourth distribution, fifth distribution, etc.) of transmitted ions from the transmitted second (or third, fourth, fifth, etc.) portion of ionized molecules, wherein the isolated second (or third, fourth, fifth, etc.) distribution of transmitted ions have a mass-to-charge ratio within a second (or third, fourth, fifth, etc.) predefined mass-to-charge ratio range. The mass-to-charge ratios of the isolated second (or third, fourth, fifth, etc.) distribution of transmitted ions is recorded to generate the mass spectrometry data. In an embodiment, the ion filtering and mass filtering steps are each performed 5 or more times, 10 or more times, 20 or more times, 30 or more times, 50 or more times, 100 or more times, or 200 or more times to analyze different target species of molecules from the same sample.

Optionally, both MS1 and MS2 data may be collected with the methods described herein. For example, a further embodiment comprises fragmenting the isolated distribution of transmitted ions, thereby generating product ions, and recording the mass-to-charge ratios of the product ions, where the generated mass spectrometry data includes the mass-to-charge ratios of the first product ions. In embodiments where multiple ion filtering steps are performed, fragmentation steps may also be performed on each set of the isolated distribution of transmitted ions.

In a further embodiment, mass spectrometry data is generated from the mass-to-charge ratios of the isolated distribution or distributions of transmitted ions, and is compared with one or more reference mass spectrometry data from a reference database, which is optionally an in-silico or computational generated database. By comparing the generated and reference mass spectrometry data, one or more molecules from the sample are identified as corresponding to a compound from the reference database. Additionally, the one or more molecules in the sample may further be quantified from the mass spectrometry data. In an embodiment, mass spectrometry data comprises a generated spectrum which contains a plurality of peaks corresponding to measured mass-to-charge ratios of the isolated ionized molecules. One or more peaks from the generated spectrum are compared to peaks from one or more reference spectra. Optionally, multiple reference spectra are consolidated or pooled together for faster comparisons. An embodiment of the invention comprises the steps of a) assigning a spectrum tag to each peak from at least two selected reference spectra from the one or more reference spectra; b) combining the at least two selected reference spectra to form a consolidated reference spectrum; c) comparing the one or more peaks from the generated spectrum with each peak in the consolidated reference spectrum; and d) identifying a target peak from the consolidated reference spectrum that matches a peak from the generated spectrum using the spectrum tag.

Preferably, the generated mass spectrometry data further comprises ion mobility data, as described previously, as is compared with ion mobility data from the reference database in order to provide more accurate and complete identification of molecules in the sample. In an embodiment, the ion mobility data comprises: time when the separated ionized molecules used to generate the mass-to-charge ratios are collected and transported to the mass analyzer, an order separated ions were collected, voltage used to separate the ionized molecules, or combinations thereof.

Preferably, the unseparated sample comprises 1,000 or more target species of molecules and the method is able to analyze 1,000 target species or more per hour by generating mass spectrometry data (including ion mobility data) from each of the 1,000 or more target species. Optionally, the mixture comprises 2,000 or more target species of molecules, 5,000 or more target species of molecules, 10,000 or more target species of molecules, 20,000 or more target species of molecules, 40,000 or more target species of molecules, or 100,000 or more target species of molecules. In an embodiment, the method is able to analyze 5,000 target species or more per hour, or 10,000 target species or more per hour by generating mass spectrometry data from each of the target species.

In an embodiment, gas-phase separation is used in high throughput analysis of peptide mixtures from cultured human cells during drug screening or potential treatments of toxins or medical conditions. The present invention is also useful for the analysis of large numbers of patient samples required for the discovery of biomarkers, as well as for screening large cohorts of clinical samples, such as patient plasma, as part of clinical trials or prospective studies.

Targeted quantification of up to 525 proteins was performed using y-type ion signals from co-fragmentation of heavy and light SILAC pairs by DI-SPA. The boxplots show the median (percentile 50%) with a line, and the box represents the inner quartile range (IQR) Q1 and Q3 (percentiles 25 and 75). Whiskers show Q1−1.5*IQR and Q3+1.5*IQR.

Figure 4:
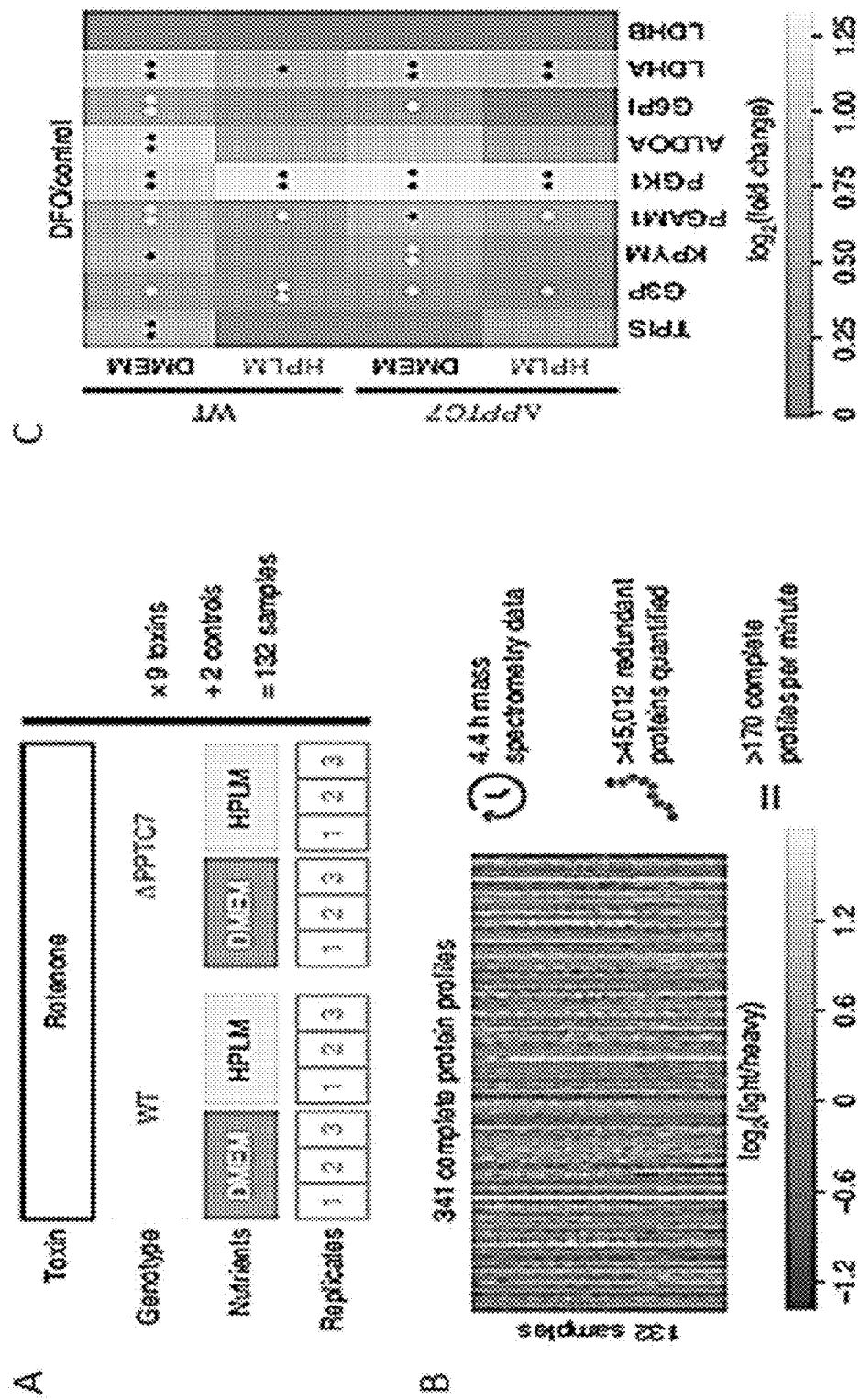
Figure 4:
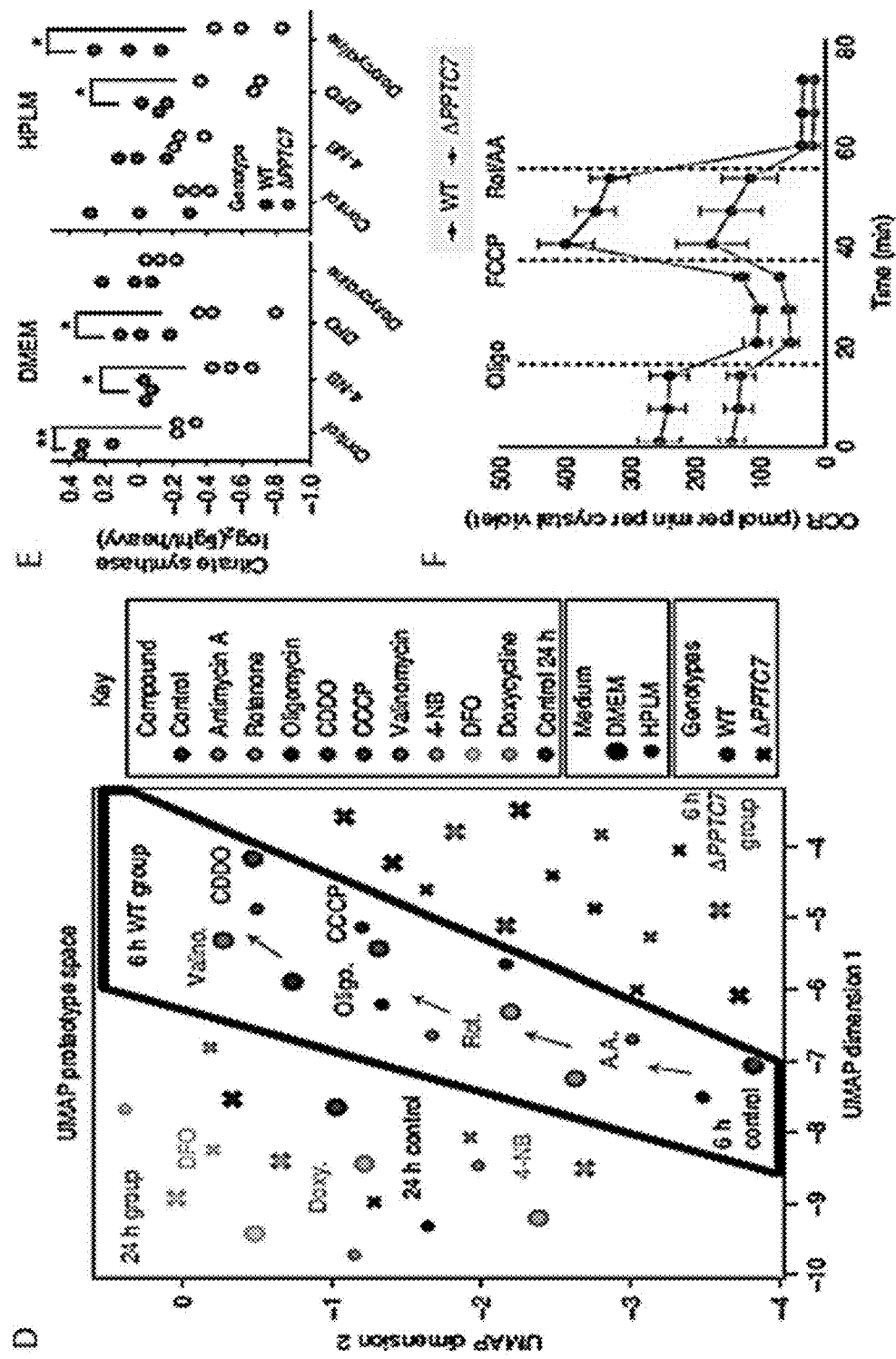

FIG. 4. Application of DI-SPA for rapid screening of human cellular responses to toxins. (Panel A) Scheme of multi-factorial experiment design quantifying changes resulting from toxins, genotypes, nutrient composition. (B) Overview of complete dataset containing over 45,000 quantified proteins (including repeated measures of the same protein in different samples). (C) Glycolytic proteins quantified by DI-SPA were almost uniformly upregulated due to DFO stress versus controls across all genetic backgrounds and nutrient conditions. p-values are from independent two-sided t-tests assuming equal variance corrected for multiple hypothesis with the Benjamini-Hochberg false discovery rate (FDR) correction, *corrected p-value<0.05, **corrected p-value<0.01. (D) UMAP dimension reduction of the proteomic profiles from all 44 conditions showing relationships between mitochondrial toxin treatments. (E) Quantitative ratios of citrate synthase, a mitochondrial marker, across all 24-hour treatments and controls. p-values are from Welch's independent two sample, two-sided t-test, and not corrected for multiple hypotheses *p-value<0.05, **p-value<0.01. Exact p-values from left to right, DMEM: 0.0035, 0.014, 0.048, 0.15, HPLM: 0.19, 0.064, 0.034, 0.013. (F) Oxygen consumption rates (OCR) from Seahorse mitochondria stress test of WT and PPTC7 KO 293T cells shows global decrease in mitochondrial activity of KO cells in agreement with the results from DI-SPA. n=11 biologically independent wells of cells over one independent experiment. Error bars are standard deviation.

Figure 5:
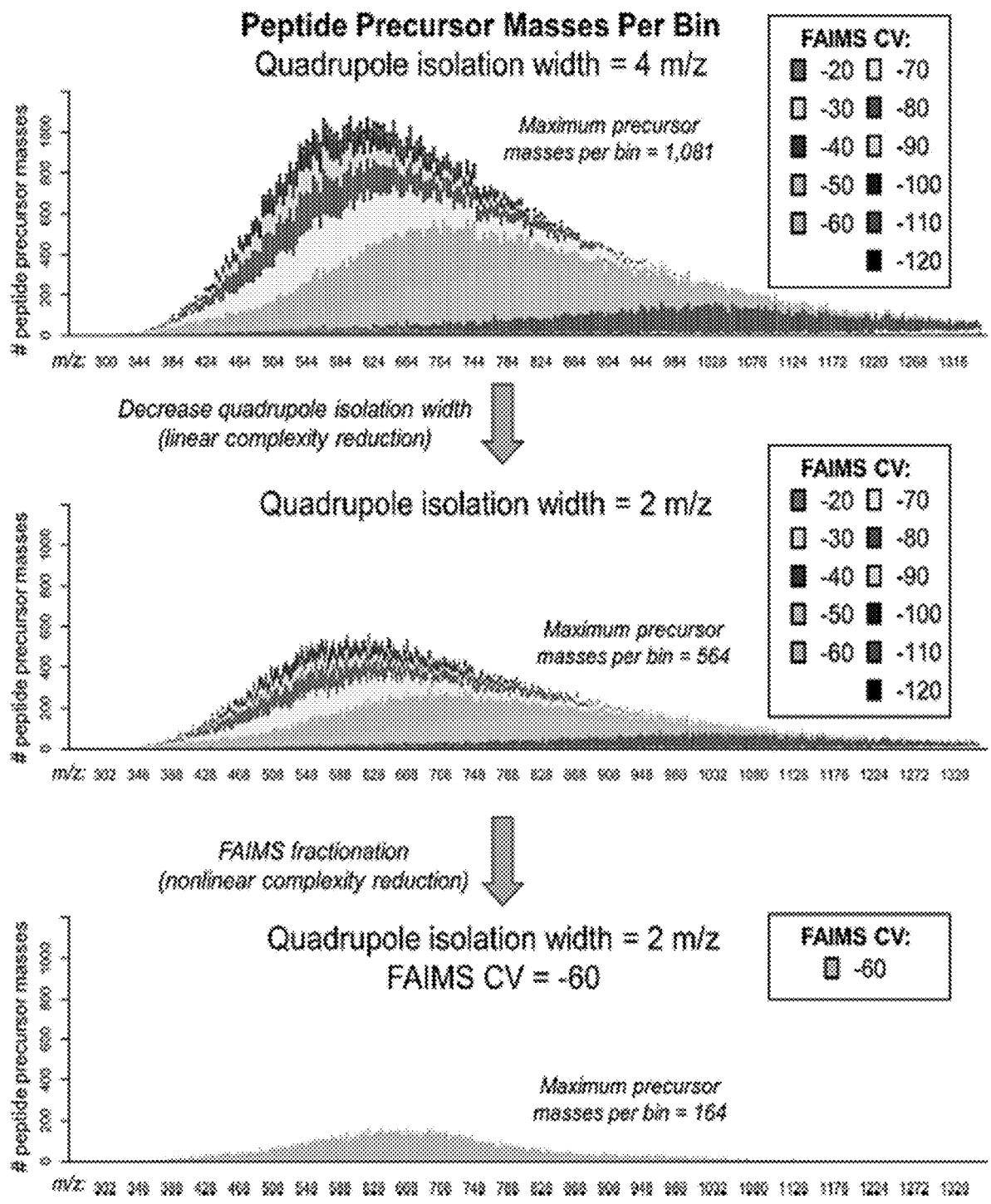

FIG. 5. Theoretical Analysis of Peptide Complexity Reduction by Gas-phase Fractionation quadrupole isolation width and FAIMS compensation voltage (CV). This analysis uses the maximum CV signal for all peptide precursor masses identified from stepped CV analysis of the human proteome. Stacked barplots show the number of peptide precursor masses per bin split by the contribution from each FAIMS CV fraction. The top panel shows precursor masses per 4 m/z isolation bin. The middle panel shows a roughly linear decrease in the maximum number of peptide precursor masses when the isolation width is decreased to 2 m/z. The bottom panel shows a nonlinear decrease in the number of peptide precursor masses due to selection by FAIMS gas phase fractionation at constant quadrupole isolation width.

Figure 6:
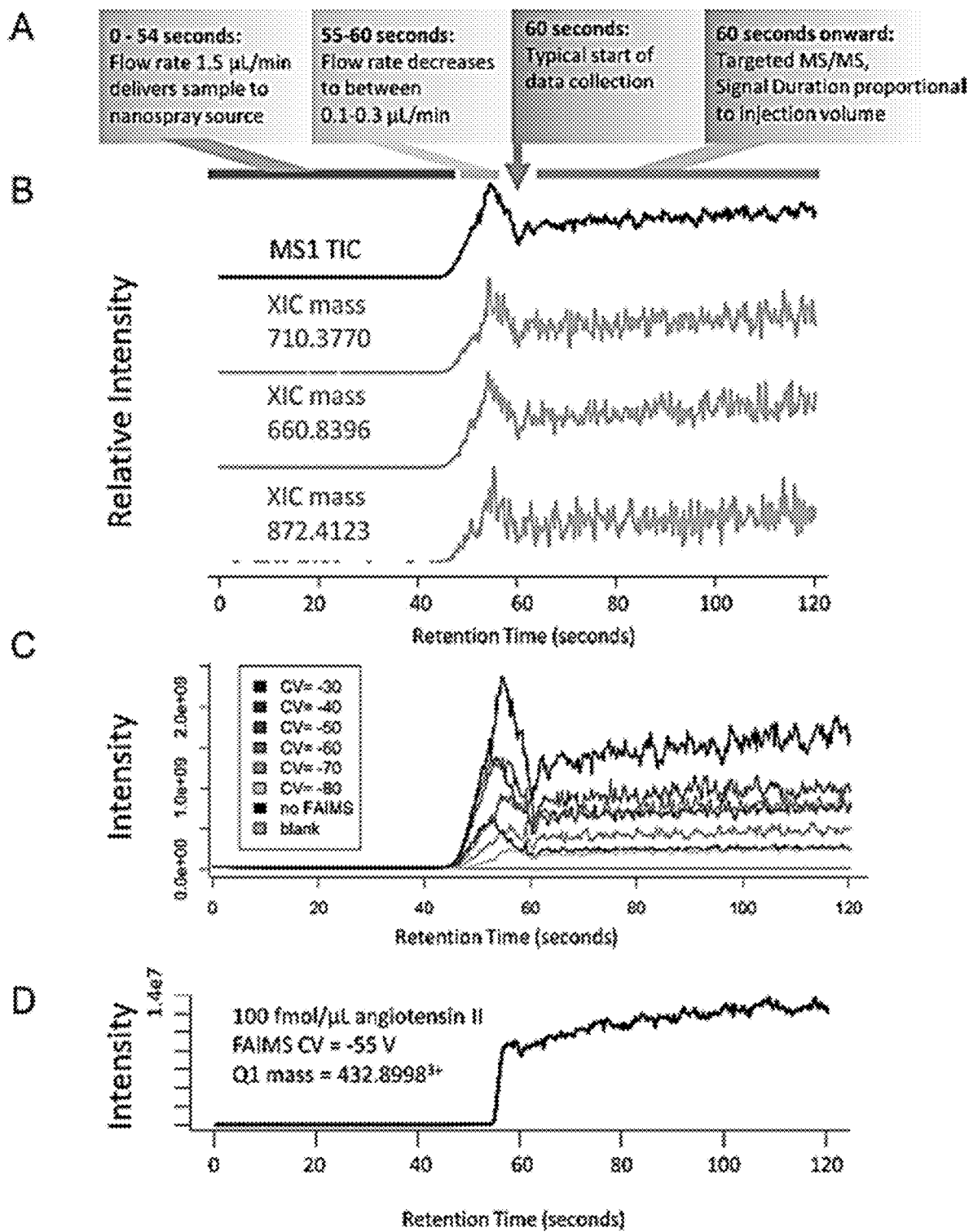

FIG. 6. Examples of infusion data traces. Tryptic peptides from the MCF7 proteome (1 mg/mL) were infused as described for DI-SPA analysis, but precursor ions (MS1) were measured. (Panel A) Description of general flowgram parameters overtime. (B) MS1 trace of the no FAIMS experiment (top) and extracted ion chromatograms of various randomly chosen multiply charged m/z values (±10 ppm) show a consistent pattern of elution for all masses. This suggests that peptides are not retained or separated. (C) Comparison of the signal from without FAIMS versus FAIMS using each CV setting from −30 V to −80 V. (D) Example flow-gram from DI-SPA-PRM-MS of 100 fmol/μL angiotensin II showing the typical smooth trace of mass and FAIMS-selected peptide precursor.

Figure 7:
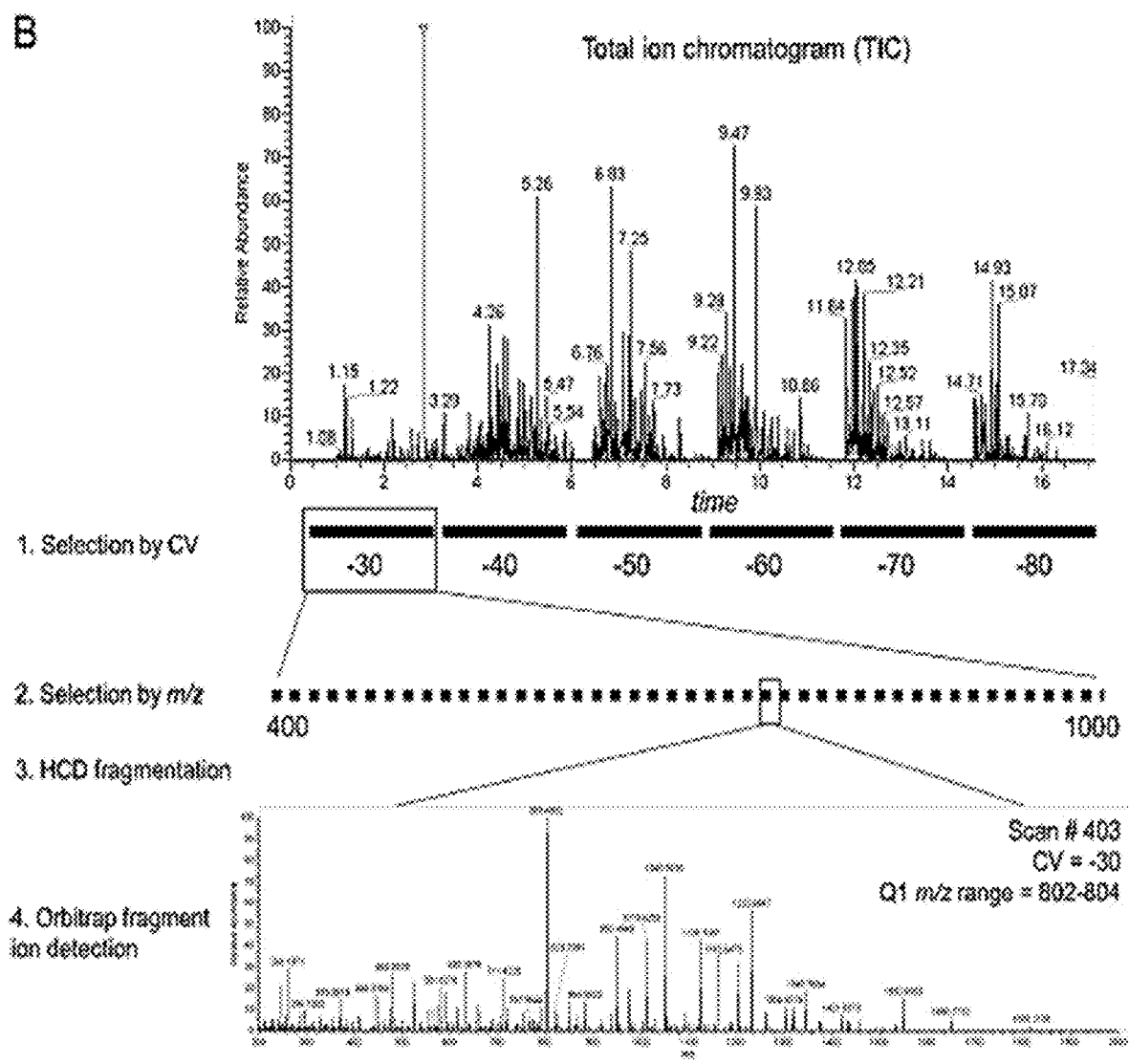

FIG. 7. DI-SPA scouting experiments for untargeted peptide identification. (Panel A) Fixed and varied parameters for each of the parameter scouting experiments in FIG. 2. Values highlighted were varied with the other values in that row fixed. (B) Schematic of scouting experiment with actual data. Peptides were directly infused into the mass spectrometer over the duration of a scouting experiment. The first selection is performed by FAIMS according to compensation voltage (CV). FAIMS CV is fixed at a value between −30 volts and −80 volts while cycling through the second selection by m/z with the first quadrupole isolation window stepped across the m/z range of interest (400-1,000 here) to isolate specific subfractions of the peptide population. The FAIMS and quadrupole-selected peptides are fragmented by HCD, and finally the fragment ions are detected in the orbitrap to produce a tandem mass spectra. No precursor ion scans (MS1) are collected. MS/MS spectra from DI-SPA are identified by spectral library search.

Figure 8:
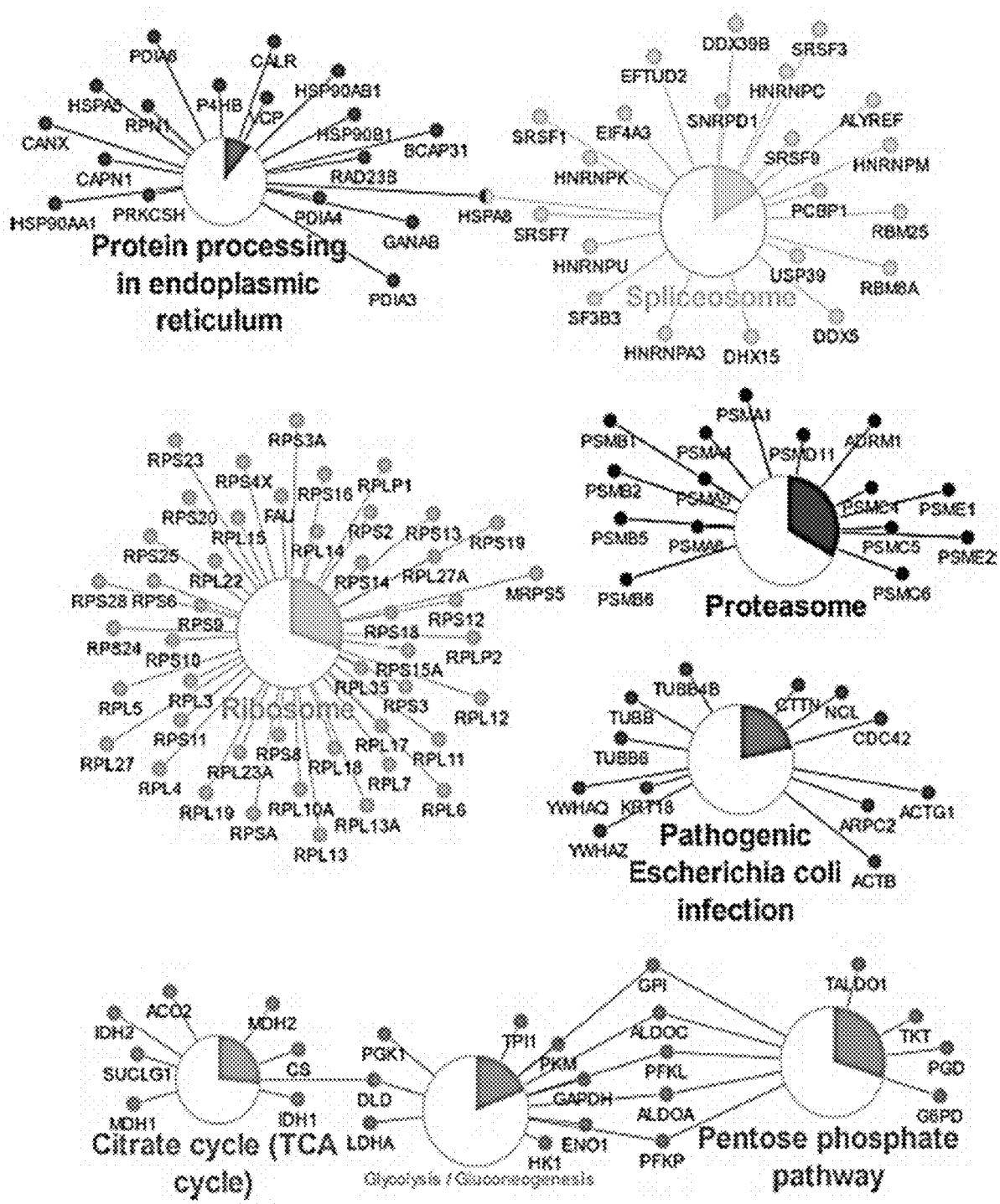

FIG. 8. Enriched KEGG pathways including all protein members of those pathways identified by DI-SPA (matching FIG. 2, panel e). Pathway enrichment analysis was done in Cytoscape with the plugin clueGO. Larger circles correspond to lower corrected p-value of term enrichment, and the colored portion of the circle gives the proportion of proteins in that pathway that were identified.

Figure 9:
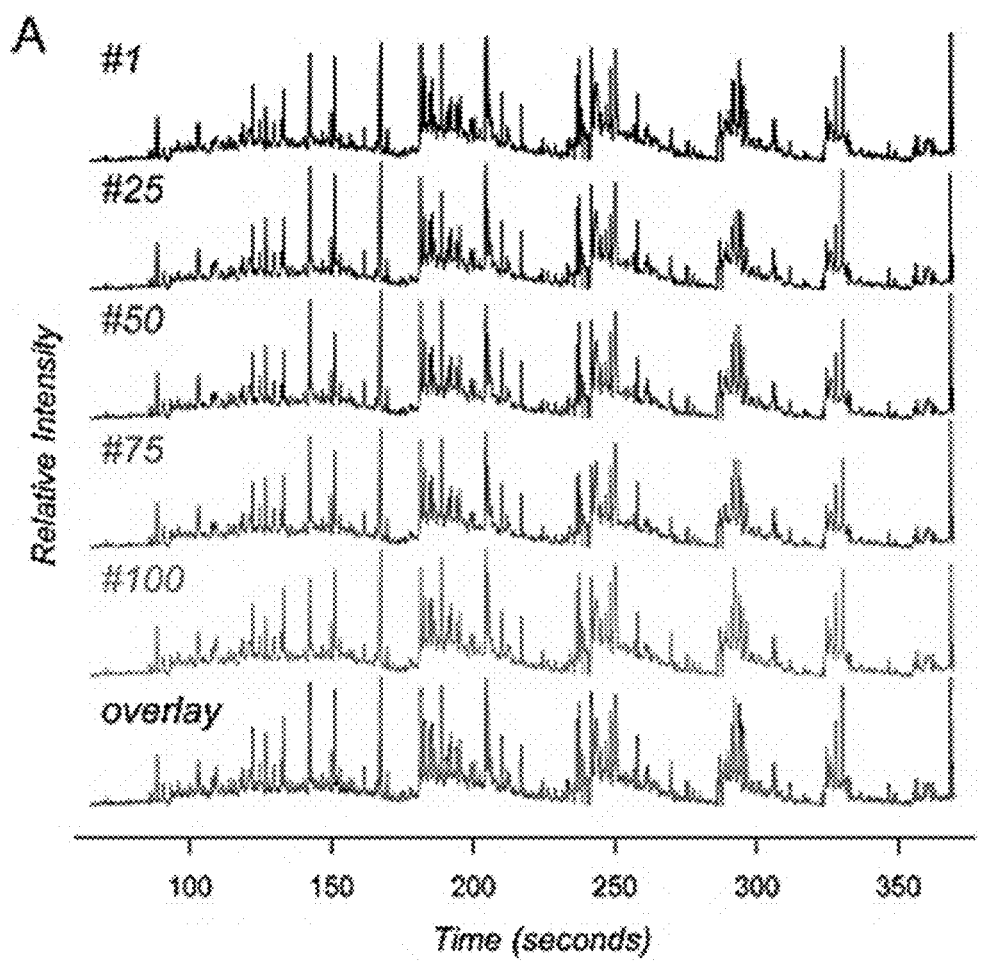
Figure 9:
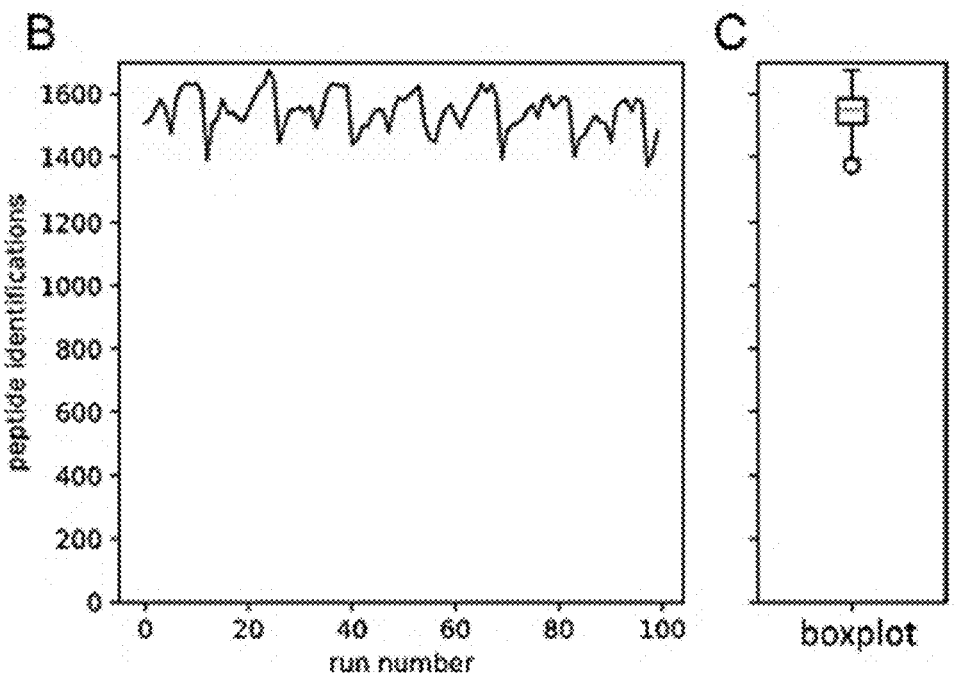

FIG. 9. Robustness and reproducibility of DI-SPA. Tryptic peptides from the MCF7 proteome (1 mg/mL) were analyzed 100 times with a shortened version of the parameter scouting method (FIG. 7). (Panel A) TIC traces of the infusion data from injection #1, #25, #50, #75, #100, and those five overlaid. (B) The number of peptide identifications from MSPLIT-DIA per analysis (FDR<0.01), and (C) the distribution of peptide identifications summarized as a boxplot. The boxplot shows the median (percentile 50%) with a line, and the box represents the inner quartile range (IQR) Q1 and Q3 (percentiles 25 and 75). Whiskers show Q1−1.5*IQR and Q3+1.5*IQR.

Figure 10:
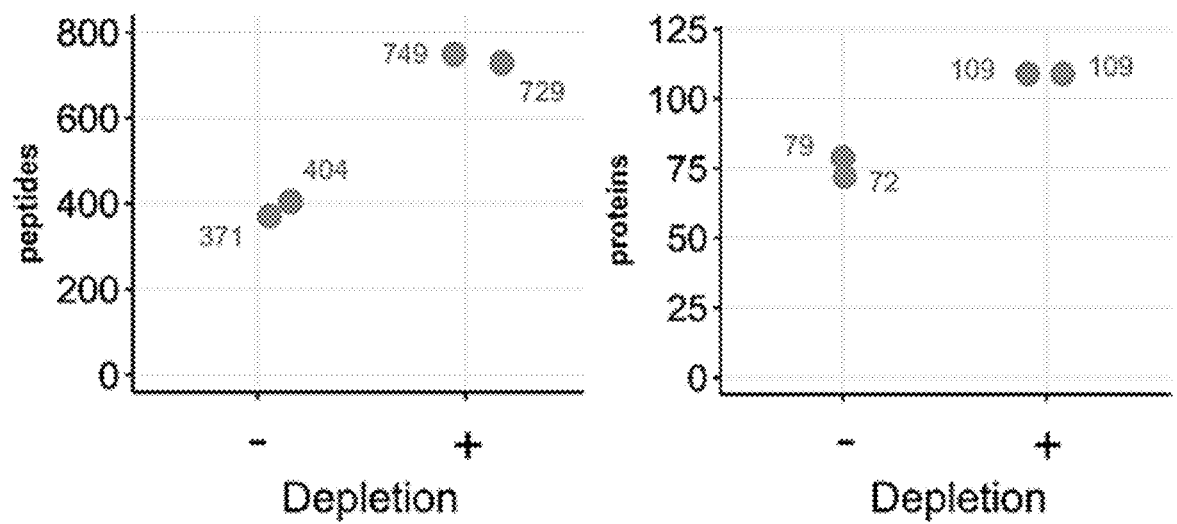

FIG. 10. Application of DI-SPA to human plasma. Two different purchased human plasma samples were analyzed by DI-SPA-MS using the parameter scouting method strategy shown in FIG. 7. The number of identifications for the two sources of human plasma were compared with and without depletion.

Figure 11:
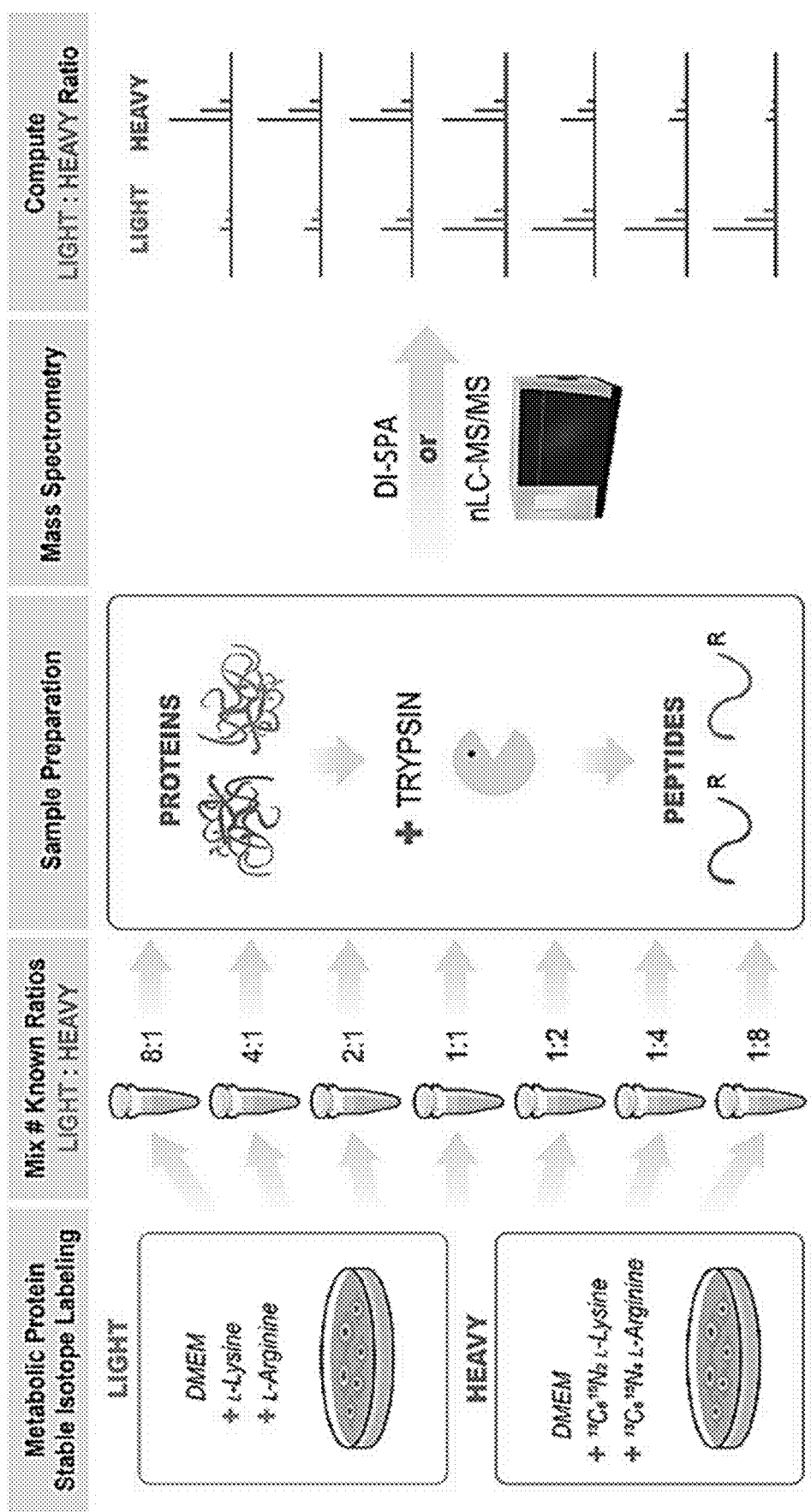

FIG. 11. Workflow for preparation of standard samples to assess quantitative DI-SPA. A549 cells were grown in DMEM media containing either light lysine and arginine (LIGHT) or $^{13}C_6$, $^{15}N_2$-lysine and $^{13}C_6$, $^{15}N_4$ L-arginine (HEAVY) and then combined at various ratios including: 1:8, 1:4, 1:2, 1:1, 2:1, 4:1, and 8:1 (HEAVY:LIGHT). Samples were then lysed proteins were reduced and alkylated, and proteolysis was initiated with trypsin. Peptides from trypsin digestion were desalted and then data was collected in parallel with either traditional nanoLC-MS/MS to verify SILAC ratios and provide a benchmark, or with DI-SPA to determine quantitative quality. Data from nanoLC-MS/MS was analyzed using MaxQuant to identify and quantify peptides, and data from DI-SPA was analyzed with MSPLIT-DIA and custom code in python and R.

Figure 12:
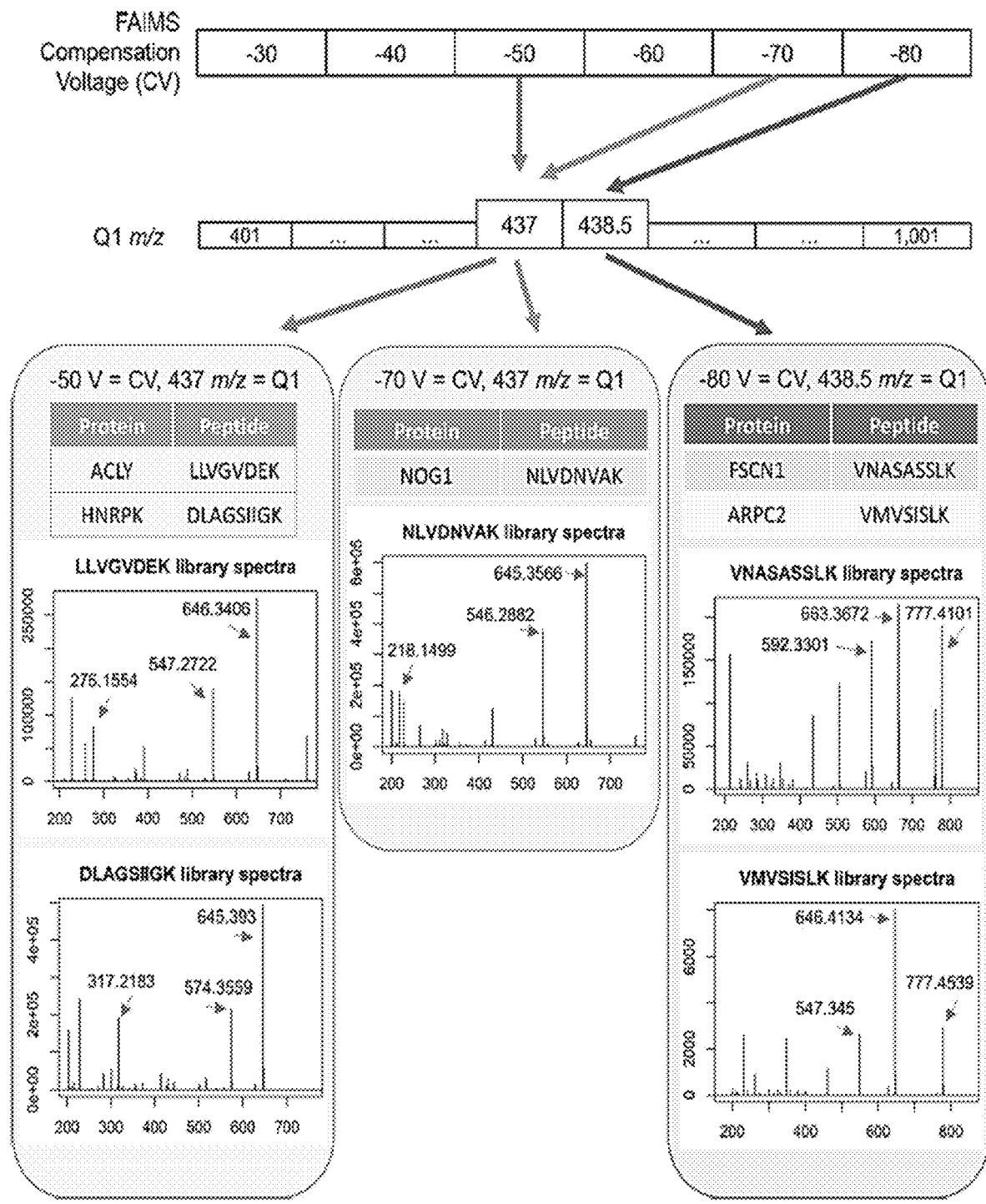

FIG. 12. Examples of relationships between DI-SPA data collection settings for different peptides and their corresponding proteins. Peptides that uniquely identify proteins are found with a combination of gas-phase fractionation by FAIMS and precursor mass isolation with the first quadrupole (Q1). In this example, two unique peptides from different proteins are co-isolated with FAIMS compensation voltage (CV) of −50 V and Q1 set to 437 m/z. A single peptide is isolated with CV of −70 V and the same Q1 setting of 437 m/z, and two more peptides are isolated with a CV of −80 V at Q1 set to 438.5 m/z. Library spectra are shown for each peptide. The three most abundant singly charged y-ions in the library spectra are used for peptide quantification unless otherwise noted.

Figure 13:
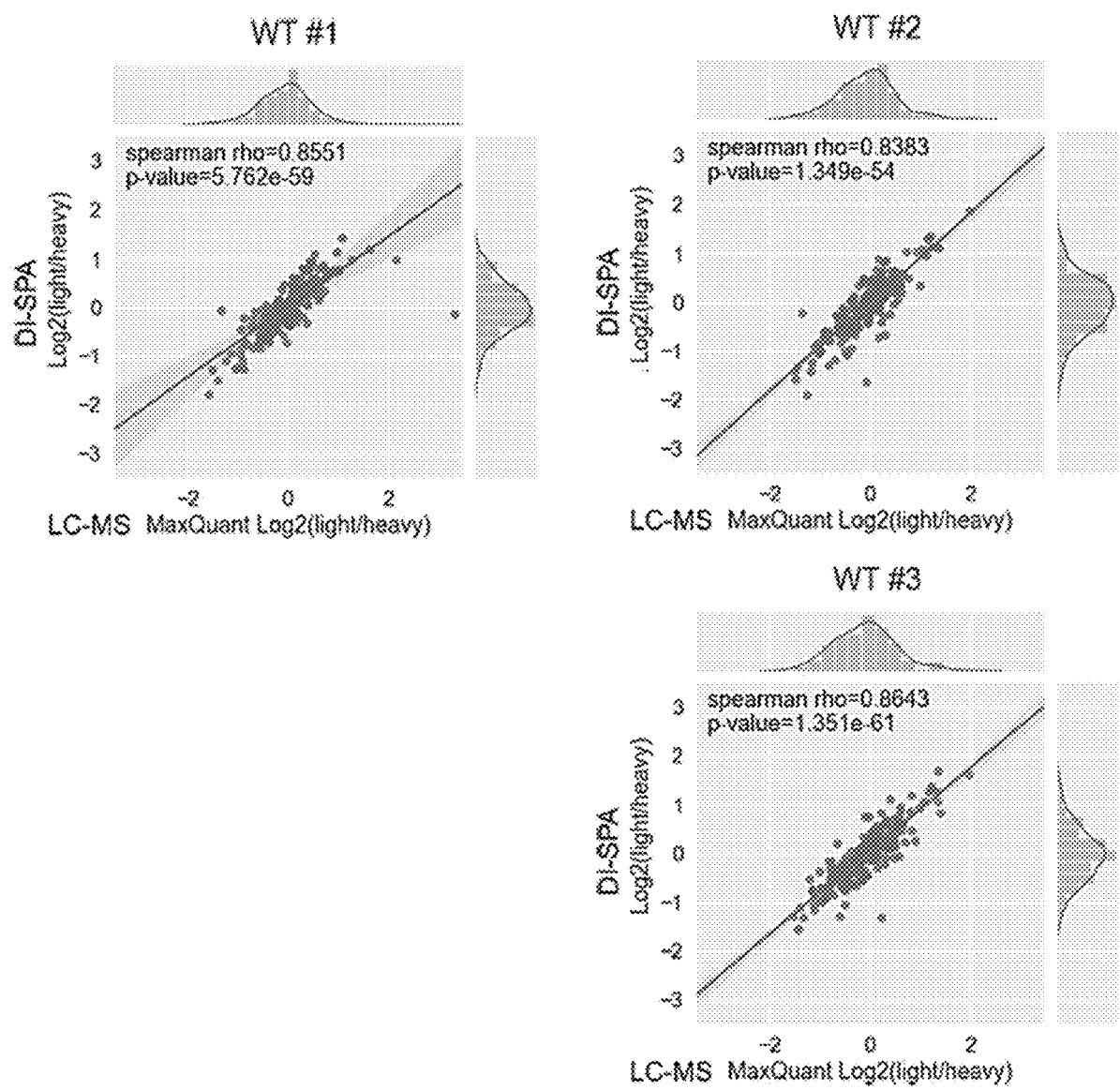

FIG. 13. Comparison of Quantification from peptides shared between LC-MS (MaxQuant) and DI-SPA analysis. Data are from peptides quantified with both methods from enriched mitochondria. Bands around the regression line show the 95% confidence interval.

Figure 14:
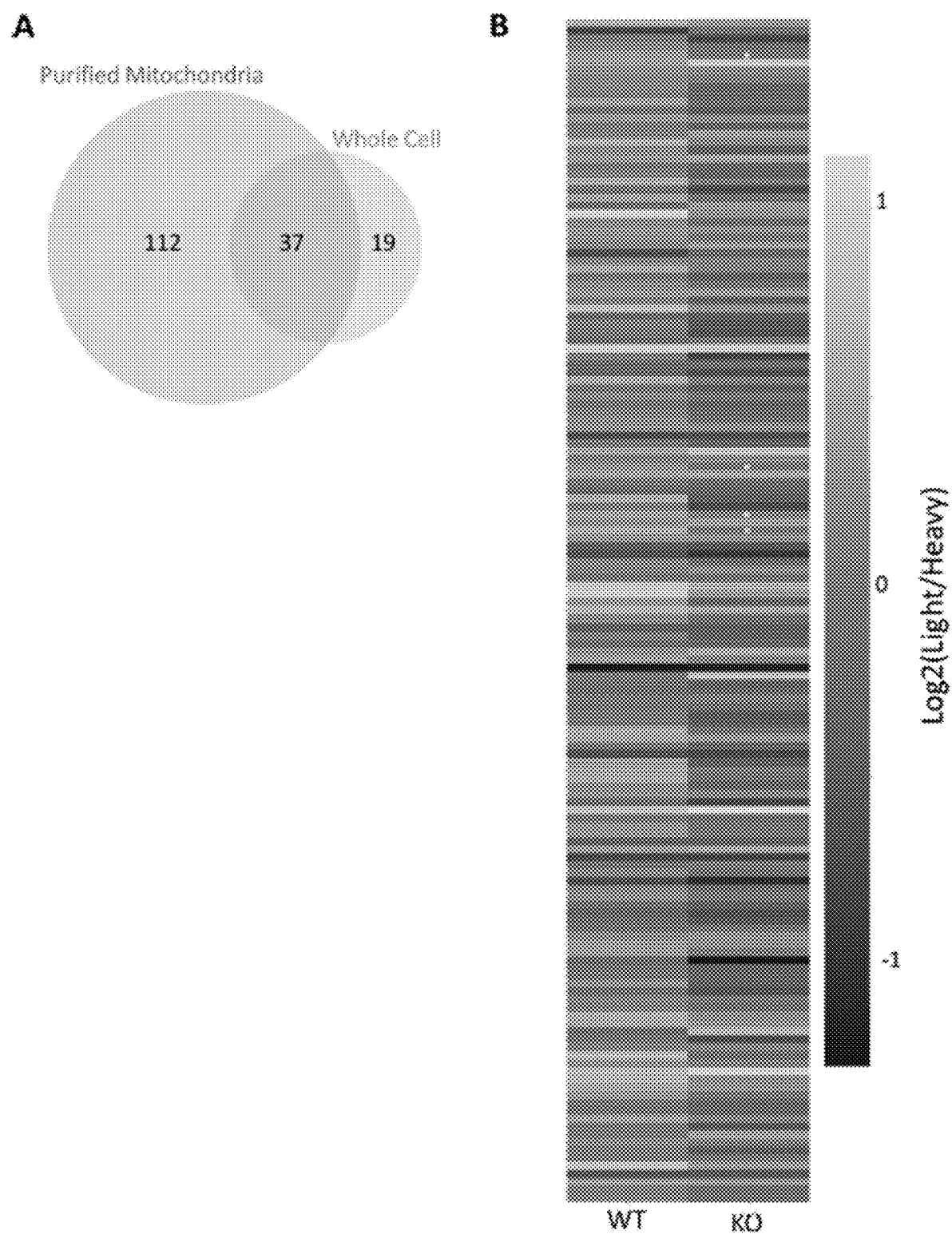

FIG. 14. DI-SPA quantification of proteins from mitochondria subcellular fractions. (Panel A) Overlap of 37 mitochondrial proteins quantified: 149 from the purified mitochondria experiment and 56 from the whole cell experiment. (B) Heatmap showing trend of general decrease in the 149 proteins annotated mitochondrial from DI-SPA analysis of the purified mitochondria. Light is the signal from the experimental condition and heavy is the signal from the SILAC standard protein. *Benjamini-Hochberg adjusted p-value<0.05, exact corrected p-values: PHB=0.023, CISY=0.023, THIL=0.036, CH10=0.036. n=3 independent biological replicates of mitochondria preparations from 293 T cells from one independent experiment. p-values are from a two-tailed T-test assuming equal variance, and corrected p-value is from Benjamini-Hochberg multiple hypothesis testing correction.

Figure 15:
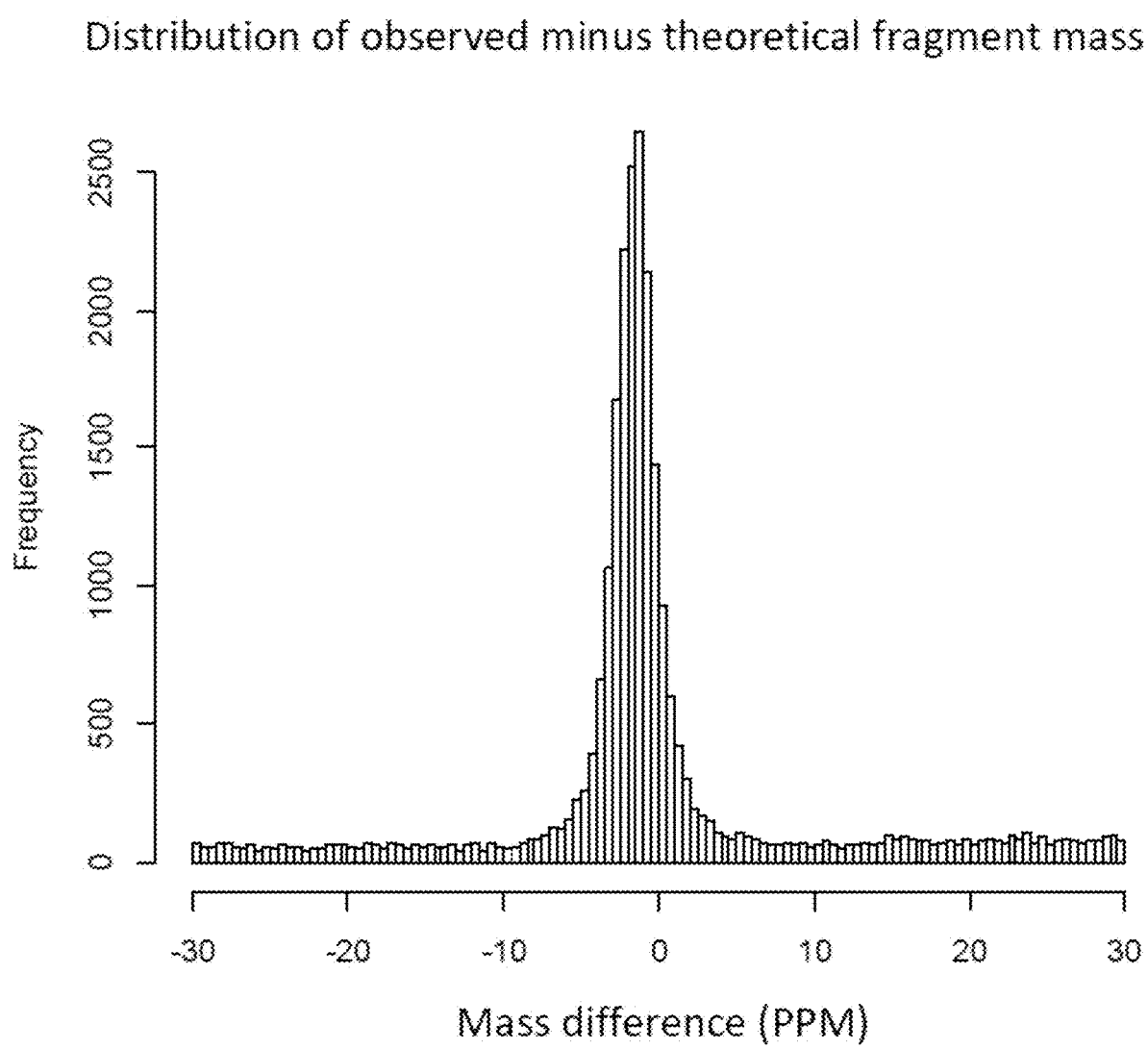

FIG. 15. Distribution of fragment ion mass errors for all 1,423 peptides identified by DI-SPA analysis with the optimal scouting conditions. Any fragment mass found 30 ppm of the predicted mass was included in this analysis. This shows that matched fragments are non-random, and that a fragment mass tolerance of 10 ppm is appropriate for identification by MSPLIT-DIA.

Figure 16:
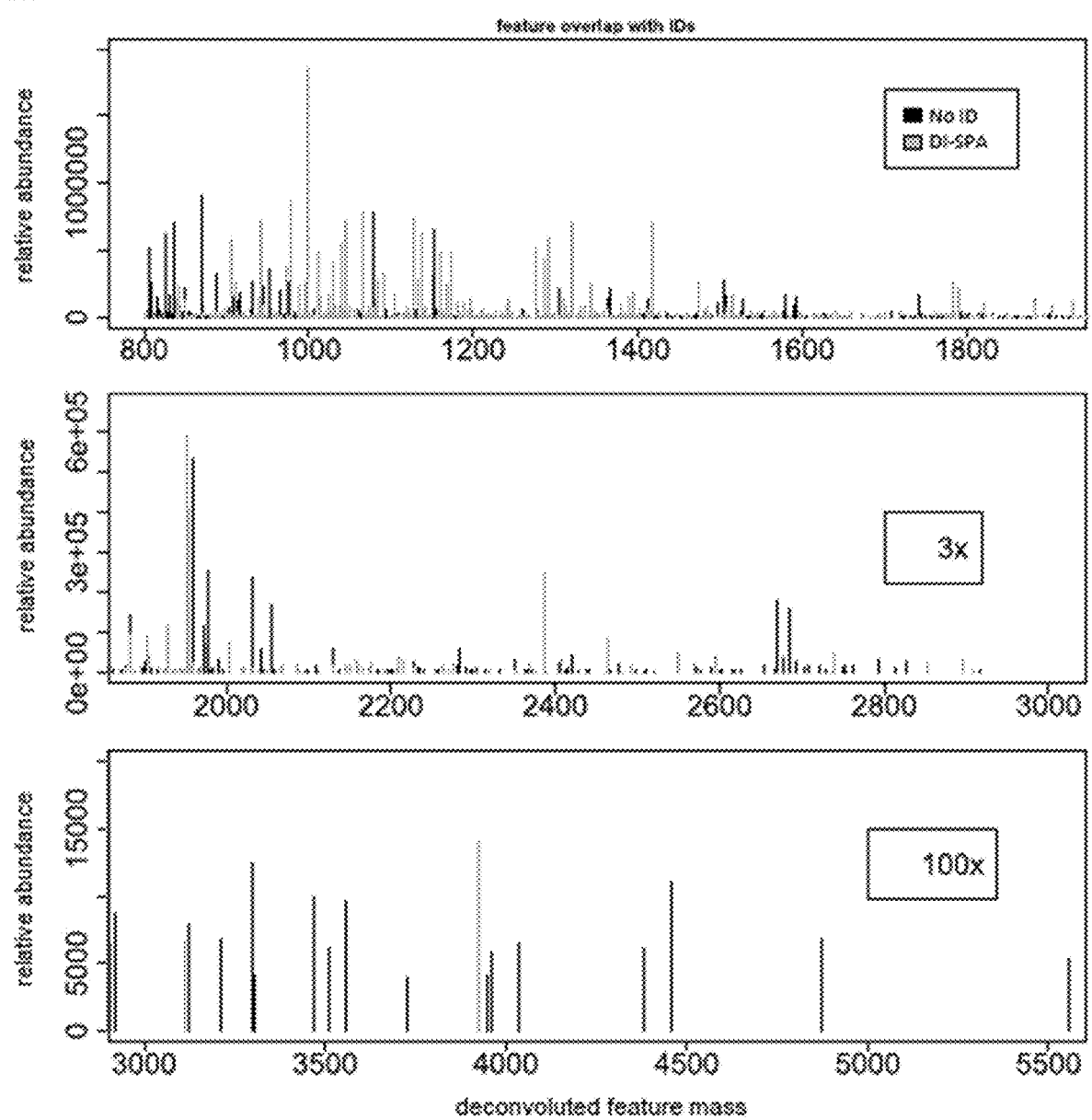

FIG. 16. Overlap of precursor ion feature masses and identified peptide masses from DI-SPA. Precursor ion (MS1) scans were performed from a range of 400-1,000 m/z with FAIMS compensation voltages of −30, −40, −50, −60, −70, and −80. THRASH was used within DeconTools software to detect precursor mass features. Feature m/z values were converted to exact masses, and then matched to exact masses of peptides identified by DI-SPA analysis of the same sample. (Panel A) Portion of peptides identified by DI-SPA that match MS1 features. (B) Overlay of MS1 feature masses detected from direct infusion with peptides identified by DI-SPA (where the second panel y-axis is zoomed 3×, and the third panel y-axis is zoomed 100×).

Figure 17:
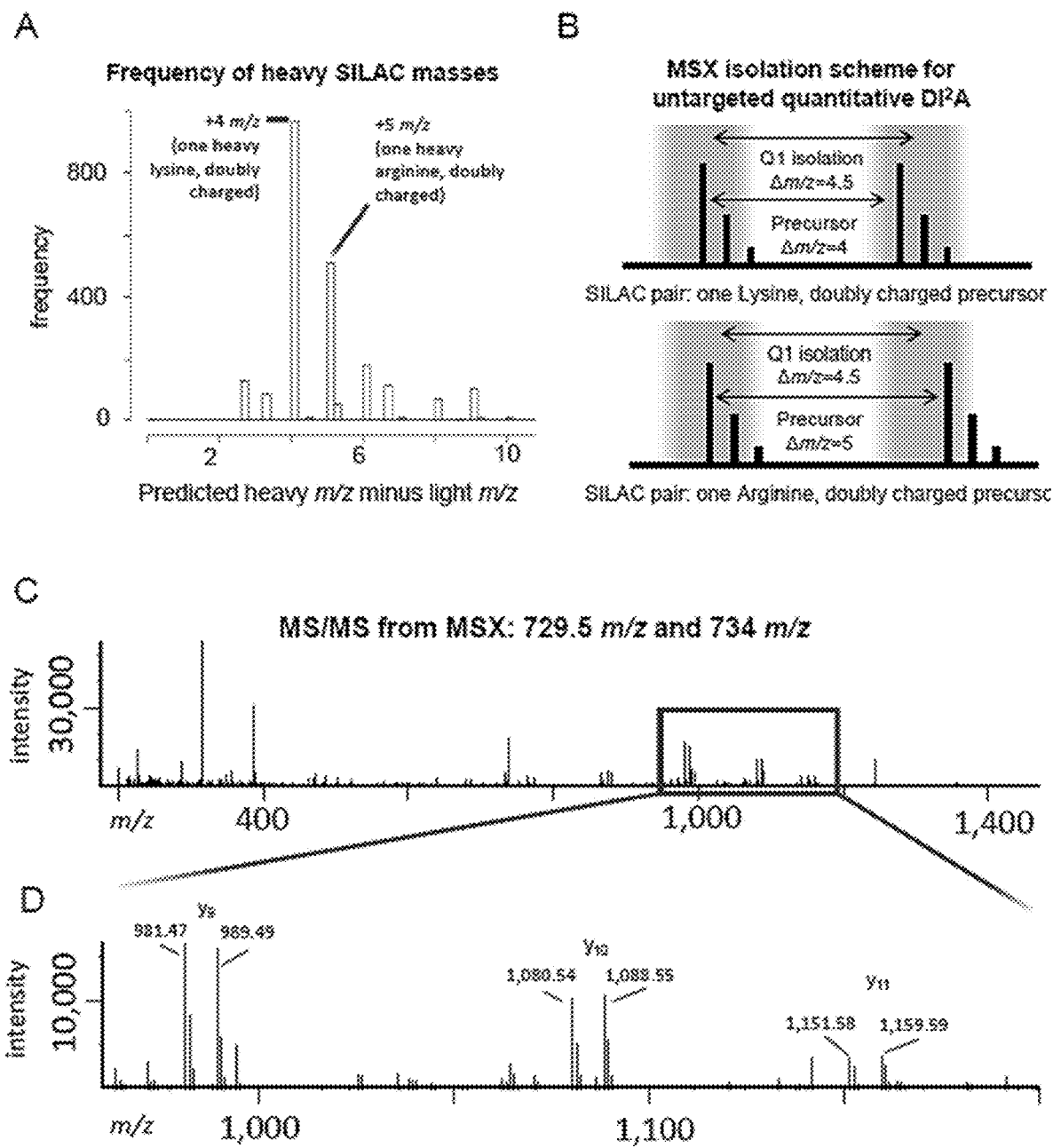

FIG. 17. Untargeted DI-SPA quantification method for SILAC-labeled proteome samples. (Panel A) Histogram of the predicted heavy peptide m/z difference for all peptides identified from one A549 SILAC sample. (B) Depiction of the multiplexed ion isolation scheme used to collect unbiased quantitative data. Based on the most common heavy SILAC partners of +4 or +5 m/z determined from (A), ion multiplexing (MSX) was used to co-isolate each possible light mass and the mass centered +4.5 m/z. Both light and heavy masses were isolated with a width of 2 m/z. (C) Exam of SILAC quantification using an MS/MS spectra for the peptide "actyl-SDAAVDTSSEITTK" from the 1:1 SILAC standard sample. (D) Close-up view of the high mass region from (C) showing the 1:1 ratio of light:heavy $y_9$, $y_{10}$, and $y_{11}$ ion pairs.

Figure 18:
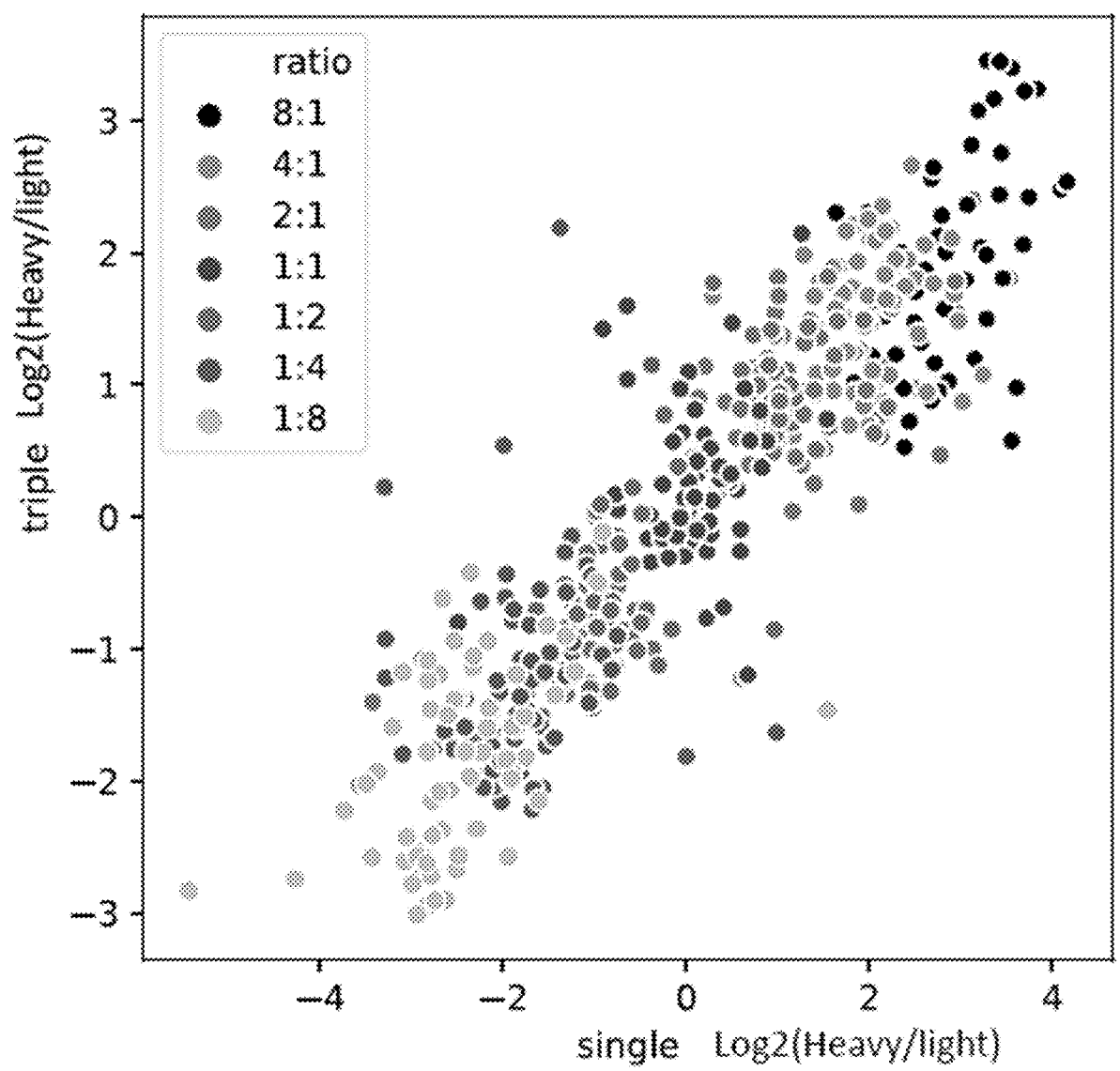

FIG. 18. Correlation between observed SILAC ratios from single measurement or triple measurement DI-SPA analysis. The same sample of peptides used in FIG. 3 was used for this analysis. For triple ratio measurement, data collection was carried out targeting only the peptides found at FAIMS CV=−60V, and each heavy/light precursor pair was co-isolated three times during data collection. Heavy/light ratios were computed the same way as described for the single ratio analysis, but the 3 ratios were averaged. The ratios determined from single measurement (x-axis) are plotted against the ratios from triple measurement (y-axis), which shows good agreement between the different measurement strategies. The points are colored by the known Heavy/Light SILAC mixing ratio of the sample.

Figure 19:
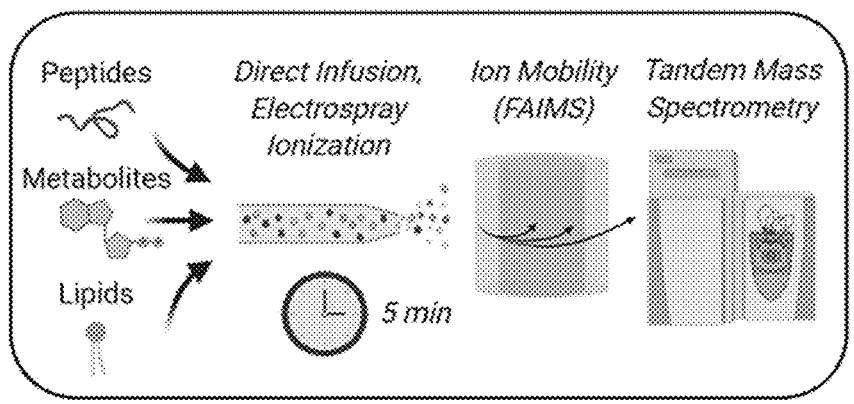

FIG. 19. Multi-Omic Data Collection. Illustration of extending DI-SPA for simultaneous multi-omic sample analysis.

Figure 20:
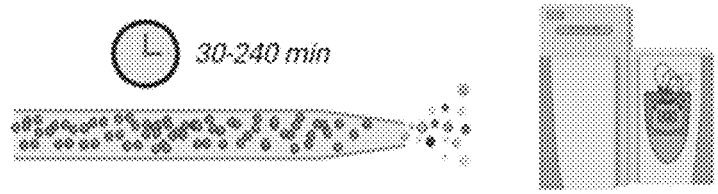
Figure 20:
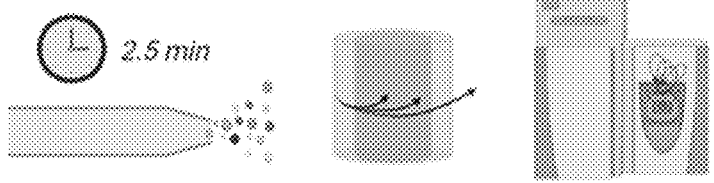
Figure 20:
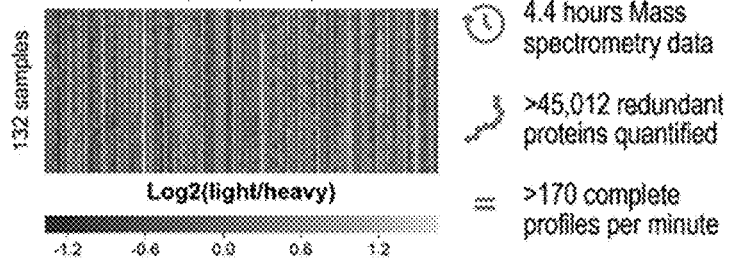
Figure 20:
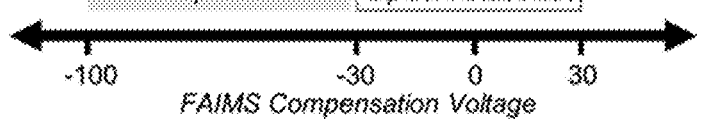

FIG. 20. Fast Proteome Analysis by Direct Infusion Shotgun Proteome Analysis (DI-SPA). (Panel A) Cartoon showing standard nanoLC-MS. (B) Cartoon showing how DI-SPA differs from the standard proteomics analysis. (C) Results over-view from DI-SPA applied to a large-scale mitochondrial toxin screen in human 293T cells. (D) Estimated FAIMS ion mobility voltage ranges for different molecule classes.

Figure 21:
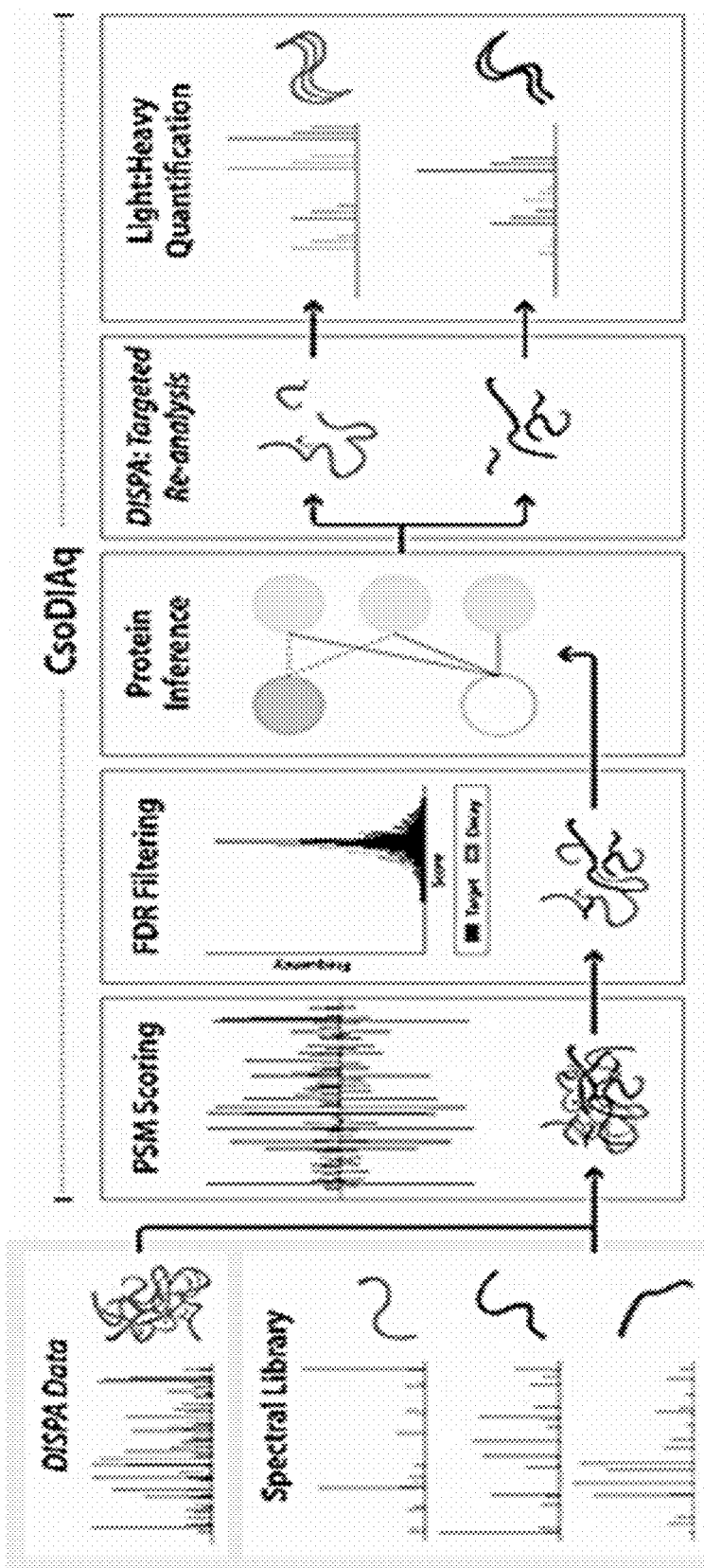

FIG. 21. Overview of CsoDIAq methodology and software in an embodiment. Peptide-spectra matches (PSMs) are scored between data collected from direct infusion shotgun proteome analysis (DISPA) and data from one or more spectral libraries, and are further analyzed using FDR filtering to remove false positives. The results may be further analyzed using protein inference, targeted re-analysis and quantification.

Figure 22:
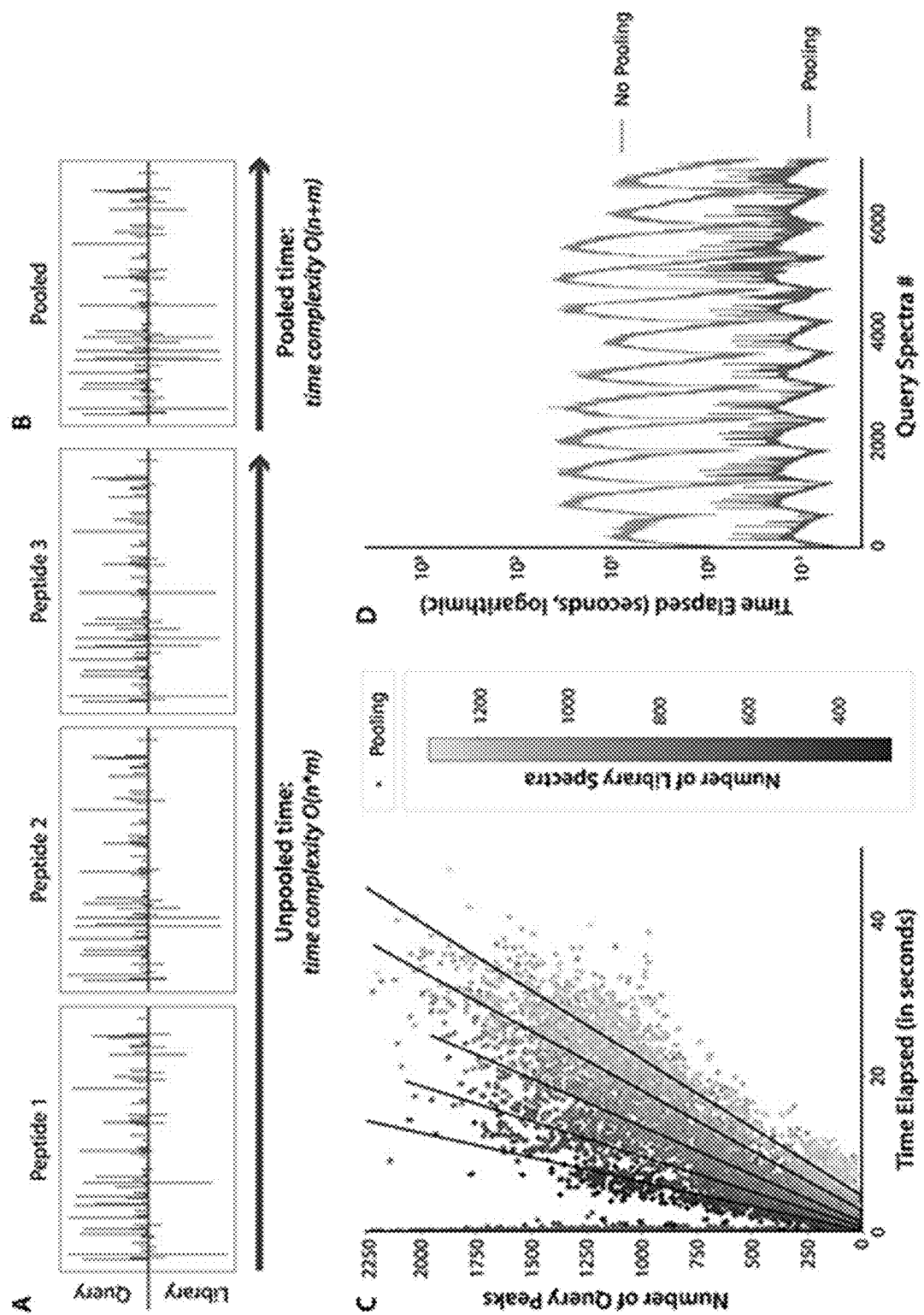

FIG. 22. Spectra pooling concept and performance. (Panel A) Concept figure illustrating DISPA analysis without pooling. With only one query spectrum (top of line) and three library spectra (bottom of line), the algorithm completes three iterations over all query peaks, once for each library spectrum. This results in O(n*m) time complexity. (B) Concept figure illustrating DISPA analysis with pooling. Using the same spectra examples in (A), the number of spectra no longer multiplies the number of iterations over peaks. Instead, the time complexity relies on a single iteration of all query peaks and all library peaks, indicating an O(n+m) complexity. (C) Scatterplot illustrating the effect of the number of queried fragment ion peaks and number of potential library spectrum matches on algorithm speed per single query spectra analysis. Lines indicate the slope of a subset of the data sorted by the number of library spectra compared. (D) Line graph comparing performance of pooling vs. non-pooling. Y-axis illustrated on a logarithmic scale for visual purposes.

Figure 23:
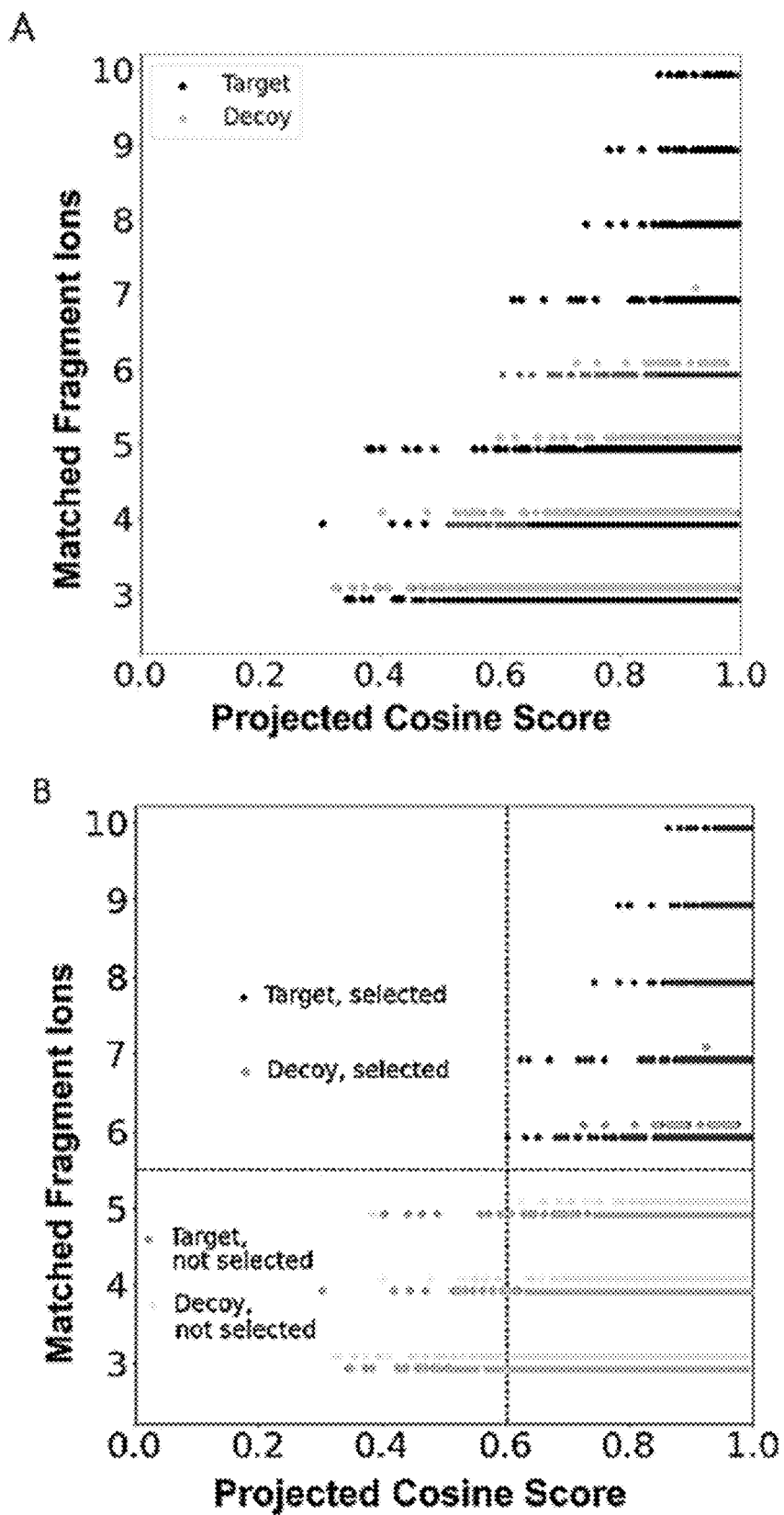
Figure 23:
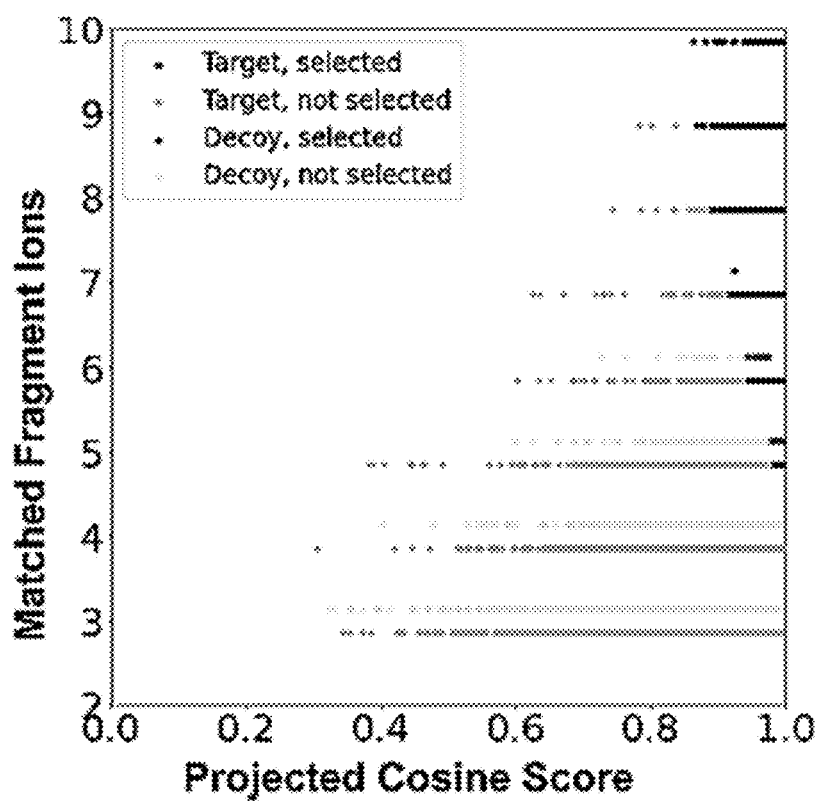
Figure 23:
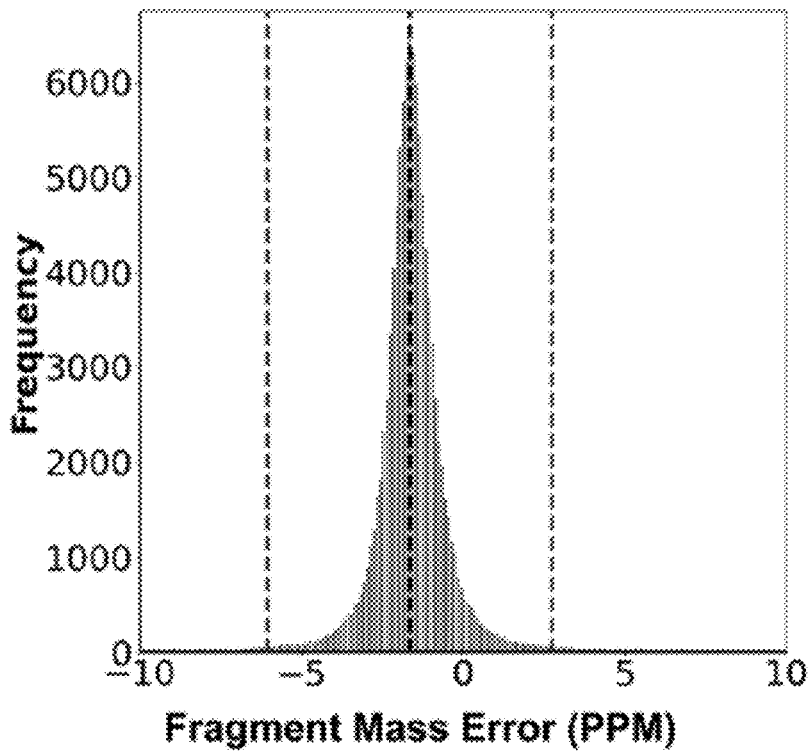
Figure 23:
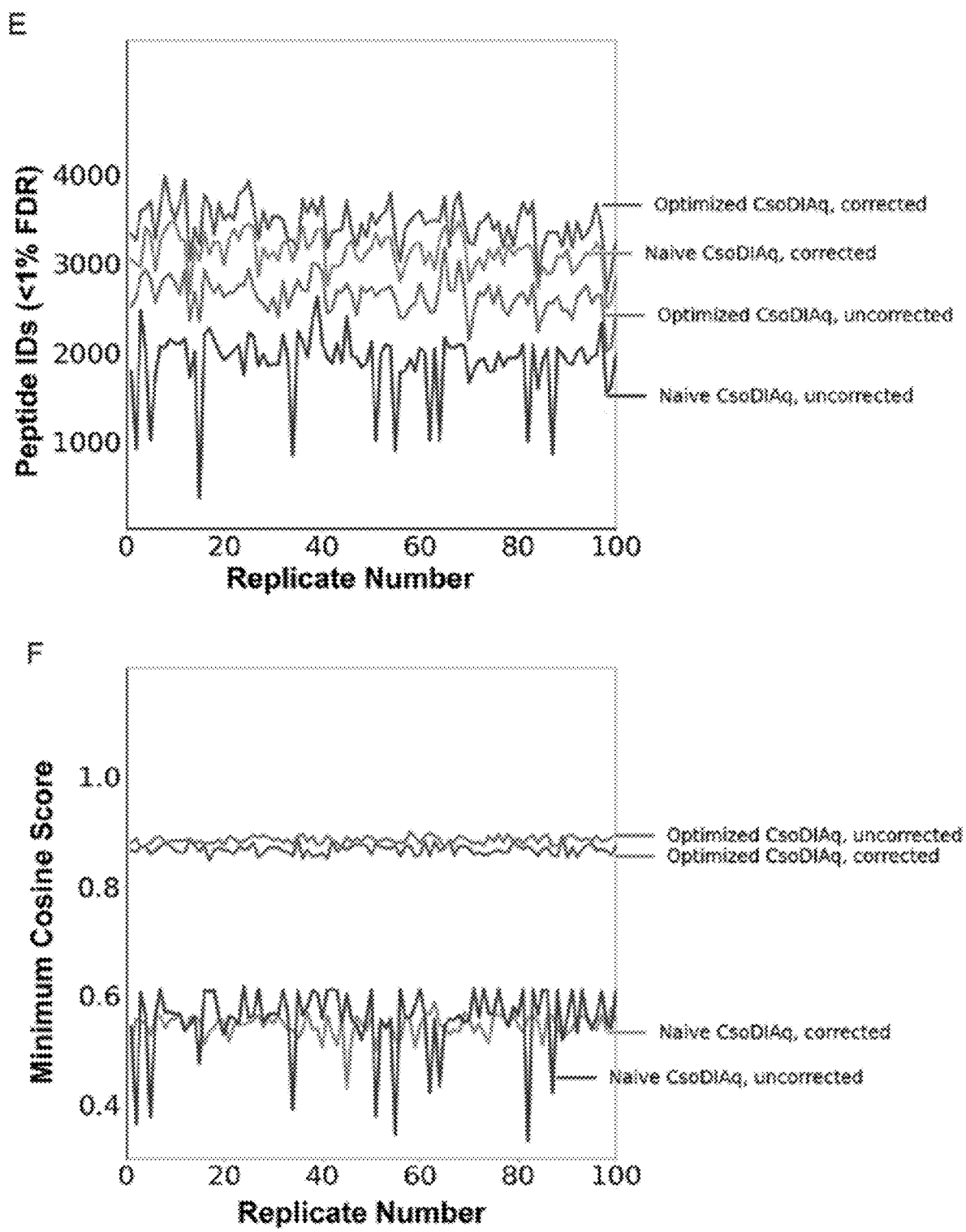

FIG. 23. Optimized CsoDIAq scoring mechanism results consistently exceed MSPLIT-DIA results. (Panel A) Scatter plot between the number of fragment ion matches and cosine score of all PSMs in a single DISPA run. Target and decoy PSMs visually separated as darker and lighter shades, respectively. (B) Recreation of (A) indicating PSMs above an FDR rate of 0.01 as sorted using the initial scoring approach. (C) Recreation of (A) indicating PSMs after filtering for FDR rate<0.01 as sorted using the optimized scoring approach, the Match Count and Cosine (MaCC) score. MaCC score is the fifth root of the match number multiplied by the cosine score. (D) histogram illustrating the spread of fragment ion mass differences in PPM from all fragments corresponding to PSMs identified below the FDR cutoff score from the first, uncorrected analysis. The black dashed line in the center gives the mean and the dotted lines on the sides give the second standard deviation. (E) Line graph comparing the performance of various algorithms with respect to the number of peptide identifications over 100 DISPA runs of the same sample. A minimum number of six fragment ion matches was applied to the naive approach to optimize the output. Like the MaCC score, a maximum of 10 fragment ions per library reference was used. (F) Line graph comparing the performance of various algorithms with respect to the lowest cosine score over 100 DISPA runs of the same sample.

Figure 24:
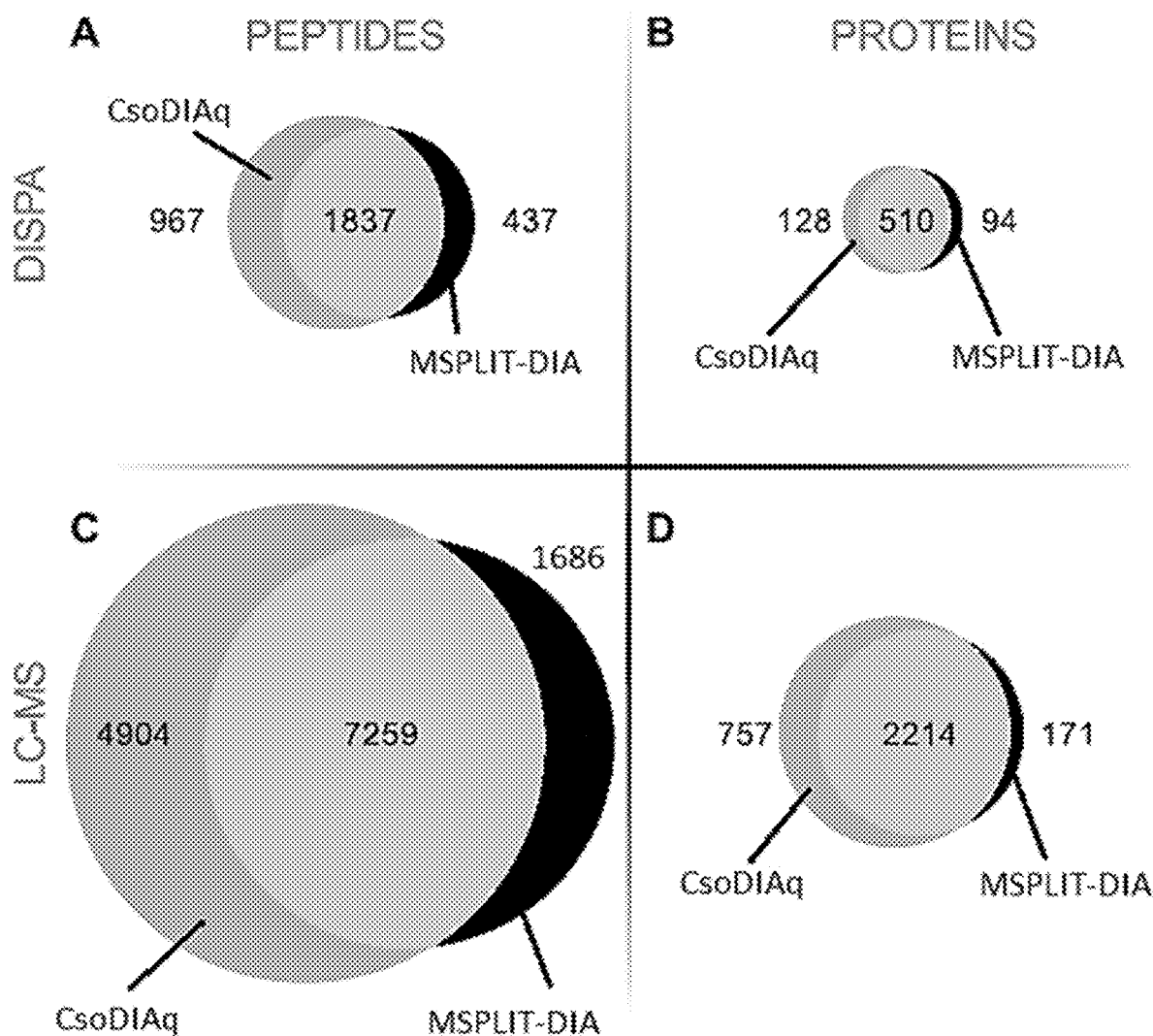

FIG. 24. Comparing CsoDIAq and MSPLIT-DIA performance. All values indicate identifications below an FDR threshold of 0.01. (Panel A) Venn diagram comparing unique peptides identified by CsoDIAq and MSPLIT-DIA using DISPA data. (B) Venn diagram comparing unique protein groups identified by CsoDIAq and MSPLIT-DIA using DISPA data. (C) Venn diagram comparing unique peptides identified by CsoDIAq and MSPLIT-DIA using LC-MS DIA data. (D) Venn diagram comparing unique protein groups identified by CsoDIAq and MSPLIT-DIA using LC-MS DIA data.

Figure 25:
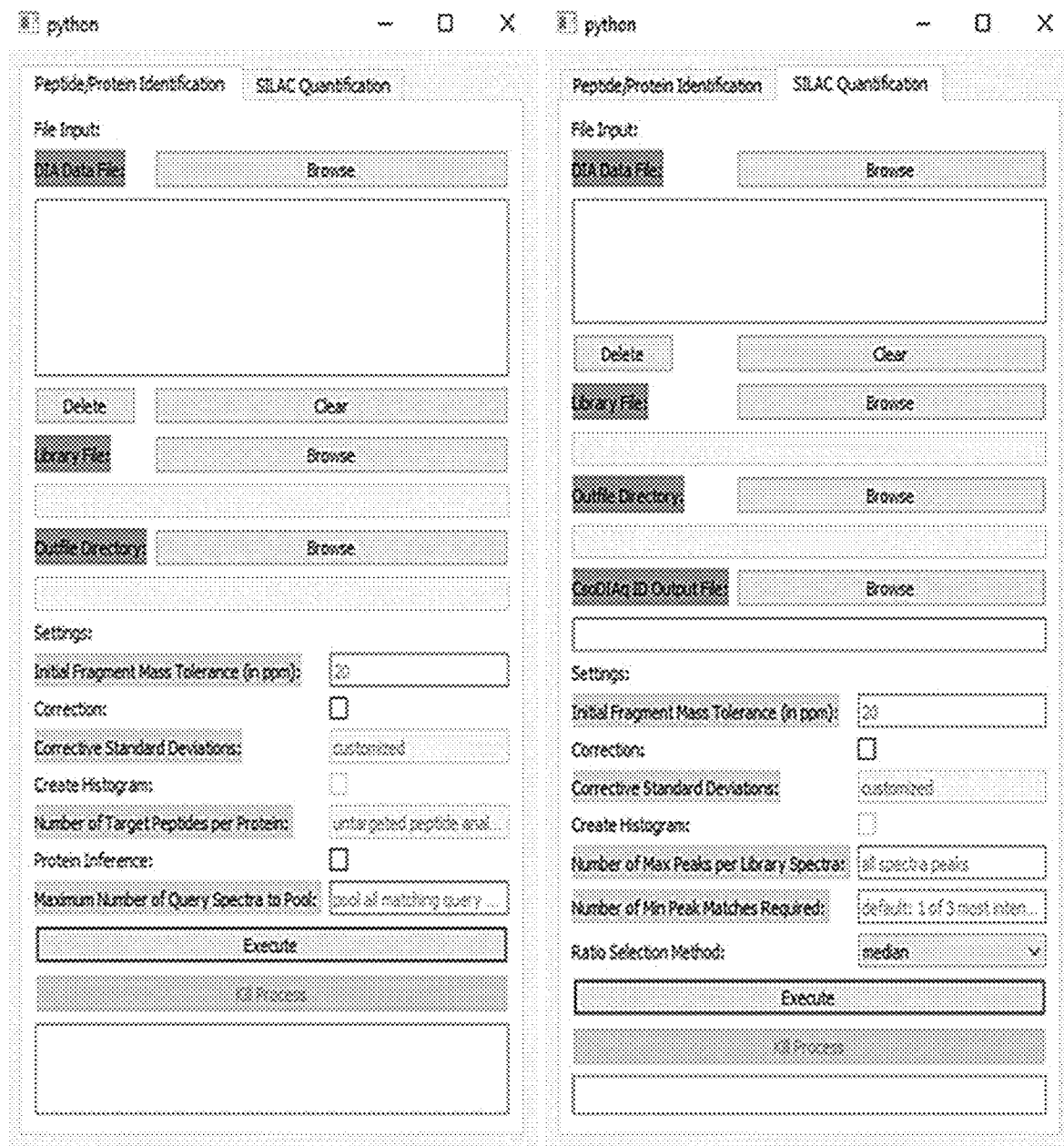

FIG. 25. Graphic User Interface layout. (Panel A) GUI settings for peptide and protein identification step. (B) GUI settings for SILAC quantification step.

DETAILED DESCRIPTION OF THE INVENTION

Definitions

As used herein, the term "ion mobility", which includes differential ion-mobility, refers to a process used to separate ionized molecules in a medium, such as a buffer gas, based on the mobility of the ionized molecules through the medium. As used herein, the term "buffer gas" is able to be used interchangeably with the terms "carrier gas", "bath gas", "background gas" and "drift gas" as may be used in the art.

As used herein, the term "precursor ion" is used herein to refer to an ion which is produced during the ionization stage of mass spectrometry analysis or measured in an initial mass spectrometry analysis stage, including the MS1 stage of MS/MS analysis. As used herein, the terms "product ion" and "fragment ion" are used interchangeably in the present description and refer to an ion which is produced during a fragmentation process of a precursor ion.

As used herein, the term "ionization source" refers to a device or component which produces ions from a sample. Examples of ion sources include, but are not limited to, electrospray ionization sources and matrix assisted laser desorption/ionization (MALDI) sources.

As used herein, "online separation" means that the instrument or component used to separate or purify molecules in the sample is in fluid communication with an ionization source as well as with the mass spectrometer or other analyzer. The online separation may be performed prior to ionization or after ionization. In an embodiment, separated ionized molecules may be directly injected from the instrument or component used to separate or purify the ionized molecules into the mass spectrometer or other analyzer for data acquisition. As used herein, "offline separation" involves performing a separation or purification step in a system or device that is not physically connected to or in fluid communication with the mass spectrometer or analyzer. After an offline separation, the separated or purified molecules may be injected into the ionization source or analyzing device. Online separation techniques are generally advantageous in that they can typically be performed rapidly without having to remove molecules or ions from the system. The methods of the present invention utilize an online ion mobility separation step and preferably do not include an online liquid chromatography step.

As used herein, the term "mass spectrometry" (MS) refers to an analytical technique for the determination of the elemental composition of an analyte. Mass spectrometric techniques are useful for elucidating the chemical structures of analytes, such as peptides and other chemical compounds.

The mass spectrometry principle consists of ionizing analytes to generate charged species or species fragments and measurement of their mass-to-charge ratios. Conducting a mass spectrometric analysis of an analyte results in the generation of mass spectrometry data relating to the mass-to-charge ratios of the analyte and analyte fragments. Mass spectrometry data corresponding to analyte ion and analyte ion fragments is presented in mass-to-charge (m/z) units representing the mass-to-charge ratios of the analyte ions and/or analyte ion fragments. In tandem mass spectrometry (MS/MS or MS2), multiple rounds of mass spectrometry analysis are performed. For example, samples containing a mixture of proteins and peptides can be ionized and the resulting precursor ions separated according to their mass-to-charge ratio. Selected precursor ions can then be fragmented and further analyzed according to the mass-to-charge ratio of the fragments.

As used herein, the term "mass-to-charge ratio" refers to the ratio of the mass of a species to the charge state of a species. The term "m/z unit" refers to a measure of the mass to charge ratio. The Thomson unit (abbreviated as Th) is an example of an m/z unit and is defined as the absolute value of the ratio of the mass of an ion (in Daltons) to the charge of the ion (with respect to the elemental charge).

As used herein, the term "mass spectrometer" refers to a device which separates ions according to mass, and detects the mass and abundance of the ions. Mass spectrometers include multistage mass spectrometers which fragment the mass-separated ions and separate the product ions by mass one or more times. Multistage mass spectrometers include tandem mass spectrometers which fragment the mass-separated ions and separate the product ions by mass once.

The terms "peptide" and "polypeptide" are used synonymously in the present description, and refer to a class of compounds composed of amino acid residues chemically bonded together by amide bonds (or peptide bonds). Peptides and polypeptides are polymeric compounds comprising at least two amino acid residues or modified amino acid residues. Modifications can be naturally occurring or non-naturally occurring, such as modifications generated by chemical synthesis. Modifications to amino acids in peptides include, but are not limited to, phosphorylation, glycosylation, lipidation, prenylation, sulfonation, hydroxylation, acetylation, methylation, methionine oxidation, alkylation, acylation, carbamylation, iodination and the addition of cofactors. Peptides include proteins and further include compositions generated by degradation of proteins, for example by proteolyic digestion. Peptides and polypeptides can be generated by substantially complete digestion or by partial digestion of proteins. Polypeptides include, for example, polypeptides comprising 1 to 100 amino acid units, optionally for some embodiments 1 to 50 amino acid units and, optionally for some embodiments 1 to 20 amino acid units.

The term "protein" refers to a class of compounds comprising one or more polypeptide chains and/or modified polypeptide chains. Proteins can be modified by naturally occurring processes such as post-translational modifications or co-translational modifications. Exemplary post-translational modifications or co-translational modifications include, but are not limited to, phosphorylation, glycosylation, lipidation, prenylation, sulfonation, hydroxylation, acetylation, methylation, methionine oxidation, the addition of cofactors, proteolysis, and assembly of proteins into macromolecular complexes. Modification of proteins can also include non-naturally occurring derivatives, analogues and functional mimetics generated by chemical synthesis.

Exemplary derivatives include chemical modifications such as alkylation, acylation, carbamylation, iodination or any modification that derivatizes the protein.

As used herein, the term "proteome" refers to the expressed protein complement of a cell, organ, or organism, including isoforms and posttranslational variants. Similarly, the term "lipidome" refers to the lipid profile within a cell, tissue, or organism, and the term "metabolome" refers to complement of low-molecular-weight molecules (metabolites) present in the cell that are participants in general metabolic reactions required for the maintenance, growth, and normal function of a cell.

Overview

In the following description, numerous details of the devices, device components and methods in certain embodiments of the present invention are set forth in order to provide a thorough explanation of the precise nature of the invention. It will be apparent, however, to those of skill in the art that the invention can be practiced without these specific details.

Shotgun proteomic and other mass spectrometry methods using liquid chromatography (LC) mass spectrometry (MS) achieve the greatest depth and breadth of sample coverage. The time required for such comprehensive analysis, such as proteome analysis, once a major limiting factor, has been minimized by technological adaptations. In the last decade, however, the time to quantify such samples has been reduced from weeks to just over an hour. While quantitation rates have improved significantly, the push for higher throughput remains and one of the rate-limiting steps is liquid-phase separations.

The present invention provides methods and systems for direct-infusion mass spectrometry, including for use in shotgun proteome analysis (DI-SPA), that can replace LC to deliver expeditious analysis of complex peptide mixtures, including organism proteomes. The methods and systems leverage ion mobility in the gas-phase to separate peptide ions on the basis of their charge, size and shape (contrast with LC, which leverages hydrophobicity and/or charge for separation). Peptides are directly infused and ionized by electrospray, and the resulting peptide cations are separated in the gas phase before detection by data-independent acquisition mass spectrometry (DIA-MS).

Accordingly, the present invention provides an alternative to LC for ion separation, which enables higher throughput and faster data acquisition. While possible not as comprehensive as LC-MS in some embodiments, fast collection of DI-SPA cell profiles is likely useful in many contexts, such as when used in conjunction with machine learning (ML) and deep neural networks (DNNs) to accurately characterize cellular states. In particular, DI-SPA provides an alternative to LC for MS-based proteomics. The data acquired can be used for fast protein identification and quantification.

Strategies for peptide identification and quantification were validated with standard mixtures of known heavy and light protein ratios and compared with traditional LC-MS peptide quantification. The utility of the present invention for high throughput biological screening was also demonstrated by quantifying proteomic responses of human cells to a complex multi-factorial experiment grid of mitochondrial toxins, genotypes, and nutrients. Application of DI-SPA to quantify proteins from mitochondria subcellular fractions is also demonstrated. Altogether, the results show that the present invention enables fast proteome analysis without LC separation, permitting rapid quantification of biologically relevant proteome changes in cells and purified mitochondria.

Methods were also demonstrated using high-field asymmetric waveform ion mobility spectrometry (FAIMS), which permits very rapid gas-phase separation through a device placed between the electrospray emitter and the inlet of the MS. Using FAIMS demonstrated targeted quantification of over 500 proteins within minutes of MS data collection (~3.5 proteins/second). More than 45,000 quantitative protein measurements from 132 samples were achieved in 4.4 hours of MS data collection without the use of LC.

Aspects of the invention can be further understood by the following non-limiting examples and figures.

EXAMPLES

Example 1—Quantitative Shotgun Proteome Analysis by Direct Infusion

This example shows that gas-phase separation can substitute for LC to deliver expeditious analysis of complex peptide mixtures from the human proteome. This strategy is named Direct Infusion-Shotgun Proteome Analysis (DI-SPA). Peptide samples are directly infused, ionized by electrospray, and the resulting peptide cations are separated in the gas phase before detection by DIA with high resolution MS/MS. DI-SPA data collection parameters were explored and it was found that the extent of gas-phase separations is positively correlated with the depth of observable proteome coverage. Strategies for peptide identification and quantification with DI-SPA were validated with standard mixtures of known heavy and light protein ratios and compared with traditional LC-MS peptide quantification. The utility of DI-SPA for high throughput biological screening was demonstrated by quantifying proteomic responses of human cells to a complex multi-factorial experiment grid of mitochondrial toxins, genotypes, and nutrients. Application of DI-SPA to quantify proteins from mitochondria subcellular fractions is also demonstrated. Altogether, the results show that DI-SPA enables fast proteome analysis without LC separation, permitting rapid quantification of biologically relevant proteome changes in cells and purified mitochondria.

Methods and Results. It was first sought to determine how effectively gas-phase fractionation by FAIMS and a quadrupole mass filter purify peptide cations using computational calculations. Precursor m/z values and maximum FAIMS compensation voltage (CV) transmission for human peptide identifications from LC-FAIMS-MS/MS were compiled and used for this theoretical gas-phase fractionation (Hebert et al., Anal. Chem., 90, 9529-9537 (2018)). The data was composed of 112,742 unique peptide precursors with maximum CV values from −20 to −120, and precursor m/z values ranging from 300 to 1,350. The number of peptides in each theoretical quadrupole isolation range (m/z 4 or 2), and FAIMS CV (10 V steps from −20 V to −120 V), was plotted as a stacked histogram (FIG. 5).

X-axis bin widths are analogous to the isolation width used for the quadrupole mass filter during MS analysis. Using a theoretical isolation width of 4 m/z without FAIMS, over 1,000 precursors are observed in a single 4 m/z window. By reducing the isolation width to 2 m/z, only 564 peptide precursors were observed; coupling this reduced isolation width to FAIMS, complexity can be even further reduced to 164 peptide precursors. This theoretical analysis indicated that, indeed, increased gas-phase fractionation significantly decreases the complexity of peptide precursors in any given channel. Smaller quadrupole selection ranges linearly reduce the number of peptides selected, and FAIMS selection enables a complementary but nonlinear reduction in the number of peptide ions. Even with small quadrupole selection windows and FAIMS selection, multiple peptide ions are predicted to be present in every window. Fragmentation, a means to identify those co-selected peptide ions, produces chimeric fragment ion spectra with signals that distinguish the original peptides. Altogether this computational analysis reveals that gas-phase fractionation can theoretically reduce the complexity of peptide ions for analysis without LC.

Figure 1:
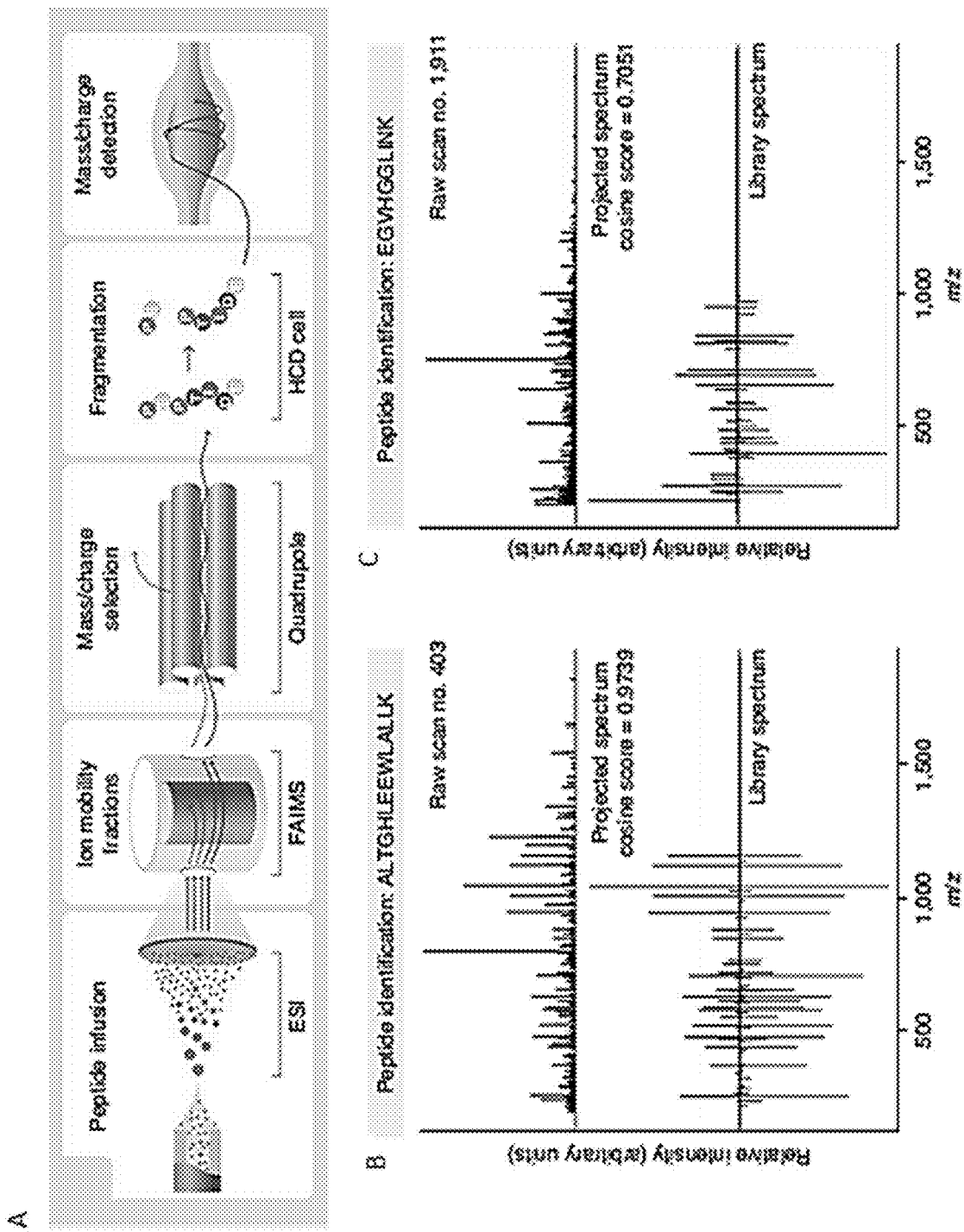
FIG. 1. Overview of Direct Infusion Shotgun Proteome Analysis (DI-SPA) by Data-Independent Acquisition Mass Spectrometry (DIA-MS) strategy for peptide identification. (Panel A) Scheme showing strategy for peptide analysis by DI-SPA. A solution of peptides from proteome digestion is infused and ionized by electrospray before sequential separation by ion mobility, quadrupole m/z selection, fragmentation by HCD, and finally mass/charge detection. Examples of peptide identifications using the projected spectrum concept from MSPLIT-DIA, including (B) a high-scoring peptide from a search result and (C) a low-scoring peptide from a search result.

Based on these theoretical results, it was experimentally tested whether proteins and peptides could be identified and quantified with gas-phase fractionation instead of LC. Peptides were delivered to the nanospray emitter by direct infusion (DI) (FIG. 6), and electro-sprayed ions were fractionated by FAIMS, quadrupole selection, and dissociated using beam-type collisional activation (HCD), followed by product ion detection in the orbitrap (FIG. 1, panel A). To perform peptide identification from these multiplexed spectra, MSPLIT-DIA was used, a technique that applies the concept of spectral projection to extract library-spectra fragment ions within the instrument mass accuracy range from candidate spectra (Wang et al., Nature Methods, 12, 1106 (2015); and Wang et al., Molecular & Cellular Proteomics, 9, 1476-1485 (2010)). Examples of raw spectra along with their projected spectra and library spectra for identified peptides (<1% FDR) reveal that extraction of projected spectra with 10 ppm fragment mass tolerance (FIG. 15) effectively produces matches with good spectral correlation (FIG. 1, panels B and C).

Figure 2:
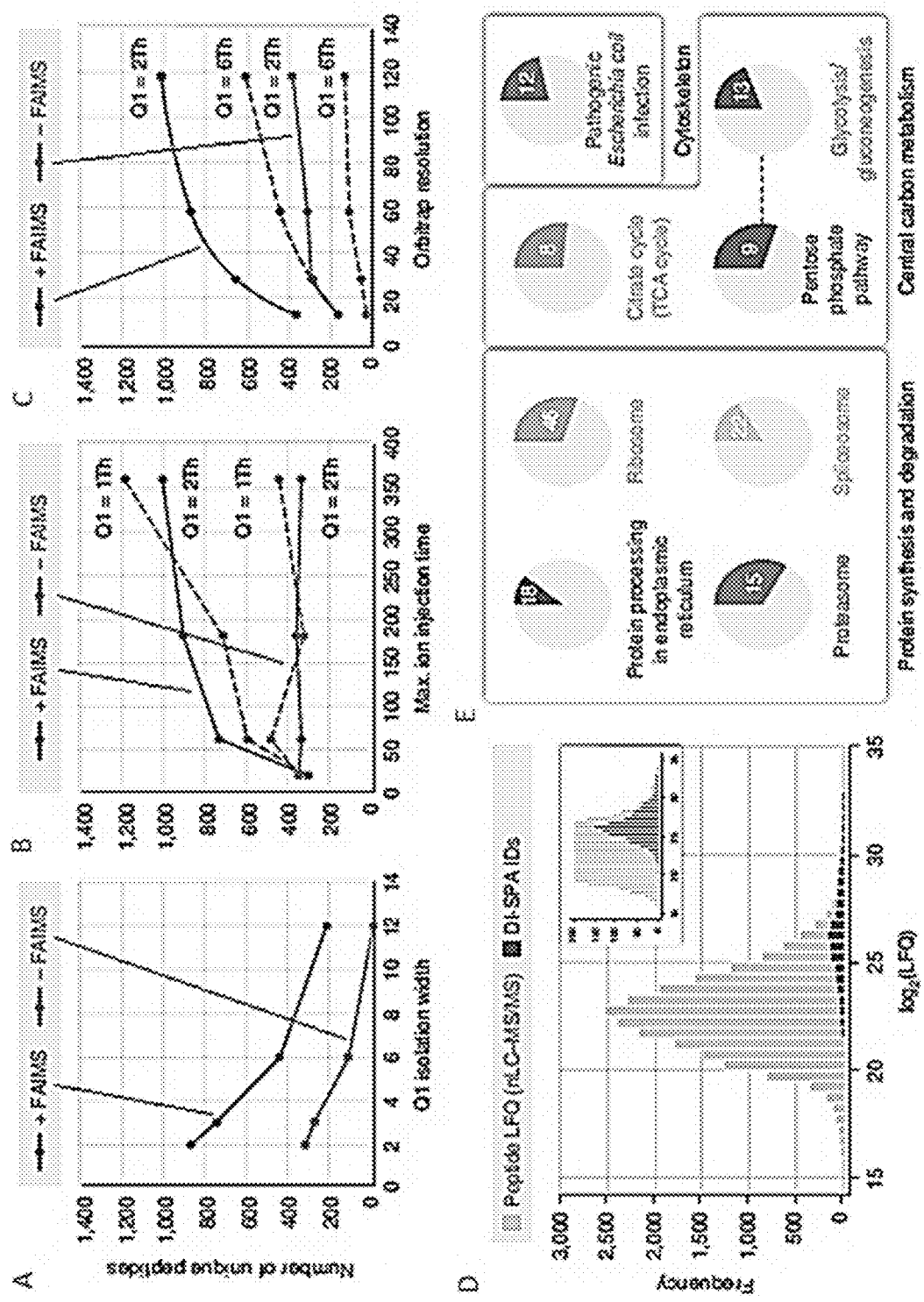
FIG. 2. Peptide and Protein Identification by DI-SPA. (Panel A) Unique peptide identifications as a function of mass filter isolation window width with resolution fixed at 60,000 and maximum ion accumulation time fixed at 118 ms, (B) maximum ion accumulation time with orbitrap resolution fixed at 60,000 and isolation width fixed at 1 or 2 m/z, or (C) orbitrap resolution with maximum ion injection time fixed at 118 ms and isolation width fixed at either 2 or 6 m/z. (D) Distribution of peptide log 2(LFQ) values from traditional nLC-MS/MS showing the subset of 1,173 peptides that were identified by the optimal DI-SPA conditions from the scouting experiment (360 ms ion injection time, 60k resolution, 1 m/z isolation width). (E) KEGG pathway enrichment analysis of 395 proteins identified (protein level FDR<1.25%) by DI-SPA of MCF7 cells. The number in the circle indicates how many proteins in the pathway were identified, and the proportion of each circle reflects the coverage of the proteins in each pathway. The connection between the pentose phosphate and glycolysis pathways indicates a kappa connectivity score of >0.4. Unique identifications of peptides in panels A-C are the average of two independent experiments.
Figure 3:
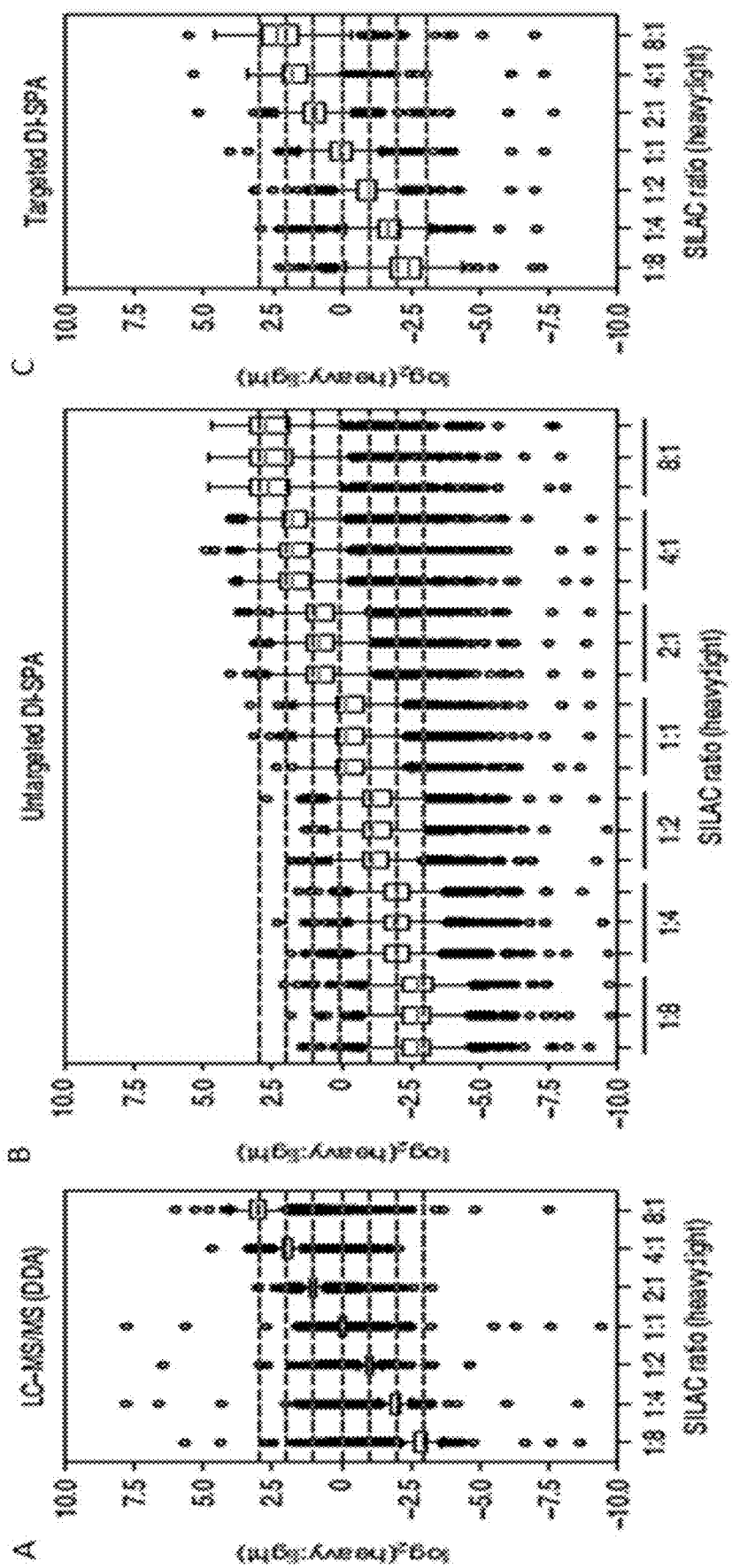
FIG. 3. Peptide and Protein Quantification with DI-SPA. Heavy- and light-isotope-labeled samples were combined at defined ratios to assess quantification capability. (Panel A) Peptides were first analyzed by standard LC-MS and quantified by MaxQuant. (B) Untargeted quantification of peptides was performed using y-type ion signals from co-fragmentation of doubly charged heavy and light SILAC pairs by DI-SPA (each ratio was measured in triplicate). (C)

To optimize identifications, a grid of mass spectrometer settings was tested in parameter scouting experiments using peptide samples from whole human proteome proteolysis (MCF7 cells) (FIG. 7, panel A). Parameters included: use of FAIMS, width of the Q1 quadrupole isolation window (FIG. 2, panel A), maximum ion accumulation time (FIG. 2, panel B), and orbitrap resolution (FIG. 2, panel C). In each experiment, peptide solution was delivered to the source by DI, and each FAIMS CV of interest was held constant while stepping through Q1 isolation windows that spanned the precursor mass range of interest (FIG. 3, panel B). The number of peptide identifications increases as Q1 isolation window width decreases, ion injection time increases, and orbitrap resolution increases. For almost all tested parameters, the addition of FAIMS increased the identified peptides. At the optimal setting, use of FAIMS increased peptide identifications by up to ~3-fold (FIG. 2, panel B). An increased number of peptide identifications due to use of FAIMS and smaller mass filter selection windows indicates that the extent of gas-phase fractionation is a key determinant in the success of DI-SPA. These data culminated in discovery of the optimal settings for peptide analysis without chromatography.

Next, the relationship between detectable peptide precursor ion features (MS1) and peptide identifications by DI-SPA was examined. The same solution of peptides from the MCF7 proteome was infused, and precursor ion scans were collected with the same FAIMS gas-phase fractions. Thrash feature identification, as implemented in decontools, was used to identify a total of 1,477 MS1 features (excluding +1 ions) (Horn et al., Journal of the American Society for Mass Spectrometry, 11, 320-332 (2000); and Jaitly et al., BMC Bioinformatics, 10, 87 (2009)).

Peptide precursor masses identified by DI-SPA were compared with the observed precursor feature masses (FIG. 16). DI-SPA enabled identification of 1,435 unique peptides with 55% overlap in identified precursor masses with the precursor masses observed in the MS1-only experiment. Comparison of the matched features as a function of deconvoluted mass and relative abundance from the MS1 revealed that many of the features found by DI-SPA were low abundance (FIG. 16). Thus, compared to DDA which requires observation of a mass in the MS1 spectra, the DI-SPA strategy picked up more low-abundance ions, probably due to the scan sequence that waits for a signal at each possible mass window.

To better understand the potential utility of DI-SPA, the character of peptide identifications was examined. The same MCF7 peptide sample was analyzed by traditional nLC-MS/MS to perform label-free quantification (LFQ), and peptide identifications from both methods were compared (FIG. 2, panel D). Peptide identifications from DI-SPA were a sample of the most abundant peptides present in the proteome sample. KEGG pathway enrichment analysis of the 395 protein identifications (protein-level FDR<1.25%) from the same DI-SPA analysis revealed significant coverage of several pathways central to biology, including central carbon metabolism (glycolysis, pentose phosphate pathway, TCA cycle) and protein synthesis and degradation (splicosome, ribosome, proteasome, and proteome processing in the endoplasmic reticulum) (FIG. 2, panel E, FIG. 8). Together, these results indicate that DI-SPA is useful for detection of abundant proteins from cellular pathways representing diverse functions.

The robustness and reproducibility of DI-SPA was assessed by consecutively analyzing the same MCF7 peptide sample 100 times (FIG. 9). Because DI-SPA is so fast, this data was collected overnight. An average of 1,542 peptides are identified per injection, with a standard deviation of 63.1 peptides (4.1% or the mean). Of all peptides identified, exactly 869 were identified from all 100 injections (56% of average peptide identifications), and 1,264 were identified in at least 80/100 injections (82% of average peptide identifications). The reproducibility of DI-SPA analysis over 100 replicates therefore exceeds that of pairs of technical replicates from some DDA strategies (Tabb et al., J. Proteome Res. 9, 761-776 (2010)).

DI-SPA was then challenged with one of the most difficult sample matrices, human plasma. Two different sources of human plasma were either not depleted, or the top 12 most abundant proteins were depleted, and the samples were analyzed by DI-SPA (FIG. 10). DI-SPA performed similar on both frozen or lyophilized human plasma samples and found more peptides and proteins from depleted samples. Compared with the standard few hundred protein identifications from traditional nLC-MS/MS studies (Geyer et al., Mol Syst Biol, 13, 942 (2017)), DI-SPA identified 745 peptides that map to 109 human proteins. Although this proof of principle plasma analysis by DI-SPA was done with the scouting method in >15 minutes (as shown in FIG. 7), subsequent methods could target only one peptide per plasma protein and achieve the same analysis in only about 55 seconds (~0.5 seconds per scan). Thus, DI-SPA is a promising alternative to LC-MS for large scale human plasma proteomics studies.

Next, a quantitative DI-SPA strategy was evaluated using defined mixtures of A549 cells labeled with heavy or light arginine and lysine (FIG. 11). Labeled and combined proteolytically digested samples were analyzed by standard nLC-MS/MS and MaxQuant to verify the labeling ratios and provide a baseline of quantitative values for comparison (FIG. 3, panel A). One sample of A549 peptides was first analyzed with the optimal peptide identification settings determined by the scouting experiments, resulting in the identification of 2,248 unique peptides. To enable quantification from heavy and light y-type ion pairs using DI-SPA, a new data collection method was built that co-isolated light and heavy SILAC precursor pairs from doubly charged peptides using the ion multiplexing feature (MSX) of the Orbitrap Fusion Lumos (FIG. 17). Peptides were quantified from MSX DI-SPA data by taking the median heavy/light ratio of the y-type ions in the fragment ion spectra. Only the three most abundant y-type ion fragments matched to the spectral library were used for quantification. From these data, it was conclude that DI-SPA can effectively quantify peptides (FIG. 3, panel B).

Finally, a targeted protein quantification DI-SPA method was developed to quantify selected proteins more quickly. This method targeted heavy and light peptide precursor masses for one peptide from each of the 552 identified proteins (FIG. 12). Up to 525 proteins were quantified in only 2.5 minutes of MS data collection, resulting in a rate of 3.5 proteins quantified per second. The quantitative quality of this fast, targeted DI-SPA method was like the untargeted DI-SPA method (FIG. 3, panel C). Since this method is based on multiple fragment ion ratios from a single MS/MS measurement, it was tested if three repeated measurement of the same peptide would produce better quantitation. There was good agreement between the single measurement and triple measurement ratios (FIG. 18), suggesting that a single measurement is sufficient. These results demonstrate the utility of DI-SPA for fast protein quantification from complex mixtures.

To demonstrate the utility of DI-SPA for discovering biologically relevant proteome remodeling, it was applied to quantify proteome changes from a multifactorial experiment in cultured human 293T cells (FIG. 4, panel A). Wild type or PPTC7 knockout (KO) cells were grown in either standard or modified media, DMEM or HPLM (Cantor et al., Cell, 169, 258-272.e17 (2017)), respectively, and treated in triplicate with one of nine mitochondrial toxins or two controls for a total 132 samples. These conditions were chosen because of their known effects on metabolism and mitochondria, which were hypothesized to induce changes in proteins and thus provide a suitable testbed for DI-SPA. Again, a peptide discovery experiment (like FIG. 7) was first performed to identify peptides for subsequent targeted quantification experiments, in which 1,384 peptides were identified (peptide-level FDR=0.93%) from 451 proteins (protein-level FDR=2.8%). Next, a quantitative targeted DI-SPA assay was generated to expeditiously monitor the most intense peptide from each of the 451 proteins. This method was used to analyze all 132 samples, generating 132 proteotypes and requiring only 120 seconds of MS data collection per sample. A total of 341 out of 451 protein targets were quantified across all 132 samples in only 4.4 hours of total MS data acquisition, which corresponds to over 45,000 proteins quantified at a rate of nearly three proteins per second (FIG. 4, panel B).

This dataset of 44 unique cellular states revealed many interesting changes due to mitochondrial toxin treatments. For example, nearly all glycolytic proteins were upregulated upon treatment with the toxin deferoxamine (DFO) compared with the appropriate controls (FIG. 4, panel C). Supporting this observation, DFO was previously reported to increase glycolysis (Oexle et al., Biochimica et Biophysica Acta (BBA)—Bioenergetics 1413, 99-107 (1999)). To understand relationships between treatments, these data were summarized with uniform manifold approximation and projection (UMAP) (McInnes et al., arXiv:1802.03426 [cs, stat](2018)) (FIG. 4, panel D).

UMAP shows clear segregation of the treatments into 24 h and 6 h groups, and within the 6 h group, the proteotypes easily segregate from the WT and PPTC7 KO cells. Within the 6 h WT group, the different media had a minimal influence on the proteotype. In relation to the 6 h controls, complex I inhibitors rotenone and antimycin A were most similar. Toxins that influence mitochondrial membrane potential through proton pumping, CCCP and oligomycin, produced more (and comparable) proteome rearrangement. Valinomycin, which diffuses potassium ion gradients across membranes, induced the most profound proteome perturbation relative to controls. Finally, UMAP analysis revealed that CDDO treatment is media dependent. These analyses demonstrate how DI-SPA is useful for quick analysis of large, complex experimental designs and toxicity screening.

Data from this DI-SPA experiment also revealed proteome differences due to the PPTC7 KO genotype, including lower citrate synthase quantity across 24-hour controls and treatments compared to WT 293T cells (FIG. 4, panel E). Based on this observation and previous results (Niemi et al., Nature Communications, 10, (2019)), it was hypothesized that these cells may have a mitochondrial defect or lower mitochondrial quantity. Mitochondria were enriched from WT and KO cells, and crude mitochondria fractions were analyzed by DI-SPA. Quantitative DI-SPA ratios for these samples were compared with those computed with MaxQuant analysis of LC-MS data, revealing excellent agreement and data quality (FIG. 13). In this organelle-specific analysis, 351 proteins were quantified across all samples, and there was a clear trend toward lower quantities of most mitochondrial proteins (FIG. 14, 149 annotated mitochondrial according to Gene Ontology Cellular Component).

In DI-SPA data from the mitochondrial fractions, four proteins were significantly downregulated in PPTC7 KO cells compared to WT controls (Benjamani-Hochberg corrected p-value<0.05): Acetyl-CoA acetyltransferase THIL, 10 kDa heat shock protein CH10, Prohibitin PHB, and again, Citrate synthase CISY. To validate the hypothesis from DI-SPA data, mitochondrial function were measured with Seahorse respirometry, and found that PPTC7 KO cells indeed have lower oxygen consumption relative to WT 293T cells (FIG. 4, panel F). These results indicate that DI-SPA is useful for discovering biologically relevant proteome changes, and that the method is effective for analysis of subcellular fractions such as mitochondria.

Discussion. The present example describes and validates DI-SPA, a qualitative and quantitative MS-based proteomics method that does not use LC. DI-SPA instead separates peptides in the gas phase with three primary technologies: (1) ion mobility (FAIMS), (2) m/z-based quadrupole mass filter isolation, and (3) ion dissociation. The complex and chimeric MS/MS spectra from DI-SPA are analyzed using the projected spectrum concept (Wang et al., Nature Methods, 12, 1106 (2015); and Wang et al., Molecular & Cellular Proteomics, 9, 1476-1485 (2010)) (FIG. 1). Ion mobility is a key determinant of success; addition of FAIMS tripled peptide identifications. DI-SPA identified peptides that reflect a subset of the most abundant peptides found by traditional nLC-MS. While DI-SPA identifies fewer proteins than traditional nLC-MS/MS, it provides a very simple and robust interface for a superficial view of the proteome—including important cellular pathways—within minutes (FIG. 2).

The data demonstrates quantitative analysis by DI-SPA with samples containing stable isotope labeled protein standards (such as SILAC), which is achieved by comparing ratios of peptide fragment ions (Meyer et al., Journal of The American Society for Mass Spectrometry 27, 1758-1771 (2016)). This enables protein quantification at speeds of up to 3.5 proteins per second. The quantitative values obtained by DI-SPA are similar to those from standard LC-MS (FIG. 3 and FIG. 13). The proteome changes reflect known biology such as an upregulation of glycolysis due to DFO treatment, and depletion of mitochondrial function due to PPTC7 KO (FIG. 4). These results further suggest that DI-SPA is an ideal choice for analysis of simplified mixtures, such as subcellular fractions of mitochondria and proteins from co-immunoprecipitation, for example. Currently, DI-SPA makes rapid proteome quantification a viable option for a range of high-throughput studies including drug and biomarker discovery.

Many recent reports aim to improve the speed and throughput of proteome analysis by pushing for shorter LC separations (Ivanov et al., Anal. Chem., 92, 4326-4333 (2020); Bekker-Jensen et al., Mol Cell Proteomics, 19, 716-729 (2020); and Bian et al., Nat Commun., 11, 157 (2020)). DI-SPA takes the concept of shorter LC separation to the logical extreme by completely omitting LC. Several non-obvious solutions were required to come together to enable DI-SPA: (1) additional separation dimension of ion mobility, (2) data collection by DIA, (3) peptide identification with the projected spectrum concept, and (4) the co-isolation of heavy-labeled standard peptides to enable quantification from fragments. Compared those recent studies that focus on faster analysis through shorter LC separation, DI-SPA quantifies proteins at a similar pace (up to 3.5 proteins per second). Some shortcomings of this first iteration of DI-SPA are that it is not yet adapted to perform label-free quantification, and it has not yet been applied to high-throughput quantification of proteins from biofluids.

The methods proposed here may seem at odds with prior calls for better chromatography to drive the field of proteomics to more thorough analysis and better depth (0 et al., Cell Systems, 3, 321-324 (2016)). There are many applications where the proteomic depth is not required, but rather speed and reproducibility are the driving Figures of Merit. Here, it is demonstrated how this LC-free paradigm can fill this technological need in certain example cases: (1) to obtain quick quantitative proteotype profiles revealing mechanisms of toxins, and (2) to quantify the isolated mitochondria proteotypes. Continued advancements in the speed and sensitivity of MS will further be beneficial for subsequent iterations of the DI-SPA strategy, improving the depth and breadth of LC-free proteome coverage.

Example 2—Supplemental Methods

Theoretical Analysis of Gas-Phase Fractionation. Data from FAIMS compensation voltage stepping experiments using peptides from trypsin-catalyzed proteolysis of the yeast proteome described by Hebert et al. (Analytical Chemistry, 90, 9529-9537 (2018)) was re-analyzed with MSFragger (Kong et al., Nature Methods, 14, 513-520 (2017)) to identify peptides using the default settings except that a fragment ion tolerance of 0.35 Daltons was used. The distributions of m/z values for identified peptides were plotted as histograms across m/z space with differing bin widths to visualize complexity reduction possible with quadrupole isolation widths. Subsets of identifications from single compensation voltage analysis were plotted to visualize the complexity reduction afforded by FAIMS fractionation.

Samples for Parameter Scouting and SILAC Validation Experiments. MCF7 cells were grown to 80% confluent adherently on a T-175 flask, rinsed once with 1× D-PBS, and then detached from the cell culture plate using 1× trypsin solution. The trypsin was quenched by the addition of media, and then the cells were pelleted by centrifugation at 150× gravity. The cells were washed twice with ice-cold 1×D-PBS and the supernatant was aspirated to remove any media components. The cell pellet was then frozen at −80° C. until lysis.

A549 cells for SILAC quantification experiments (Ong et al., Molecular & Cellular Proteomics, 1, 376-386 (2002)) were grown in media supplemented with 10% dialyzed bovine serum and heavy or light lysine and arginine for more than 10 population doublings to completely label cells (Thermo Scientific SILAC Protein Quantitation Kit, Catalog #A33972). Completely labeled cells were then harvested by addition of trypsin, washed with cold PBS, counted to determine accurate cell numbers. Various ratios of heavy and light labeled cells were combined to reach a final number of 100,000 total cells. Combined cells were pelleted by centrifugation, PBS was aspirated, and pellets were frozen and stored at −80° C. until lysis.

Lysis, Digestion and Desalting. Frozen cell pellets were lysed by addition of 8 M Urea with 50 mM TEAB buffer at pH 8.5 containing 10 mM TCEP and 10 mM chloroacetamide. The pellets were vortexed until homogenous with lysis buffer, and then kept on ice. The larger lysis of MCF7 cells for infusion scouting experiments was sonicated on ice using a probe tip for three cycles of 10 seconds. The small volume lysis of SILAC-labeled A549 cell samples was sonicated in a Qsonica water bath maintained at 4° C. After sonication, lysis buffer was diluted to 2M Urea using 50 mM TEAB, and catalytic hydrolysis of proteins was initiated by addition of trypsin (Promega) and LysC (Wako) at a ratio of 1:100 protease:substrate by weight. Proteome proteolysis was incubated overnight (approximately 18 hours) at room temperature. Peptides were desalted using Strata reversed phase cartridges, and then dried completely in a vacuum centrifuge. Dried peptides were resuspended at between 0.5-1 mg/mL in 50%/49.8%/0.2% ACN/Water/FA (v/v/v) for direct infusion experiments, or at the same concentration in water with 2% ACN and 0.2% FA for nLC-MS/MS experiments.

Data Collection. An orbitrap Fusion Lumos mass spectrometer was operated in targeted MS2 (tMS2) mode with quadrupole isolation windows spanning the range from 400-1,000 Thompsons. Peptides were infused into a 75-micron inner diameter capillary tip from new objective (part #PF-360-75-10-N-5) that was packed with 1 cm of C8 particles (Jupyter, 5-micron particle size) to prevent clogging of the tip by small particles. To ensure that this did not result in peptide retention or chromatography, extracted ion chromatograms were examined from several random multiply charged masses and found identical patterns of signal over time (FIG. 6). An autosampler and nanoflow liquid chromatography pump were used to automate the infusions. Injections of 1-4 uL (depending on the length of the entire experiment cycle) were infused at a rate of 100-300 nL/min using 50% ACN, 49.8% H2O, and 0.2% FA as a carrier fluid. Several data collection parameters were varied, including the maximum ion accumulation time, the orbitrap resolution, and the quadrupole isolation window width. Final optimal data collection parameters were 120k orbitrap resolution with 246 ms maximum ion accumulation time and 2 m/z precursor isolation windows. Mass spectrometry data was collected using ThermoFisher Foundation software version 3.1 SP4, FreeStyle version 1.3 SP2, and Xcalibur 4.0.

Peptide and Protein Identification. The spectral library is available with the MS data on massive (Wang et al., Cell Systems, 7, 412-421.e5 (2018)), and was created from blib format spectral library made with Skyline (MacLean et al., Bioinformatics, 26, 966-968 (2010)) from database search with MS-Fragger of data from FAIMS-fractionated human peptide samples. BlibToMs2 from Proteowizard (Chambers et al., Nature Biotechnology, 30, 918-920 (2012)) was used to convert blib to ms2 format, which was then converted to mgf with msconvert. Custom Python code (fixMGFlib.ipynb available on github or from supplementary software) was then used to fix the mgf library by adding back the peptide sequence lines. Decoys were added to the spectral library by the spectral library processor included with MSPLIT-DIA.

RAW files were converted to mzXML using msconvert (Chambers et al., Nature Biotechnology, 30, 918-920 (2012)) with the default settings except that 64-bit precision was used. Converted files were searched against the human spectral library that included decoy spectra using MSPLIT-DIA with precursor tolerance equal to the isolation window width and fragment tolerance of 10 ppm. Peptides were scored by cosine similarity of experimental projected spectra with spectral library spectra using MSPLIT-DIA. Peptide identifications were sorted by their cosine match score, filtered to keep only the best score per peptide, and the peptide-level false discovery rate was computed using the target-decoy strategy.

Although peptide identification and quantification were the focus of this study, for some experiments, protein-level FDR was computed using the target-decoy strategy with the best peptide cosine score as the protein score as described in the original MSPLIT-DIA paper (Gupta et al., Journal of Proteome Research, 8, 4173-4181 (2009); and Shanmugam et al., Journal of Proteome Research, 13, 4113-4119 (2014)).

Untargeted Protein Quantification Method. To first determine whether quantification from SILAC experiments would be possible, a general method to co-isolate all heavy and light peptide pairs for doubly charged peptide precursor ions was developed. The optimal peptide identification settings determined from the optimization grid were used in a scouting experiment to identify peptides from the 1:16 (Heavy:Light) A549-derived peptide sample. These identifications were used to determine peptide quantification targets in subsequent experiments.

Theoretical heavy masses were predicted from all the peptides identified from analysis of the 1:16 (heavy:light) SILAC sample (FIG. 17). This analysis revealed that, as expected from tryptic peptides, most mass shifts result from incorporation of a single heavy lysine, followed by a single heavy arginine. Therefore, a simple multiplexed tandem MS (MSX) method was designed that co-isolated every precursor mass M simultaneously with mass M+4.5, which is between the mass of a single doubly charged heavy lysine (8.014199/2~4) or single heavy arginine (10.00827/2~5). This method fills the ion routing multipole for half the time with both specified ions before fragment mass analysis, ensuring that spectra contain fragments from any presence of both the light and heavy peptide. All light masses between 400-1000 m/z were fragmented with their heavy partner using steps of 1.5 m/z and an isolation width of 2 m/z.

Targeted Protein Quantification Method. Data collection methods were designed that targeted a single peptide from each protein identification using custom scripts written in R and Python, which are available from https://github<dot>com/jgmeyerucsd/DI2A. First, peptide identifications were matched to proteins in a FASTA database. To be conservative, only peptides that matched a single protein entry were kept for FDR calculation using the target-decoy method. Specifically, the peptide from each protein with the best cosine score was kept, and that cosine score was used as the protein score, which is again conservative (e.g. some algorithms combine multiple peptide scores into one protein score to strengthen it). A protein target list was then generated consisting of the peptide from each protein that was identified with the highest MS/MS spectra intensity from the scouting experiment. Predicted precursor light and heavy m/z for each peptide was then determined based on the charge state and the counts of arginine and lysine residues, and the FAIMS CV that produced the identification was gathered from the mzXML scan header. Lists of target peptides at each FAIMS CV were then generated using the predicted light and heavy m/z, and custom data collection methods were built that co-isolate the light and heavy m/z signal from each peptide using ion multiplexing (MSX) option of the Orbitrap Fusion Lumos. Fragment ions were measured in the orbitrap with 120k resolution with 246 ms maximum ion injection time unless otherwise noted.

Plasma Experiment. Frozen liquid plasma treated with sodium heparin was purchased from BiolVT. Lyophilized plasma treated with citrate buffer was purchased from Sigma Aldrich (P9523-1ML) and resuspended in 1 mL of sterile deionized water immediately before use. Both plasma types were depleted in parallel with Top12 spin columns (Pierce #85165) according to the manufacturer instructions. Eluted plasma protein samples from the spin columns were concentrated and buffer exchanged into denaturation buffer (8M Urea with 50 mM TEAB, pH 8.5) to approximately 40 microliters with a 10 kDa (0.5 mL size) Amicon ultrafiltration device. Undepleted plasma was diluted 17.5-fold into the same denaturation buffer. Protein concentrations from depleted and not depleted plasma samples in denaturation buffer were determined using the BCA assay. The protein concentration of all samples was adjusted to 1 mg/mL in 40 total microliters, and TCEP and chloroacetamide were added to a final concentration of 10 mM. After protein reduction and alkylation for 30 minutes, the urea was diluted to 2M Urea with 50 mM TEAB buffer, and enzymatic hydrolysis of proteins was initiated by the addition of 0.8 micrograms of LysC and trypsin, which was allowed to proceed overnight at room temperature. The reaction was stopped in the morning by adding 16 microliters of 10% FA, and peptides were desalted with Phenomenex Strata-X 33 μm polymeric reversed phase cartridges (10 mg sorbent, 1 mL tube, part #8B-S100-AAK). DI-SPA analysis was performed using the best parameter scouting method.

MitoTox Experiment—Cell Culture. 293T cells were purchased from ATCC (#CRL-3216) and maintained in DMEM (4.5 g/L glucose, 4 mM glutamine, no pyruvate—Thermo #11965092) supplemented with 10% fetal bovine serum (FBS) and 1× penicillin/streptomycin (100 U/mL final [c]). Human Plasma-Like Medium (HPLM) was supplemented with 10% dialyzed FBS (Thermo #26400036) and 1× penicillin/streptomycin (100 U/mL final [c]). For heavy labeling, 293T cells were labeled using the DMEM-based SILAC protein quantitation kit (Thermo #A33972). Briefly, cells were grown for at least 5 passages SILAC-compatible DMEM supplemented with 10% dialyzed FBS, $^{13}C$ $^{15}N_2$ L-lysine-2HCl and $^{13}C_6$ $^{15}N_4$ L-arginine HCl, and 1× penicillin/streptomycin. SILAC labeling was confirmed through mass spectrometry analysis and ratios of light/heavy cells were titrated based on analysis of median ratios observed in the controls. All cells were grown in a tissue culture grade incubator held at 37° C. supplemented with 5% CO2. Cells were verified as *mycoplasma* negative via the e-Myco *Mycoplasma* PCR Detection Kit (Bulldog Bio #25233).

Generation of PPTC7 knockout 293T cells. PPTC7 knockout in 293T cells was performed using the AltR system (Integrated DNA Technologies/IDT) for delivery of CRISPR-Cas9 reagents. A single guide RNA was selected toward exon 1 of PPTC7 (5'-TCTCGGTCC TCTCGTACGGG-3') using the crispr.mit.edu tool, and was ordered as an Alt-R CRISPR-Cas9 crRNA (IDT). This crRNA, along with ATTO550-TracrRNA (IDT #1075927) were used to generate a TracrRNA-crRNA complex, which was incubated in equimolar amounts (1 µm each) with AltR Cas9 V3 Nuclease (IDT #1081058). This complex was transfected at a final concentration of 30 nM with Lipofectamine RNAiMAX (Thermo #13778075) into $4.8 \times 10^5$ 293T cells seeded in a 12 well dish. Cells were transfected for 48 hours before selection into single-cell colonies and growth as monoclonal cell lines. Monoclonal cell lines were expanded, frozen down, and validated for PPTC7 knockout via Western blotting for endogenous Pptc7 (Novus, cat #NBP1-90654). The specificity of this antibody was validated using wild type and Pptc7$^{-/-}$ mouse embryonic fibroblasts derived from a previously generated Pptc7$^{-/-}$ mouse model (Nagy et al., Anal. Chem., 91, 4374-4380 (2019)).

MitoTox screen conditions. 293T or PPTC7 knockout 293T cells were split and plated in 24 well plates at $7.5 \times 10^4$ cells per well. Cells were allowed to adhere overnight, and media was replaced with fresh DMEM or HPLM for a total of 24 hours prior to collection of cells. Compound treatments were grouped into 6-hour or 24-hour incubations, with 6-hour compound treatments occurring in the last 6 hours of the 24-hour media change, and 24-hour compound treatments occurring for the entire 24 hours of media treatment. Compounds used for 6 hours include antimycin A (5 µM final [c], Sigma #A8674), rotenone (5 µM final [c], Sigma #R8875), oligomycin (2.5 µM final [c], Sigma #O4876), CCCP (10 µM final [c], Sigma #C2759), valinomycin (1 µM final [c], Sigma #V0627) and CDDO (2.5 µM final [c], Cayman Chemical #11883)). Compounds used for 24 hours include doxycycline (10 µg/ml final [c], VWR #75844-668) and Deferoxamine (DFO, 100 µM final [c], Sigma #D9533). One compound, 4-nitrobenzoate (4-NB, 1 mM final [c], Sigma #461091), requires 6+ days for efficacy (Forsman et al., Nature Chemical Biology, 6, 515-517 (2010)), and thus cells were treated with this compound for 5 days before being split to $7.5 \times 10^4$ cells per well and grouped with the 24 hour incubations. Control, untreated 293T cells were split and harvested with both the 6-hour and 24-hour compound treatment sets. All conditions were plated and collected in 3 replicate wells.

To generate an internal control for each sample, SILAC-heavy labeled 293T cells (see "Cell Culture" for details) were spiked into lysis buffer in at ~1:1 ratios of signal to light samples, as determined by mass spectrometry (corresponding to $8 \times 10^5$ heavy labeled cells per well of light cells). Heavy cells were counted and resuspended at a final concentration of $8 \times 10^5$ heavy cells in 80 µl lysis buffer (8M urea, 50 mM TEAB, pH 8.5, 5 mM TCEP, and 10 mM chloroacetamide). 80 µl of lysis buffer containing heavy labelled cells was added to each well of compound-treated light cells, scraped, collected, and flash frozen until preparation for mass spectrometry.

Mitochondrial enrichment from 293T cells. Sets of $6 \times 10$ cm$^2$ plates of 293T, PPTC7 KO 293T, and SILAC labeled 293T control plates were used to isolate crude mitochondrial fractions. Cells were washed, collected in dPBS, and spun at 1000×g at 4° C. Cell pellets were resuspended in hypotonic buffer (20 mM Tris, pH 7.4, 1 mM EDTA) for 10 min. on ice. After 10 min, protease inhibitors were added (500 µg/ml final [c] of each of the following inhibitors: Pepstatin A, Chymostatin, Antipain, Leupeptin, Aprotinin), and cells were homogenized in a pre-chilled dounce homogenizer using 40 strokes. 2× sucrose/mannitol solution was added to cells (for final [c] of 220 mM mannitol, 70 mM sucrose, 10 mM Tris pH 7.4, 1 mM EDTA). Unbroken cells and nuclei were spun at 700×g for 10 min. at 4° C. Supernatant was transferred to a fresh, pre-chilled microcentrifuge tube and spun at 12,000×g for 10 min. at 4° C. The resulting pellet, enriched in crude mitochondria, was washed 1× in dPBS, respun at 12,000×g for 10 min. at 4° C., and flash frozen until preparation for mass spectrometry.

Seahorse assay. 293T or PPTC7 KO 293T cells were split, plated to poly-D-lysine coated Seahorse eXF96 plates at 15,000 cells/well, and allowed to adhere to the plate overnight in DMEM supplemented with 10% FBS and 1×P/S. The next day, media was aspirated, cells were washed 1× with dPBS, and media was replaced with DMEM, and cells were incubated in this media for 24 hours. After 24 hours, and immediately before the Seahorse run, treatment media was aspirated, cells were washed 1× with dPBS, and media was replaced with Seahorse XF DMEM Medium, pH 7.4 (Agilent #103575-100) supplemented with 10 mM glucose, 1 mM pyruvate, and 2 mM glutamine. Oxygen consumption rates (OCR) and extracellular acidification (ECAR) was monitored on a Seahorse eXF96 basally, and in the presence of a Seahorse XF Cell Mito Stress Test (Agilent #103015-100). For the Stress Test, cells were treated with 1 µM final [c] oligomycin, 1 µM final [c] FCCP, and 0.5 µM final [c] or rotenone and antimycin A. After the assay, cells were fixed with 1% glutaraldehyde, stained with 1.5% crystal violet, and, after release of the stain with 10% acetic acid, each well was read at an absorbance of 590 nm (Kueng et al., Analytical Biochemistry, 182, 16-19 (1989)). These absorbance values were used to normalize each assayed well within the Wave software (version 2.6.0). Data were exported from the Wave software and analyzed using Prism (version 8).

Peptide Quantification from DI-SPA. Peptides were quantified using custom code written in python and R available from: http://github<dot>com/jgmeyerucsd/DI2A. Pyteomics (Levitsky et al., Journal of Proteome Research, 18, 709-714 (2019)) was used to access mzxml files for quantification in Python. To perform quantification, at least one of the three most abundant y-ions (either heavy or light) was required to be observed within 10 ppm unless otherwise noted. The median ratios of heavy/light were determined from those y-ions (up to 3 of the most abundant). If the heavy or light partner was not detected, the average value of the 10 least abundant peaks in the MS/MS spectra was used as noise for the missing partner ion to compute a ratio. For the whole cell mitotox samples, at least one heavy or light y-ion was required to be observed within 12 ppm of the expected mass to compute quantification. For the enriched mitochondria samples, data was collected with a maximum ion injection time of 502 ms and a resolution of 240,000 in the orbitrap. This higher quality data was analyzed with more stringent requirements; all three pairs of the three most abundant heavy and light ions were required to be detected within 10 ppm to report quantification.

Statistics. Unless otherwise noted, statistical tests used for data presented in main and extended data figures were independent 2-sample, two tailed t-tests assuming equal variance. Exactly three replicate biological samples from independent cell cultures were compared in all statistical tests (for example, separate wells in a multi-well plate).

Replicates were from one independent experiment. Exact p-values are available in the legend or source data table, and experiments were not replicated. The supplementary data zip file contains tables of ANOVA with f-statistics, p-values and degrees of freedom for all proteins quantified compared across factors and interactions in the multi-factorial experiment.

Data Availability. All raw data (along with excel sheet giving details of each file), filtered and unfiltered search results, and quantification files are available on massive under the dataset identifier MSV000085156 (https://doi.org/doi:10.25345/C5M686). The massive repository also includes the relevant human FASTA database "2019-03-14-td-UP000005640.fasta". Detailed descriptions of the RAW data files are on massive under the folder "other" in the excel file "Raw data files descriptions v3.xlsx". The massive repository includes the human spectral libraries for use with MSPLIT-DIA, and the files used to create libraries. Code availability: All data analysis code is written in python and R and was available on github.

Example 3—Multi-Omic Data Collection

Disruptions to metabolism are central to many human diseases. Complete mapping of metabolic pathways is necessary to understand disease pathophysiology using network modeling (Patel-Murray et al., Sci. Rep., 10, 954 (2020); and Pirhaji et al., Nat. Methods, 13, 770-776 (2016)). Many basic cellular metabolic pathways are known, such as the direct enzyme catalysis routes and even many allosteric feedback circuits. Still, new metabolic pathways and connections between metabolites and proteins continue to be discovered using direct protein binding assays, multi-omic profiling, or by targeted hypotheses (Piazza et al., Cell 172, 358-372.e23 (2018); Luzarowski et al., J. Exp. Bot., 70, 4605-4618 (2019); Lapointe et al., Cell Syst., 6, 125-135.e6 (2018); Stefely et al., Nat. Biotechnol., (2016) doi:10.1038/nbt.3683; and Shimazu et al., Science, 339, 211-214 (2013)).

Despite these achievements, the field of metabolism is held back by critical barriers, such as the incompleteness of metabolism models, as well as the fact that methods to discover indirect metabolic-protein connections are slow. To provide fast and comprehensive methods for simultaneous multi-omic sample analysis, gas-phase separation mass spectrometry is extended to simultaneous proteomic, metabolomic, and lipidomic analysis (FIG. 19).

Multi-Omic Data Collection Focus. Mass spectrometry is currently the best method to quantify the proteome, lipidome, and metabolome of organisms. Despite recent advancement of mass spectrometry-based omics to achieve greater depth, omics analysis is still low throughput, requiring at least 30-240 minutes per proteome, and 15-30 minutes each per metabolome and lipidome. Further, due to a requirement for different chromatographic conditions for these very different molecular classes, different mass spectrometers are often dedicated for each separate omic analysis. This often makes multi-omic analysis inaccessible due to the large capital costs, which translates into a high cost per omic analysis. Many private companies charge over $1,000 for a single sample analysis, academic core labs are often backed up for months, and few groups offer analysis of multiple omic subsets. Thus, several critical barriers to widespread multi-omic analysis exist.

An embodiment of the present invention provides rapid and complete multi-omic data on a single platform. The goal of simultaneous multi-omics is long sought after where multiple innovations rely on creative LC-based strategies (Li et al., J. Chromatography A, 1409, 277-281 (2015); Wang et al., Analytica Chimica Acta, 966, 34-40 (2017); Schwaiger et al., Analyst, 144, 220-229 (2019); and He et al., Anal. Chem., 93 (9), 4217-4222 (2021)). In addition to the issues mentioned above, another major motivating factor for higher throughput is the need to apply deep learning with neural networks to automate data analysis and interpretation, which out-performs standard machine learning models in many cases. Although some neural networks can be trained with less than 1,000 examples (Meyer et al., J. Chem. Inf. Model., (2019) doi:10.1021/acs.jcim.9b00236), generally thousands of examples are needed to realize the full potential of deep learning. The need for thousands of multi-omic examples may sound impossible or unreachable, especially by a single investigator with a single mass spectrometer. In fact, with the technology and methods from only a few years ago, this was unreachable.

As discussed above, the present invention provides a fast shotgun proteomics method that replaces time consuming liquid chromatography (LC) before mass spectrometry (FIG. 20, panel A) with gas phase separation by ion mobility (FIG. 20, panel B). This method enables quantification of up to 500 proteins in only 2.5 minutes. This method was applied to a high throughput study of known mitochondrial toxins, and resulted in the quantification of 341 complete protein profiles across all 132 samples (over 45,000 protein measurements) in only 4.4 hours (FIG. 20, panel C). This vertical leap in the field of mass spectrometry-based omics enable faster proteome analysis.

By using a Orbitrap Exploris 240 mass spectrometer equipped with FAIMS to enable the continued development of Direct Infusion-Shotgun Proteome Analysis (DI-SPA), the proteomic depth of DI-SPA is able to be expanded to a full yeast proteome, and is also able to enable simultaneous proteomic, metabolomic and lipidomic analysis. For example, using this technology enables the building of a massive database of 10,000 chemo-multi-omic triplets of yeast strains treated with 2,000 FDA approved drugs (5 reps/drug).

Full Yeast Proteome by DI-SPA. There are about 3,700 proteins expressed by yeast (Ghaemmaghami et al., Nature, 425, 737-741 (2003); and Hebert et al., Mol. Cell. Proteomics, 13, 339-347 (2014)). The key route to improve proteomic depth of DI-SPA is to increase the efficiency of electrospray ionization (ESI), which is the process by which analytes are transferred from liquid phase to gas phase for mass spectrometry analysis (Fenn et al., Science, 246, 64-71 (1989)). ESI has low efficiency, probably around 1-20% (El-Faramawy et al., J. Am. Soc. Mass Spectrom., 16, 1702-1707 (2005); and Page et al., J. Am. Soc. Mass Spectrom., 18, 1582-1590 (2007)), and changes in the composition of the solution that is electrosprayed can change sensitivity. For example, the addition of 5% DMSO boosted the sensitivity of peptide analyte ions upon ESI (Meyer et al., J. Am. Soc. Mass Spectrom., 1-10 (2012); and Hahne et al., Nat Meth, 10, 989-991 (2013)). Thus, adding 5% DMSO to samples during DI-SPA may improve the sensitivity, along with alternative factors such as tuning counter ions and pH (Kostiainen et al., J. Chromatogr. A, 1216, 685-699 (2009)).

To find the best solution for combined dissolution of various sample, various combinations of solutions are screened with standards that span molecule classes and multi-omic extracts from yeast. Using DMSO to improve electrospray may aid in combined dissolution, but the best solution for dissolution of all molecules may not be the best electrospray solution. Therefore, the delivery of solvent vapors may be separated from the sample solution using a sheath around the electrospray capillary (Kammeijer et al., Anal. Chem., 88, 5849-5856 (2016)).

A second route to improve the sensitivity of DI-SPA is to develop a label-free quantification method. Previous methods require that each sample be spiked with a heavy stable isotope-labeled proteome, often referred to as SILAC (Ong et al., Mol. Cell. Proteomics, 1, 376-386 (2002)). The use of a heavy isotope standard proteome spiked into each sample ensures accurate quantification because each analyte has a heavy reference mass for comparison, but the cost is that measurement of the heavy standard simultaneously with the light endogenous peptide is that it doubles the analysis time. Thus, a label-free quantification strategy is beneficial. Such a strategy could be enabled by addition of exogenous protein standards for normalization across samples, and/or by computational normalization strategies across measured protein profiles. These strategies can be validated with known differences in human protein quantities spiked into a yeast background.

Automated, simultaneous, high-throughput multi-omics. Extraction of all three omic molecule sets from a single sample is usually accomplished using a biphasic extraction (Stefely et al., Nat. Biotechnol., (2016) doi:10.1038/nbt.3683; and Folch et al., J. Biol. Chem., 226, 497-509 (1957)). Sample preparation here is instead automated in 96-well plates with robotics. For example, a modified form of filter assisted sample preparation using chemical-resistant PES membranes (Potriquet et al., J. PLOS ONE 12, e0175967 (2017)) would allow cell washing, lysis with organic solvent to collect lipids and metabolites, and retention of proteins for proteomic sample preparation.

Multi-omic analysis: direct infusion (DI) MS for metabolomics is common (Southam et al., Nat. Protoc., 12, 310-328 (2017)), and a commercial solution for DI-IMS lipidomics exists (Contrepois et al., Sci. Rep., 8, 17747 (2018)). Therefore, it is likely that DI of metabolites and lipids can be combined with the method for DI of peptides. Differential ion mobility of molecule classes (FIG. 20, panel D) can be leveraged to enable simultaneous analysis from a single infused solution of peptides, lipids, and metabolites. Peptides usually bear at least two positive charges, and are transmitted in the compensation voltage range of −100 V to −30V, but lipids and metabolites are often (but not always) singly-charged and transmit at a different voltage range. In a positive ESI mode experiment, metabolites from bacteria were transmitted through FAIMS about −10 V to about −40 V. Also, by performing the simultaneous analysis as an infusion, issues related to requirements for different chromatographic phases are avoided. Quantitative accuracy of the multi-omic triplet method are validated with stable isotope labeled standards at varied concentrations.

Example 4—CsoDIAq Software for Direct Infusion Shotgun Proteome Analysis (DISPA) and Data Independent Acquisition Direct infusion shotgun proteome analysis (DISPA) is a new paradigm for expedited mass spectrometry-based proteomics, but conventional data analysis workflow can be onerous. This example introduces CsoDIAq, a user-friendly software package for the identification and quantification of peptides and proteins from DISPA data. In addition to establishing a complete and automated analysis workflow with a graphical user interface, CsoDIAq introduces algorithmic concepts to spectrum-spectrum matching to improve peptide identification speed and sensitivity. These include spectra pooling to reduce search time complexity and a new spectrum-spectrum match score called match count and cosine, which improves target discrimination in a target-decoy analysis. Fragment mass tolerance correction also increased the number of peptide identifications. Finally, CsoDIAq is adaptable to standard LC-MS DIA and outperforms other spectrum-spectrum matching software.

Introduction. Shotgun proteomics using liquid chromatography (LC) coupled to tandem mass spectrometry (MS/MS) is currently the leading method to identify and quantify proteome dynamics from biological samples. Two main types of mass spectrometry (MS) data acquisition exist, namely data-dependent analysis (DDA) and data-independent analysis (DIA) (Meyer et al., Methods Protoc., 2(1), doi.org/10.3390/mps2010008 (2019); Venable et al., Nat. Methods, 1(1), 39-45 (2004); Gillet et al., Mol. Cell. Proteomics, 11(6), doi.org/10.1074/mcp.O111. 016717 (2012); and Meyer et al., Expert Rev. Proteomics, 14(5), 419-429 (2017)).

As the name implies, the scan sequence in DDA depends on the data and is unique in every analysis. In each scan cycle, DDA surveys m/z values that may represent peptides in an initial precursor MS scan, followed by fragmentation of those masses in aMS/MS scans. In contrast, DIA fragments all masses within a predefined set of m/z ranges, usually spanning the mass range of useful peptide masses from approximately 400-1,000 m/z. DIA scans therefore usually result in chimeric spectra representing the combined MS/MS spectra of multiple peptides. DIA has grown significantly in popularity since its conception, as DIA data allows for deeper and more consistent peptide quantification than DDA. However, methods for DIA data analysis are still maturing, and continued advancements are required to maximize the value extracted from DIA. Further, the continued development of new DIA data collection methods requires specialized new tools.

Several methodologies exist for identifying peptides from DIA MS data, including EncyclopeDIA, PECAN, Spectronaut, DIA-Umpire, DIA-NN, Thesaurus, OpenSWATH, Skyline, mProphet, LFQbench, and PIQED (see Searle et al., Nat. Commun., 9(1), 5128 (2018); Ting et al., Nat. Methods, 14(9), 903-908 (2017); Bruderer et al., Mol. Cell. Proteomics MCP, 14(5), 1400-1410 (2015); Tsou et al., Nat. Methods, 12(3), 258-264 (2015); Demichev et al., Nat. Methods, 17(1), 41-44 (2020); Searle et al., Nat. Methods, 16(8), 703-706 (2019); Röst et al., Nat. Biotechnol., 32(3), 219-223 (2014); MacLean et al., Bioinformatics, 26(7), 966-968 (2010); Reiter et al., Nat. Methods, 8(5), 430-435 (2011); Navarro et al., Nat. Biotechnol., 34(11), 1130-1136 (2016); and Meyer et al., Nat. Methods, 14(7), 646-647 (2017)).

Recent advances in machine learning have opened up the possibility of de novo sequencing, or matching to predicted MS/MS spectra, such as Prosit, DeepMass, and DeepDIA (Tran et al., Nat. Methods, 16(1), 63-66 (2019); Gessulat et al., Nat. Methods, 16(6), 509-518 (2019); Tiwary et al., Nat. Methods, 16(6), 519-525 (2019); and Yang et al., Nat. Commun., 11(1), 146, (2020)). However, many DIA data analysis methods require scoring the presence of peptides by comparing to spectra previously identified by DDA. Because almost all proteomics DIA relies on LC, this is often achieved by assigning possible peptides a score based on the co-elution of peptide fragment ion signals over time. The correct retention time plays an important role in limiting the search for peptide fragment signals (Escher et al., Proteomics, 1 (8), 1111-1121 (2012)). True and false peptide matches are segregated using the target-decoy strategy to estimate false discovery rate (FDR) (Benjamini et al., J. R. Stat. Soc. Ser. B Methodol., 57 (1), 289-300 (1995)). A different strategy that only considers each spectra without need for LC uses the projected spectrum concept (Wang et al., Mol. Cell. Proteomics MCP, 9(7), 1476-1485 (2010)). MSPLIT-DIA identifies peptides from complex, chimeric DIA spectra by only comparing the shape of fragment ion intensities within some mass tolerance of library spectra fragments (Wang et al., Nat. Methods, 12(12), 1106-1108 (2015)).

As noted above, nearly all proteomics experiments rely on LC to separate peptides before ionization and MS analysis. The field of proteomics is experiencing a trend toward shorter LC gradients (Messner et al., Nat. Biotechnol., 1-9 (2021); and Sidoli et al., Genome Res., 29(6), 978-987 (2019)). An embodiment of the invention described herein introduces a new paradigm that enables fast proteomics called direct infusion shotgun proteome analysis (DISPA), which does not use LC separation and instead relies on additional fractionation by ion mobility (Meyer et al., Nat. Methods, 17(12), 1222-1228 (2020)). In the original implementation of DISPA, because direct infusion data lacks co-elution of peptide fragments over time, projected cosine scoring was relied upon with MSPLIT-DIA for peptide and protein identification. Because MSPLIT-DIA was not customized to DISPA data and does not natively identify proteins, FDR calculation, protein identification and quantification of DISPA required customized python and R scripts to run to completion. Overall, the process was incoherent and could deter future use of DISPA, despite its potential to enhance study of the proteome.

This example describes CsoDIAq (Cosine Similarity Optimization for DIA qualitative and quantitative analysis), a software package designed to enhance usability and sensitivity of the projected spectrum concept originally utilized by MSPLIT-DIA. CsoDIAq introduces several algorithmic advances, including pooling spectra peaks for reduced time complexity and a new spectra-spectra scoring function that improves discrimination of target and decoy peptides. Combined with a Graphic User Interface (GUI), CsoDIAq is both effective and user friendly, and analyzes DIA from DISPA and LC-MS. CsoDIAq identified nearly twice as many peptides as MSPLIT-DIA when applied to DISPA data, and more peptides from standard LC-MS DIA data. CsoDIAq can also be applied with DISPA data from a next generation Orbitrap Exploris 240 and identify over 1000 human proteins in just a few minutes.

Data and Formats. CsoDIAq reads raw mass spectrometry data in mzXML format, with spectral libraries created with SpectraST (Lam et al., Proteomics, 7(5), 655-667 (2007)) in TraML tsv format being preferred. However, mgf libraries created with MPLIT-DIA (Wang et al., Nat. Methods, 12(12), 1106-1108 (2015)), or the pan-human library (Rosenberger et al., Sci. Data, 1(1), 140031 (2014)), are also supported. Spectral libraries were generated with multiple settings and the best library creation settings in this study were: no fragments corresponding to loss of water/ammonia, only fragments from 400-2000 m/z within a 0.2 m/z tolerance of the predicted mass (the initial TraML library was built from low-resolution MS2 data).

DISPA data used to develop CsoDIAq was mostly from the original publication (Meyer et al., Nat. Methods, 17(12), 1222-1228 (2020)). Libraries with an excess number of peptides not present in the sample will result in fewer accurate peptide identifications (Jeong et al., BMC Bioinf., 13: S2 (2012)). The TraML library used in the analyses presented herein has fewer library peptides than the mgf library used in the original publication, and generally produces more reliable peptide identifications. New RAW mass spectrometry data files and new spectral libraries are posted to a new repository.

Spectra Pooling. CsoDIAq introduces a library-query peak comparison method dubbed "spectra pooling" that reduces the time complexity by an exponential factor. Four variables primarily impact the speed of the algorithm in any given m/z window of a DIA analysis, namely the number of library spectra corresponding to that window (nLS); the total number of fragment ion peaks in nLS library spectra (pLS); the number of query spectra (nQS); and the total number of fragment ion peaks in nQS query spectra (pQS). MSPLIT-DIA iteratively compares each library spectrum to each query spectrum, presuming the precursor mass of the peptide represented by the library spectrum falls within the m/z window captured by the query spectrum. If the above variables are assigned the letter values of nLS, pLS, nQS, and pQS, respectively, the time complexity of this method would be nQS*pLS+nLS*pQS overall. Variation in these factors significantly impacts the length of time required to complete the algorithm. In big O notation, the above equation results in a time complexity of O(n*m).

Spectra pooling reduces unnecessary repetition in peak comparison, significantly improving speed at no cost to accuracy. MSPLIT-DIA separately compares a query spectrum to each relevant library spectrum, therefore referencing the same peak from one spectra type once for each other spectrum with a precursor m/z within a given m/z query window. Spectra pooling instead assigns each fragment ion a spectrum tag in addition to its inherent mass and intensity values, which allows consolidation or pooling of multiple spectra into a single spectrum for comparison. Matches to fragments in the pooled spectra can be separated after matching using their spectrum tag to compute the separate match scores. Thus, by comparing a pooled query spectrum to a pooled library spectrum, any peak would only ever be referenced once. This exponentially reduces the time complexity of the above conventional approach from (nQS*pLS+nLS*pQS) to (pLS+pQS) without sacrificing accuracy. In big O notation, this results in a new time complexity of O(n+m).

DISPA iterates over the same m/z query window at least once for every compensation voltage setting. In terms of the above equation, nQS is generally equal to the number of compensation voltage settings run in the experiment. The dataset used as the benchmark iterated over the same m/z query windows twelve times for a scouting experiment, twice each for six compensation voltage settings.

Two additional versions of the algorithm, one with only library spectra pooling and one with no pooling, were created to graphically illustrate the impact of spectra pooling on time complexity. Only pooling one spectrum type enables graphical comparison of performance between pooling and non-pooling on spectra from the other type. Library spectra were pooled as opposed to query spectra for graphical representation because the number of library spectra (generally measured in thousands) often far exceeds the number of query spectra (approximately six) in a given m/z query window for DISPA data, and thus will more fully demonstrate the dramatic reduction in time complexity. Both versions of the algorithm, spectra pooling and non-pooling, were based on copies of the main algorithm, which was created under the assumption that pooling would occur. The non-pooling algorithm was not optimized contrary to this expectation, which may cause additional time lag. However, the overall reduction in time complexity remains as above described.

Query spectra are grouped by precursor mz and window width for pooling. By default CsoDIAq pools all grouped query spectra, but users can indicate a maximum number of spectra to pool to reduce memory use.

Scoring Method. CsoDIAq employs a scoring algorithm to generate peptide-spectra matches (PSMs) that reliably and consistently separates target and decoy peptide distributions to optimize the number of peptide hits above a standard False Discovery Rate (FDR) cutoff. CsoDIAq first takes the square root of fragment ion peak intensities in the spectral library and experimental spectra to normalize the contributions of fragment ion intensities (Frewen et al., Anal. Chem., 78(16), 5678-5684 (2006); Tabb et al., Anal. Chem., 75(10), 2470-2477 (2003); and Stein et al., J. Am. Soc. Mass Spectrom, 5(9), 859-866 (1994)). Next, for each experimental spectra, the fragment ions are compared with the pooled library spectra of all possible matches. Like MSPLIT-DIA, CsoDIAq only calculates scores from matched peaks between library and query peaks. This includes the cosine similarity score, making it a projected cosine score. Fragment comparisons are done using parts per million (PPM) rather than absolute m/z differences. All matched fragment ions are recorded to compute a PSM score for all possible peptides in the pooled library.

After fragment matching, the score is calculated from the number of matched peaks between the library and query spectra and the cosine score calculated from the intensities of the matched fragment ions, CsoDIAq employs a scoring mechanism that multiplies the fifth root of the match number by the cosine score, which significantly reduces the variance of the results. Because of the importance and impact of peak matches on the PSM score, CsoDIAq imposes a minimum of three fragment ion matches to the library spectrum with no maximum.

The number of matches between a library and query spectra plays a significant role in these calculations, and as such noise in a library spectrum can strongly skew the CsoDIAq score. This is primarily a concern for MGF libraries, as the TraML format already filters for fragment mz values expected for a given peptide. As such, all libraries are pre-processed to only include the top ten most intense peaks. For the same reasons, CsoDIAq only functioned with centroided data.

PPM Correction Process. In addition to employing a novel scoring mechanism, CsoDIAq also employs a dual search strategy for fragment ion mass correction. When comparing library peaks with query peaks, m/z values for true corresponding fragments are not expected to precisely match. In addition to a margin of error in the query spectrum resulting from the natural variance of mass spectrometry machines generally, drift in mass calibration can result in a systematic mass value offset. To adjust for this, CsoDIAq runs an initial, uncorrected analysis of the data using a generic offset of 0 PPM and a default, adjustable tolerance of 30 PPM. These numbers were based on previous experimentation that suggested an overall window of 30 PPM around 0 PPM would capture both the true offset in addition to sufficient data to calculate an optimized tolerance. After identifying peptides of interest using the previously described scoring method, csoDIAq determines a new offset and tolerance from the mean and second standard deviation, respectively, of all PPM differences for those hits. CsoDIAq then runs a second, corrected analysis using the new offset and tolerance, which significantly and consistently outperforms the uncorrected analysis in the number of unique identifications.

For reference, the MSPLIT-DIA has a minimum allowance of ten matching peaks and a minimum cosine score of 0.7. Results were sorted by cosine score to calculate the FDR of each PSM for comparison with CsoDIAq output. Notably, all PSMs from the MSPLIT-DIA consistently had a lower FDR than 0.01, leading to acceptance of all PSMs.

Peptide and Protein Identification. CsoDIAq produces three files per experimental dataset, one each for spectral, peptide and protein FDR calculations. In each case, CsoDIAq sorts peptide identifications by the above-described score, calculates the FDR for each identification using a modification of the target-decoy approach where FDR at score S=#decoys/#targets, and removes PSMs below a 0.01 FDR threshold. The spectra report is returned without filtering by unique PSMs. The peptide FDR calculations only use the highest-scoring instance among all PSMs. CsoDIAq uses the IDPicker algorithm (Zhang et al., J. Proteome Res., 6(9), 3549-3557 (2007)) to identify protein groups from the list of discovered peptides and adds them as an additional column in the output. Protein groups from the TraML spectral library are used for protein inference rather than matching peptides back to protein entries in a FASTA file. The implementation of the IDPicker algorithm preferentially identifies proteins with a higher number of peptide connections after the peptide reduction step. When there is a tie, the algorithm instead uses the original number of peptide connections per protein. The protein FDR calculations only use the highest-scoring peptide of each protein group, though all peptides connected to those proteins in the peptide FDR output are re-included in the protein report for reference.

Protein Quantitation. Accurate protein quantitation requires a second DIA analysis that targets m/z and Compensation Voltage (CV) values corresponding to identified proteins. CsoDIAq uses two criteria to choose representative peptides identified for each protein. First, peptides not unique to a given protein are eliminated from consideration. Next, CsoDIAq sorts the peptides from each protein by ion count. Ion count is identified as the sum of intensities for all matched peaks between the peptide library spectrum and the query spectrum. Finally, the software allows the user to input their desired maximum number of representative peptides from each protein, starting with the highest ion count.

The targeted quantitative DISPA re-analysis currently requires that samples are prepared using Stable Isotope Labeling by Amino acids in Cell culture (SILAC), specifically using both $^{13}C_6$, $^{15}N_2$ lysine and $^{13}C_6$, $^{15}N_4$ arginine. CsoDIAq first prepares library spectra specific to the y-ions of the targeted peptides and their heavy isotopes. CsoDIAq uses a default initial tolerance of 20 ppm before optionally applying the same mass correction algorithm discussed earlier to identify an offset and tolerance specific to the DISPA run. After identifying matched peaks (default: at least one of the top three most intense peaks), CsoDIAq calculates the SILAC ratio for each peptide based on the identified peaks (default: median ratio value).

The user can input (1) the desired number of initial library peaks, (2) the standard deviation used to determine the tolerance of the correction process, (3) the minimum number of matches required to calculate SILAC ratios for the peptide, and (4) the mode of ratio selection.

Note that the file for the targeted re-analysis will not have all the leading proteins from the protein FDR file. This is because the decoys will be removed, and because some proteins identified by the IDPicker algorithm won't have unique peptide targets to use.

Comparison with MSPLIT-DIA. For comparing the output of MSPLIT-DIA with CsoDIAq, an MGF library was generated using the original data pipeline from skyline blib converted to .ms2 and then .mfg. Peptides in the library were stripped of modifications for protein identification from a FASTA file after initial library generation. The script for adding proteins to an MGF file is included in the CsoDIAq package at the command line. Both program settings included an initial tolerance of 10 PPM. A standard window width of 2 Daltons (Da) was used in the generation of the initial test data, a value that is identified in the data file by CsoDIAq but manually entered for MSPLIT-DIA. Aside from the initial tolerance, all default settings were used for CsoDIAq output. MSPLIT-DIA output was processed using the same FDR calculation algorithms used by CsoDIAq at both the peptide and protein level. The MSPLIT-DIA output column name "Peptide" was altered to "peptide" for this process, and the output was sorted by the cosine score rather than the MaCC score for FDR calculation.

Usability. CsoDIAq was written to be used from the command line through the pip installation package. All help text and flag descriptions can be viewed with the "--help" flag, as is standard for programs triggered from the command line. The CsoDIAq command line returns an error for improper inputs.

In addition to command line operations, the CsoDIAq software package includes a graphical user interface (GUI) implemented with the package PyQt5. Ultimately, the GUI only serves as a shell for command line prompts and flags. From the GUI, invalid inputs highlight the offending section title in red, whereas the command line throws an error. A text window included in the GUI indicates progress through the program and highlights errors should they arise.

Results overview. DISPA has emerged as a promising method for peptide and protein identification and quantitation. However, the original pipeline lacked unified computational support. As shown in FIG. 21, DISPA data analysis requires: (1) spectra-spectra match scoring, (2) FDR filtering to remove false positives, (3) protein inference, and (4) peptide quantitation via light-to-heavy isotope ratio comparison. In the original implementation, MSPLIT-DIA was used to score peptides from DISPA data according to the projected spectrum concept (Wang et al., Mol. Cell. Proteomics MCP, 9(7), 1476-1485 (2010)). However, an integrated solution including the above-mentioned workflow steps was not developed in the initial publication. To address this limitation, this example introduces CsoDIAq (Cosine Similarity Optimization for DIA qualitative and quantitative analysis), a software package that efficiently consolidates the analytical pipelines needed for DISPA data analysis (FIG. 21). In addition to supporting the steps that previously required custom code, CsoDIAq optimizes peptide identification by introducing a new scoring function based on a combination of projected cosine and the number of matched fragment ions. Further, a 2-stage search strategy is also introduced. The combination of these two new features nearly doubles the number of unique peptide identifications at <1% FDR.

Spectra Pooling Results. The use of spectra pooling to compare library and query spectra significantly improved the time performance of the algorithm. Rather than iteratively comparing multiple library spectra to multiple query spectra, spectra pooling tags each peak with a spectrum-specific identifier to enable library spectra "pooling". Key to this strategy is subsequent fragment ion match separation for scoring. By pooling all relevant spectra prior to peak comparison, CsoDIAq only ever iterates over each fragment ion peak a single time, which reduces the time complexity from $O(m*n)$ to $O(m+n)$ (FIG. 22, panel A). CsoDIAq analysis was performed with and without pooling to illustrate this effect. FIG. 22, panel B shows how the time required to compare a single experimental spectra increases with the number of query fragment ions and the number of potential library spectra matches. The number of fragment ion peaks in the query spectra shows positive linear correlation with time, the slope of which decreases as the number of library spectra increases (FIG. 22, panel C). In contrast, the time to analyze one experimental spectra requires roughly a static amount of time independent of the potential library spectra matches and queried experimental fragment ions (shown near the y-axis). Overall, the pooling strategy is nearly two orders of magnitude faster than without pooling (see also FIG. 22, panel D).

Peptide Spectrum Match Scoring. CsoDIAq introduces two novel methods that, when combined, consistently improves upon MSPLIT-DIA in identifying target PSMs below an FDR threshold of 0.01: (1) scoring method unique to CsoDIAq and (2) fragment ion mass corrected re-analysis.

Two variables that most impacted the differentiation of target and decoy PSMs were: (1) the number of fragment ion matches between the library and query spectra and (2) the projected cosine similarity score. Projected cosine score was a strong indicator for identifying targets, and a higher number of fragment ion matches generally led to projected cosine scores concentrated near the optimal value of 1 (FIG. 23, panel A). Similar to MSPLIT-DIA, one tactic for separating target peptides from decoys involves filtering PSMs for a minimum number of matched fragment ions and sorting by projected cosine score. One naive approach to optimizing this tactic includes calculating the number of unique peptide identifications with an FDR cutoff of 0.01 after filtering at every possible minimum number of fragment ion matches (FIG. 23, panel B). An alternative strategy introduced here is to combine the number of fragment ion matches with the cosine score, dubbed MaCC score. To better equalize the contribution of the matched fragments and the cosine similarity, MaCC uses the fifth root of the matched fragment ion count multiplied by the cosine score. The MaCC score therefore results in a nonrectangular segregation of accepted and rejected hits in the space of cosine similarity versus the number of matched fragments (FIG. 23, panel C).

After determining all PSMs with FDR<0.01 as determined by MaCC score, CsoDIAq conceptually runs a second, corrected spectrum-spectrum matching that further improved the number of identifications produced by CsoDIAq. To speed up this of fragment ion mass correction, matched fragment ions are filtered based on recorded mass errors from the initial search. A histogram of true minus predicted fragment ion mass differences in PPM of all fragment ion matches from the identified PSMs showed that mass difference was normally distributed and that optimization of the initial range could exclude outlier fragment matches (FIG. 23, panel D).

After refiltering the fragment ions using the optimized fragment mass tolerance, CsoDIAq's MaCC score further excluded decoys, resulting in the consistent identification of more unique peptides than all other methods (FIG. 23, panel E, "Optimized CsoDIAq, corrected"). Fragment mass correction also enhanced and stabilized our naive approach (FIG. 23, panel E, "Naive CsoDIAq, corrected"). For reference, in an original publication, an average of 1,542 peptides were identified across these 100 replicates; the sum of the present optimizations more than doubled peptide identifications from the same data.

In addition to obtaining higher hits overall, the combination of MaCC score and fragment ion mass correction consistently resulted in a minimum projected cosine score higher than obtained using the naïve approach (FIG. 23, panel F).

Comparison with MSPLIT-DIA. MSPLIT-DIA was used as a benchmark to evaluate the performance of CsoDIAq with DISPA data, as it is to date the most widely used and recognized DIA analysis software tool that implements a cosine similarity score. Specifically, peptide and protein identifications from CsoDIAq were benchmarked against MSPLIT-DIA using the same MGF library for both DISPA and LC-MS DIA data (Neely et al., J. bioRxiv, DOI: 10.1101/2020.11.20.391300 (2020)). For DISPA data, CsoDIAq identified 23.3 and 5.6% more peptides and protein groups, respectively (FIG. 24, panels A and B); for LC-MS DIA data, CsoDIAq identified 36.0 and 24.6% more peptides and protein groups, respectively (FIG. 24, panels C and D). Note that CsoDIAq performs even better with optimized TraML libraries.

The run time of MSPLIT-DIA and CsoDIAq was compared. MSPLIT-DIA ran for 0:03:32 (Hours:Minutes:-Seconds) and 2:13:37 for DISPA and LC-MS data sets, respectively. In comparison, CsoDIAq with correction completed in 0:03:16 and 0:51:23 for DISPA and LC-MS DIA, respectively. Because the correction is optional, if data is pre-calibrated, users can decrease run time, in this case to 0:03:08 and 0:41:13 for DISPA and LC-MS DIA, respectively.

In addition to analyzing data specific to the DISPA methodology, CsoDIAq can run on traditional LC-MS DIA output.

Protein Quantitation. CsoDIAq additionally enables peptide and protein quantification by computing the relative ratio of the y-ion fragment from co-isolated heavy and light peptide precursors. Quantitative results from various combinations of possible quantitative settings were compared using data from samples mixed at known ratios of heavy/light described in the original DISPA publication. The ratios from LC-MS match the predicted values best, and the optimized CsoDIAq algorithm showed less ratio compression apparent at the extreme ratios compared to the original DISPA analysis.

Usability. Recognizing that isolating CsoDIAq usability purely to the command line could alienate researchers unaccustomed to such tools, a Graphic User Interface (GUI) was implemented as an aid. The aid did not add any new functionality to CsoDIAq itself, but simply serves as a shell for command line prompts to enhance usability. There are two tabs on the GUI, one each for peptide/protein identification (FIG. 25, panel A) and SILAC quantification (FIG. 25, panel B). Both tabs have entries for DIA data file path (first DIA run for identification, second DIA run for quantification), library file path, outfile directory path, all of which are required fields. Additionally, the quantification tab requires the path to the identification tab output to match results with the prior identification. For runtime settings, defaults are used if no user input is provided and are therefore not required fields. Both tabs have settings for initial mass tolerance in ppm and correction settings, including enabling the second corrective run, standard deviation tolerance used for the correction, and whether or not a histogram will be generated demonstrating the PPM values specified in the correction.

Identification settings also include if protein inference should be enabled, and if so how many target peptides per protein should be included in the final output. There is also a setting to instigate a maximum number of query spectra that can be pooled at any time, as particularly large DIA data files can be memory intensive to analyze otherwise. Quantification settings include an entry for the maximum number of library peaks per library spectra and a minimum number of peak matches required for identification and quantification, as excess peak matches can skew the final results. Because each peak identified between library and query spectra can be used to determine a possible ratio that represents the change in quantity between conditions, a setting to choose between the mean or median of matched peak ratios is included as well. In all cases, invalid inputs are highlighted in red after clicking the "Execute" button while valid inputs are highlighted green. Conditions required for each field can be identified by hovering over the highlighted text field in question.

Identification of over 1,000 human proteins with DISPA. Finally, a scouting experiment was carried out with the Hela digest standard from Pierce using a new Orbitrap Exploris 240 with FAIMS Pro interface. The data were analyzed using csoDIAq using the default parameters including correction except that a starting fragment tolerance of 10 ppm was used. The new generation Orbitrap along with csoDIAq analysis enabled for the first time identification of over 1,000 human protein groups. The target list generated by csoDIAq from the scouting data was used to generate a fast targeted method for the most abundant peptide from each of the 1000 protein groups, and targeted re-analysis identified these 1,000 protein groups in a few minutes.

Discussion The CsoDIAq software package described in this example enables the first unified solution to DISPA data analysis, which is expected to enable more widespread adoption. The added applicability of CsoDIAq to standard LC-MS DIA analyses further expands its utility. CsoDIAq introduces algorithmic advances to spectra-spectra matching from DIA data, including spectral pooling, MaCC scoring, fragment mass error correction, and the ability to use the TraML library format. Spectra pooling significantly and fragment mass error correction both improve target discrimination in target-decoy analysis. Combining these techniques with the projected spectrum scoring concept enabled an overall enhancement in the quantity of peptides and proteins identified. All advances combined enabled identification of more than double the number of peptides as compared to the original report from the same data. Finally, CsoDIAq can quantify peptides and proteins from SILAC labeled samples, and final CsoDIAq increases usability through the GUI. Altogether, the CsoDIAq software package simplifies and enhances DISPA data analysis.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

We claim:

1. A method for high-throughput analysis of a sample using mass spectrometry, the method comprising the steps of:
    a) providing a sample comprising a mixture of molecules;
    b) ionizing the mixture of molecules thereby generating ionized molecules;
    c) transporting the ionized molecules from an inlet side of a chamber to an outlet side of a chamber, wherein the chamber comprises a buffer gas and the ionized molecules are transported through the buffer gas;
    d) applying an electric field to the ionized molecules being transported through the buffer gas, and separating the ionized molecules according to ion mobility of the ionized molecules;
    e) transporting a portion of the separated ionized molecules through the outlet side of the chamber into a mass analyzer of a mass spectrometer device, wherein the chamber is in fluid connection with the mass analyzer;
    f) selectively isolating the portion of the separated ionized molecules in the mass analyzer according to the mass-to-charge ratios of the separated ionized molecules, thereby generating isolated ionized molecules;
    g) measuring mass-to-charge ratios of the isolated ionized molecules, thereby generating mass spectrometry data, wherein the generated mass spectrometry data further comprises a generated spectrum, wherein the generated spectrum comprises a plurality of peaks corresponding to measured mass-to-charge ratios of the isolated ionized molecules, and wherein the plurality of peaks are characterized by one or more signal parameters; and
    h) generating a projected mass spectrum by extracting signals within one or more defined mass accuracy ranges from the generated mass spectrometry data corresponding to expected ions from a reference spectrum, and calculating a spectral match score by comparing the resulting projected mass spectrum to the reference spectrum.

2. The method of claim 1, wherein liquid chromatography is not performed on the mixture of molecules.

3. The method of claim 1, wherein an online separation or purification step is not performed on the mixture of molecules or ionized molecules other than the ion mobility separation.

4. The method of claim 1, wherein the mixture comprises polypeptides, lipids, metabolites, or combinations thereof.

5. The method of claim 1 further comprising digesting a protein mixture to generate an unseparated mixture of molecules; and ionizing the unseparated mixture of molecules thereby generating the ionized molecules.

6. The method of claim 1, wherein the mixture of molecules is a whole cell lysate and the step of generating ionized molecules comprises ionizing the whole cell lysate.

7. The method of claim 1 further comprising fragmenting the isolated ionized molecules, thereby generating fragment ions, and measuring the mass-to-charge ratios of the fragment ions, wherein the generated mass spectrometry data comprises the mass-to-charge ratios of the fragment ions.

8. The method of claim 1 wherein applying the electric field comprises varying the strength of the electric field while the ionized molecules are transported through the chamber.

9. The method of claim 1 wherein the generated mass spectrometry data further comprises ion mobility data, wherein the ion mobility data comprises: time when the separated ionized molecules used to generate the mass-to-charge ratios are collected and transported to the mass analyzer, an order separated ions were collected, voltage used to separate the ionized molecules, or combinations thereof.

10. The method of claim 9 further comprising comparing generated mass spectrometry data or spectra with one or more reference mass spectrometry data or spectra from a reference database, and identifying one or more molecules from the sample as corresponding to a compound from the reference database.

11. The method of claim 10 comprising comparing the generated spectra with one or more spectra from a reference database, said comparing step comprising:

a) assigning a spectrum tag to each peak from at least two selected reference spectra from the one or more reference spectra;
b) combining the at least two selected reference spectra to form a consolidated reference spectrum;
c) comparing the one or more peaks from the generated spectrum with each peak in the consolidated reference spectrum; and
d) identifying a target peak from the consolidated reference spectrum that matches a peak from the generated spectrum using the spectrum tag.

12. A method of analyzing a proteome using mass spectrometry, the method comprising the steps of:
a) collecting a portion of a proteome from a cell;
b) digesting the portion of the proteome to form a mixture of polypeptides;
c) ionizing the mixture of polypeptides thereby generating ionized polypeptides;
d) transporting the ionized polypeptides from an inlet side of a chamber to an outlet side of a chamber, wherein the chamber comprises a buffer gas and the ionized polypeptides are transported through the buffer gas;
e) applying an electric field to the ionized polypeptides being transported through the buffer gas, and separating the ionized polypeptides according to ion mobility of the ionized polypeptides;
f) transporting a portion of the separated ionized polypeptides through the outlet side of the chamber into a mass analyzer of a mass spectrometer device, wherein the chamber is in fluid connection with the mass analyzer;
g) selectively isolating the portion of the separated ionized polypeptides in the mass analyzer according to the mass-to-charge ratios of the separated ionized polypeptides, thereby generating isolated ionized polypeptides;
h) measuring mass-to-charge ratios the isolated ionized polypeptides, thereby generating mass spectrometry data, wherein the generated mass spectrometry data further comprises a generated spectrum, wherein the generated spectrum comprises a plurality of peaks corresponding to measured mass-to-charge ratios of the isolated ionized polypeptides, and wherein the plurality of peaks are characterized by one or more signal parameters;
e) generating a projected mass spectrum by extracting signals within one or more defined mass accuracy ranges from the generated mass spectrometry data corresponding to expected ions from a reference spectrum, and calculating a spectral match score by comparing the resulting projected mass spectrum to the reference spectrum,
wherein an online separation or purification step is not performed on the mixture of molecules or ionized molecules other than the ion mobility separation.

13. A method of analyzing a sample comprising one or more molecules using mass spectrometry, the method comprising the steps of:
a) introducing the sample to an ionization source, thereby generating one or more ionized molecules;
b) performing an ion filtering step on the ionized molecules comprising selectively transmitting a first portion of ionized molecules to a mass analyzer, wherein ionized molecules within the transmitted first portion of ionized molecules have an ion mobility within a first predefined ion mobility range;
c) performing a mass filtering step comprising selectively isolating a first distribution of transmitted ions from the transmitted first portion of ionized molecules, wherein the isolated first distribution of transmitted ions have a mass-to-charge ratio within a first predefined mass-to-charge ratio range;
d) generating mass spectrometry data comprising recording mass-to-charge ratios of the isolated first distribution of transmitted ions, wherein the generated mass spectrometry data further comprises a generated spectrum, wherein the generated spectrum comprises a plurality of peaks corresponding to measured mass-to-charge ratios of the isolated first distribution of transmitted ions, and wherein the plurality of peaks are characterized by one or more signal parameters;
e) generating a projected mass spectrum by extracting signals within one or more defined mass accuracy ranges from the generated mass spectrometry data corresponding to expected ions from a reference spectrum from a reference database, and calculating a spectral match score by comparing the resulting projected mass spectrum to the reference spectrum; and
f) comparing the generated mass spectrometry data with one or more reference mass spectrometry data from the reference spectrum, and identifying one or more target species of molecules from the sample as corresponding to a compound from the reference database.

14. The method of claim 13 further comprising fragmenting the isolated first distribution of transmitted ions, thereby generating first product ions, and recording mass-to-charge ratios of the first product ions, wherein the generated mass spectrometry data comprises the mass-to-charge ratios of the first product ions.

15. The method of claim 13, wherein the ion filtering step further comprises selectively transmitting a second portion of ionized molecules to a mass analyzer, wherein ionized molecules within the second portion of ionized molecules have an ion mobility within a second predefined ion mobility range;
wherein the mass filtering step comprises selectively isolating a second distribution of transmitted ions from the transmitted second portion of ionized molecules, wherein the isolated second distribution of transmitted ions have a mass-to-charge ratio within a second predefined mass-to-charge ratio range; and
generating mass spectrometry data comprises recording mass-to-charge ratios of the isolated second distribution of transmitted ions.

16. The method of claim 13 further comprising enzymatically digesting the sample prior to introducing the sample to the ionization source, wherein liquid chromatography (LC) is not performed on the digested sample.

17. The method of claim 13, wherein an online separation or purification step is not performed on the sample other than the ion filtering step.

18. The method of claim 13 wherein the generated mass spectrometry data further comprises ion mobility data, wherein the ion mobility data comprises: time when the separated ionized molecules used to generate the mass-to-charge ratios are collected and transported to the mass analyzer, an order separated ions were collected, voltage used to separate the ionized molecules, or combinations thereof.

* * * * *